(12) United States Patent
Chen et al.

(10) Patent No.: US 12,317,268 B2
(45) Date of Patent: May 27, 2025

(54) TRANSMISSION CONFIGURATION INDICATOR (TCI) FOR FLEXIBLE MULTIPLE TRANSMISSION AND RECEPTION POINT (mTRP) BEAM INDICATION AND MULTIPLEXING CONFIGURATIONS

(71) Applicant: QUALCOMM Incorporated, San Diego, CA (US)

(72) Inventors: Yitao Chen, San Diego, CA (US); Mostafa Khoshnevisan, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 566 days.

(21) Appl. No.: 17/669,951

(22) Filed: Feb. 11, 2022

(65) Prior Publication Data

US 2023/0262703 A1    Aug. 17, 2023

(51) Int. Cl.
*H04W 72/21*        (2023.01)
*H04B 7/0408*      (2017.01)
(Continued)

(52) U.S. Cl.
CPC .......... *H04W 72/21* (2023.01); *H04B 7/0408* (2013.01); *H04B 7/0665* (2013.01);
(Continued)

(58) Field of Classification Search
CPC .... H04W 72/21; H04W 72/23; H04B 7/0665; H04B 7/0695; H04B 7/088; H04B 7/0639
See application file for complete search history.

(56) References Cited

U.S. PATENT DOCUMENTS

2021/0143964 A1* 5/2021 Frenne ................. H04L 5/0035
2021/0160881 A1* 5/2021 Rahman ............. H04W 72/046
(Continued)

OTHER PUBLICATIONS

International Search Report and Written Opinion—PCT/US2023/061952—ISA/EPO—Jul. 18, 2023.
(Continued)

*Primary Examiner* — Kwang B Yao
*Assistant Examiner* — Bradley D Lytle, Jr.
(74) *Attorney, Agent, or Firm* — Loza & Loza, LLP/Qualcomm

(57) ABSTRACT

A radio access network (RAN) entity transmits a first transmission configuration indicator (TCI) state activation message, mapping first and second TCI states and a first multiple transmission and reception point (mTRP) configuration (if included) to a first TCI codepoint. The RAN entity also transmits a second TCI state activation message, mapping third and fourth TCI states and a second mTRP configuration (if included) to a second TCI codepoint. The first and second TCI codepoints are activated. The first and second TCI codepoints are associated with a first downlink control information (DCI) format and a second DCI format, respectively. In some aspects, TCI states and mTRP configurations (if included) are activated and mapped to one TCI codepoint, where the first and second TCI states and first mTRP configuration are associated with a first DCI and the third and fourth TCI states and second mTRP configuration are associated with a second DCI.

20 Claims, 24 Drawing Sheets

(51) Int. Cl.
*H04B 7/06* (2006.01)
*H04B 7/08* (2006.01)
*H04W 72/0446* (2023.01)
*H04W 72/1268* (2023.01)
*H04W 72/1273* (2023.01)
*H04W 72/23* (2023.01)
*H04B 7/0413* (2017.01)

(52) U.S. Cl.
CPC ......... *H04B 7/0695* (2013.01); *H04B 7/0697* (2013.01); *H04B 7/086* (2013.01); *H04B 7/088* (2013.01); *H04W 72/0446* (2013.01); *H04W 72/1268* (2013.01); *H04W 72/1273* (2013.01); *H04W 72/23* (2023.01); *H04B 7/0413* (2013.01); *H04B 7/0639* (2013.01)

(56) References Cited

U.S. PATENT DOCUMENTS

| | | | |
|---|---|---|---|
| 2021/0250144 A1 | 8/2021 | Nam et al. | |
| 2022/0239358 A1* | 7/2022 | Kim | H04L 5/0094 |
| 2022/0322413 A1* | 10/2022 | Kyung | H04W 72/23 |
| 2022/0394548 A1* | 12/2022 | Huang | H04W 72/51 |

OTHER PUBLICATIONS

Partial International Search Report—PCT/US2023/061952—ISA/EPO—May 26, 2023.

\* cited by examiner

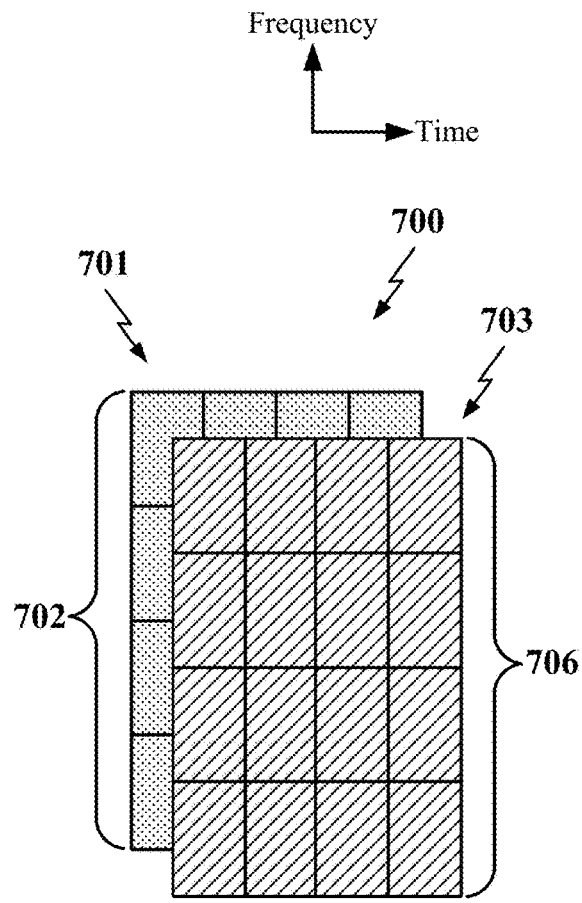
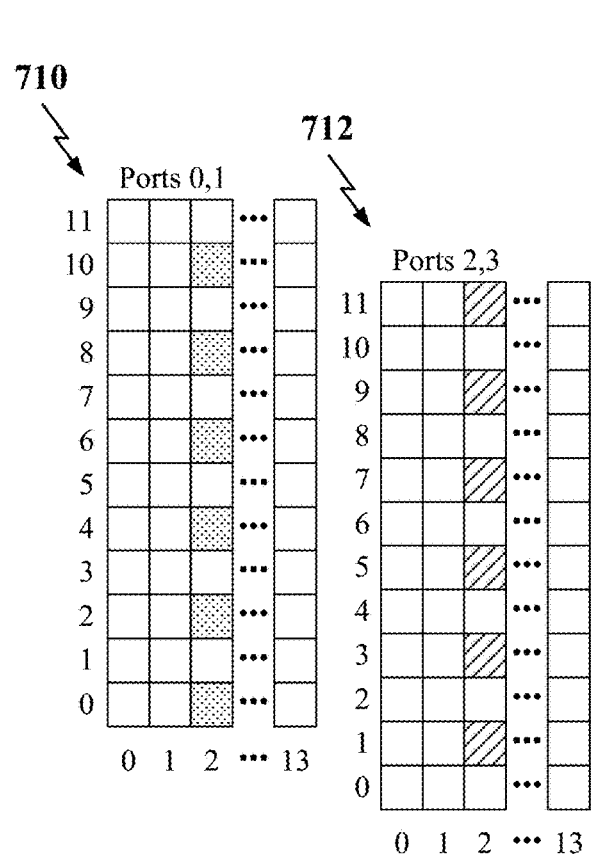
FIG. 7A  FIG. 7B

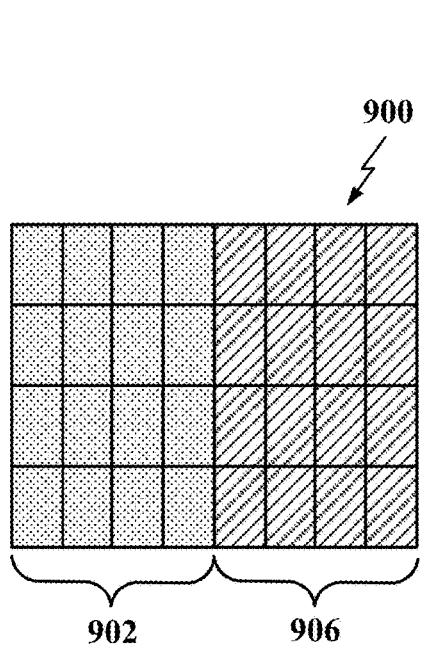
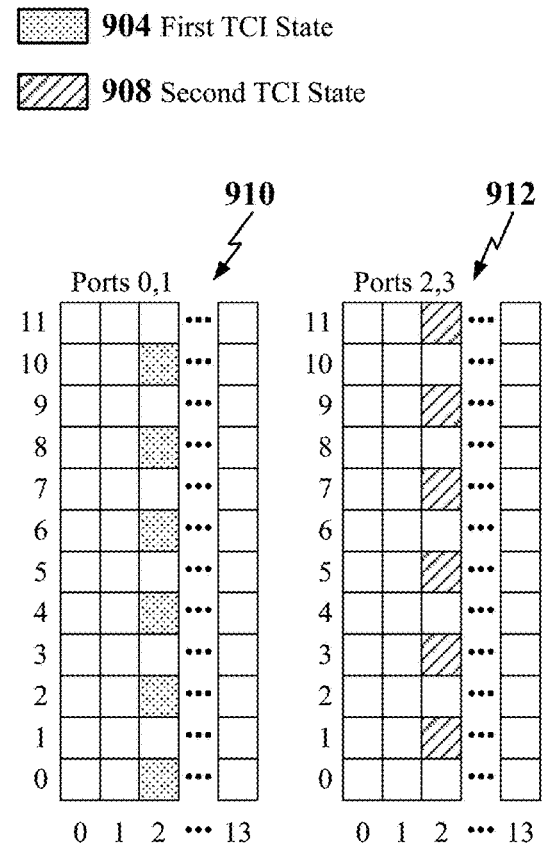
FIG. 9A
FIG. 9B
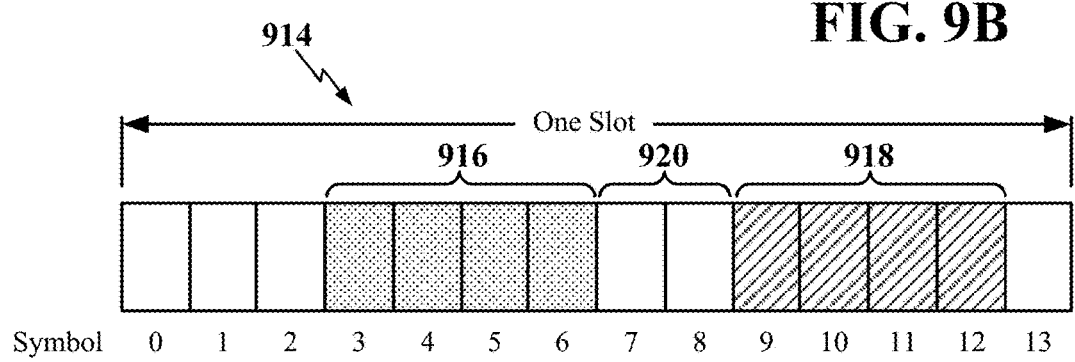
FIG. 9C
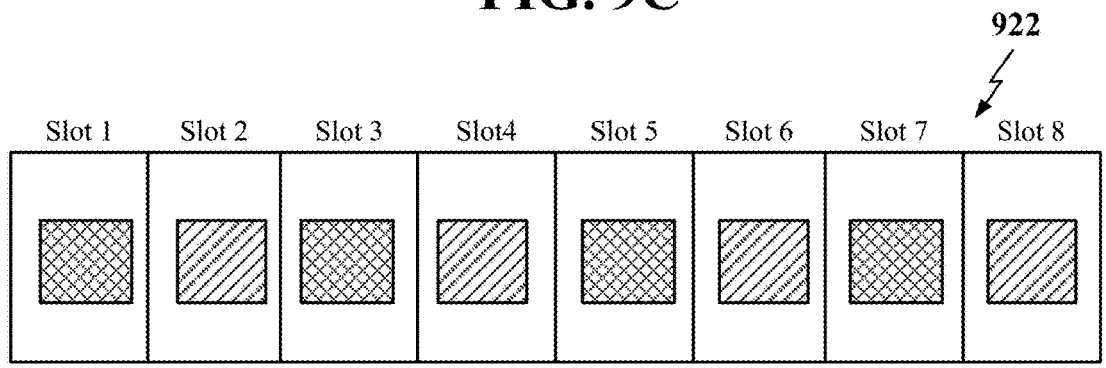
FIG. 9D

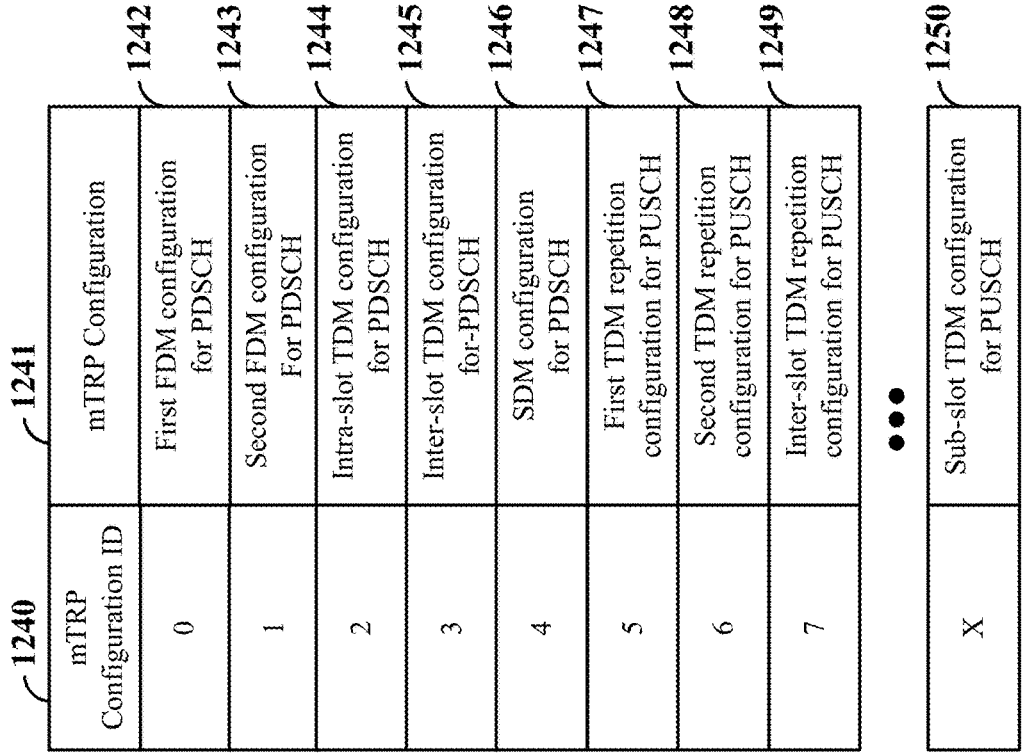
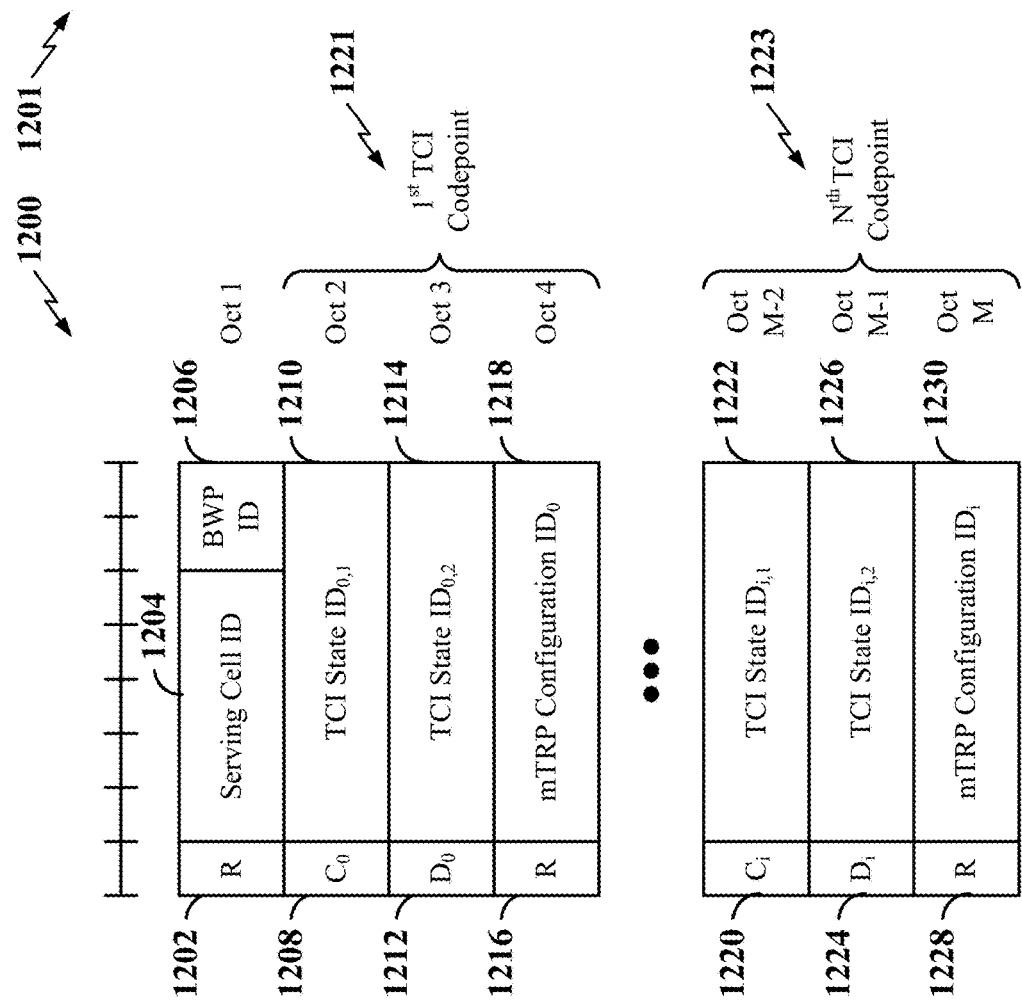
FIG. 12B
FIG. 12A

2200

```
                    ┌───────┐
                    │ Start │
                    └───┬───┘
                        ▼
```

| Transmit a first transmission configuration indicator (TCI) state activation message, the first TCI state activation message: | 2202 | mapping at least a first TCI state, a second TCI state, and a first multiple transmission and reception point (mTRP) configuration to at least a first TCI codepoint, and activating the at least the first TCI codepoint, and mapping at least a third TCI state, a fourth TCI state, and a second mTRP configuration to the at least the first TCI codepoint, and activating the at least the third TCI state, the fourth TCI state, and the second mTRP configuration, where:

the at least the first TCI state, the second TCI state, and the first mTRP configuration of the first TCI codepoint correspond to a first DCI format, and the at least the third TCI state, the fourth TCI state, and the second mTRP configuration of the first TCI codepoint correspond to a second DCI format Transmit a beam indication message indicating the at least the first TCI codepoint — 2204

Transmit a scheduling message indicating scheduled resources corresponding to at least one of: the first TCI state, the second TCI state, the third TCI state, or the fourth TCI state — 2206

End

FIG. 22

TRANSMISSION CONFIGURATION INDICATOR (TCI) FOR FLEXIBLE MULTIPLE TRANSMISSION AND RECEPTION POINT (mTRP) BEAM INDICATION AND MULTIPLEXING CONFIGURATIONS

INTRODUCTION

The technology discussed below relates generally to wireless communication networks, and more particularly, to transmission configuration indicators (TCIs) for flexible multiple transmission and reception point (mTRP) beam indication and multiplexing configurations.

In wireless communication systems, such as those specified under standards for 5G New Radio (NR), a radio access network (RAN) entity, via a plurality of transmission and reception points, and user equipment (UE) may utilize beamforming for spatial division multiplexing, as well as utilize frequency division multiplexing and time division multiplexing to improve the reliability of multiple streams received by the UE from the plurality of transmission and reception points. To facilitate beamformed multi-stream communication, the base station may provide the UE with a set of transmission configuration indicator (TCI) states and may also provide the UE with indications of the types of multiplexing used in the various uplink and downlink channels and signals.

TCI states may be activated or deactivated for a UE. The RAN entity may select from among the various TCI states and multiplexing configurations to communicate downlink or uplink channels or downlink or uplink signals between the RAN entity and the UE via multiple transmission and reception points.

BRIEF SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a radio access network (RAN) entity for wireless communication is disclosed. The RAN entity includes a transceiver, a memory, and a processor communicatively coupled to the transceiver and the memory. In the example, the processor and the memory are configured to: transmit a first transmission configuration indicator (TCI) state activation message. The first TCI state activation message: maps at least a first TCI state, a second TCI state, and a first mTRP configuration to at least a first TCI codepoint, and activates the at least the first TCI codepoint. The RAN entity also transmits a beam indication message indicating the at least the first TCI codepoint. In some aspects, the processor and the memory are further configured to: transmit a second TCI state activation message. The second TCI state activation message: maps at least a third TCI state, a fourth TCI state, and a second mTRP configuration to a second TCI codepoint, and activates the at least the second TCI codepoint. In such an aspect, the first TCI state activation message, including the at least the first TCI codepoint, corresponds to a first downlink control information (DCI) format, and the second TCI state activation message, including the second TCI codepoint, corresponds to a second DCI format. In such an aspect, the RAN entity includes at least one of: the at least the first TCI codepoint, or the second TCI codepoint in the beam indication message. In another aspect, the processor and the memory are further configured to: map at least a third TCI state, a fourth TCI state, and a second mTRP configuration to the at least the first TCI codepoint, and activate, via the first TCI state activation message, the at least the third TCI state, the fourth TCI state, and the second mTRP configuration. In such an aspect, the at least the first TCI state, the second TCI state, and the first mTRP configuration of the at least the first TCI codepoint correspond to a first downlink control information (DCI) format, and the at least the third TCI state, the fourth TCI state, and the second mTRP configuration of the at least the first TCI codepoint correspond to a second DCI format.

In another example, a method at a RAN entity is disclosed. According to the method, the RAN entity transmits a first transmission configuration indicator (TCI) state activation message. The first TCI state activation message: maps at least a first TCI state, a second TCI state, and a first multiple transmission and reception point (mTRP) configuration to at least a first TCI codepoint, and activates the at least the first TCI codepoint. The RAN entity also transmits a beam indication message indicating the at least the first TCI codepoint. In some aspects, the method further includes transmitting a second TCI state activation message. The second TCI state activation message: maps at least a third TCI state, a fourth TCI state, and a second mTRP configuration to a second TCI codepoint, and activates the second TCI codepoint. In such an aspect, the first TCI state activation message, including the at least the first TCI codepoint, corresponds to a first downlink control information (DCI) format, and the second TCI state activation message, including the second TCI codepoint, corresponds to a second DCI format. In such an aspect, the method configures the RAN entity to include at least one of: the at least the first TCI codepoint, or the second TCI codepoint in the beam indication message. In another aspect, the method further includes transmitting a second TCI state activation message, the second TCI state activation message: mapping at least a third TCI state, a fourth TCI state, and a second mTRP configuration to the at least the first TCI codepoint, and activating the at least the third TCI state, the fourth TCI state, and the second mTRP configuration. In such an aspect, the at least the first TCI state, the second TCI state, and the first mTRP configuration of the at least the first TCI codepoint correspond to a first downlink control information (DCI) format, and the at least the third TCI state, the fourth TCI state, and the second mTRP configuration of the at least the first TCI codepoint correspond to a second DCI format.

In another example, a radio access network (RAN) entity for wireless communication is disclosed. The RAN entity includes: a transceiver, a memory, and a processor communicatively coupled to the transceiver and the memory. In the example, the processor and the memory are configured to: transmit a first transmission configuration indicator (TCI) state activation message. The first TCI state activation message: maps a first TCI state and a second TCI state to at least a first TCI codepoint, and activates the at least the first TCI codepoint. The processor and memory are further configured to transmit a second TCI state activation message. The second TCI state activation message: maps a third TCI state and a fourth TCI state to a second TCI codepoint, and activates the second TCI codepoint. The second TCI codepoint corresponds to a second DCI format. The processor and memory are further configured to transmit a beam indication message indicating at least one of: the at least the first TCI codepoint, or the second TCI codepoint. In some aspects, the processor and the memory are further configured to transmit the first TCI state activation message and transmit the second TCI state activation message as one TCI state activation message. In such aspects, the one TCI state activation message: maps the first TCI state, the second TCI state, the third TCI state, and the fourth TCI state to the at least the first TCI codepoint, and activates the first TCI state, the second TCI state, the third TCI state, and the fourth TCI state. In such aspect, the first TCI state and the second TCI state correspond to the first DCI format, and the third TCI state and the fourth TCI state correspond to the second DCI format.

In still another example, a method at a radio access network (RAN) entity is disclosed. The method includes transmitting a first transmission configuration indicator (TCI) state activation message. The first TCI state activation message: maps a first TCI state and a second TCI state to at least a first TCI codepoint, and activates the at least the first TCI codepoint. The at least the first TCI codepoint corresponds to a first downlink control information (DCI) format. The method further includes transmitting a second TCI state activation message. The second TCI state activation message: maps a third TCI state and a fourth TCI state to a second TCI codepoint, and activates the second TCI codepoint. The second TCI codepoint corresponds to a second DCI format. In such aspects, the method further includes transmitting a beam indication message indicating at least one of: the at least the first TCI codepoint, or the second TCI codepoint. In some aspects, the method further includes transmitting the first TCI state activation message and the second TCI state activation message as one TCI state activation message. According to such aspects, the one TCI state activation message: maps the first TCI state, the second TCI state, the third TCI state, and the fourth TCI state to the at least the first TCI codepoint, and activates the first TCI state, the second TCI state, the third TCI state, and the fourth TCI state. Still further, according to such aspects, the first TCI state and the second TCI state correspond to the first DCI format, and the third TCI state and the fourth TCI state correspond to the second DCI format.

These and other aspects will become more fully understood upon a review of the detailed description, which follows. Other aspects, features, and examples will become apparent to those of ordinary skill in the art, upon reviewing the following description of specific, exemplary aspects of in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects, such exemplary aspects can be implemented in various devices, systems, and methods.

BRIEF DESCRIPTION OF THE DRAWINGS

FIGS. 7A and 7B are diagrammatic illustrations of an example of spatial division multiplexing (SDM) for physical downlink shared channel (PDSCH) according to some aspects.

FIGS. 9A, 9B, 9C, and 9D are diagrammatic illustrations of examples of time division multiplexing (TDM) for PDSCH according to some aspects.

FIGS. 12A and 12B are examples of a timing configuration indicator (TCI) state activation message and a related mTRP configuration table, respectively, according to some aspects.

FIG. 22 is a flow chart illustrating an example of a method at a RAN entity according to some aspects.

DETAILED DESCRIPTION

Figure 1:
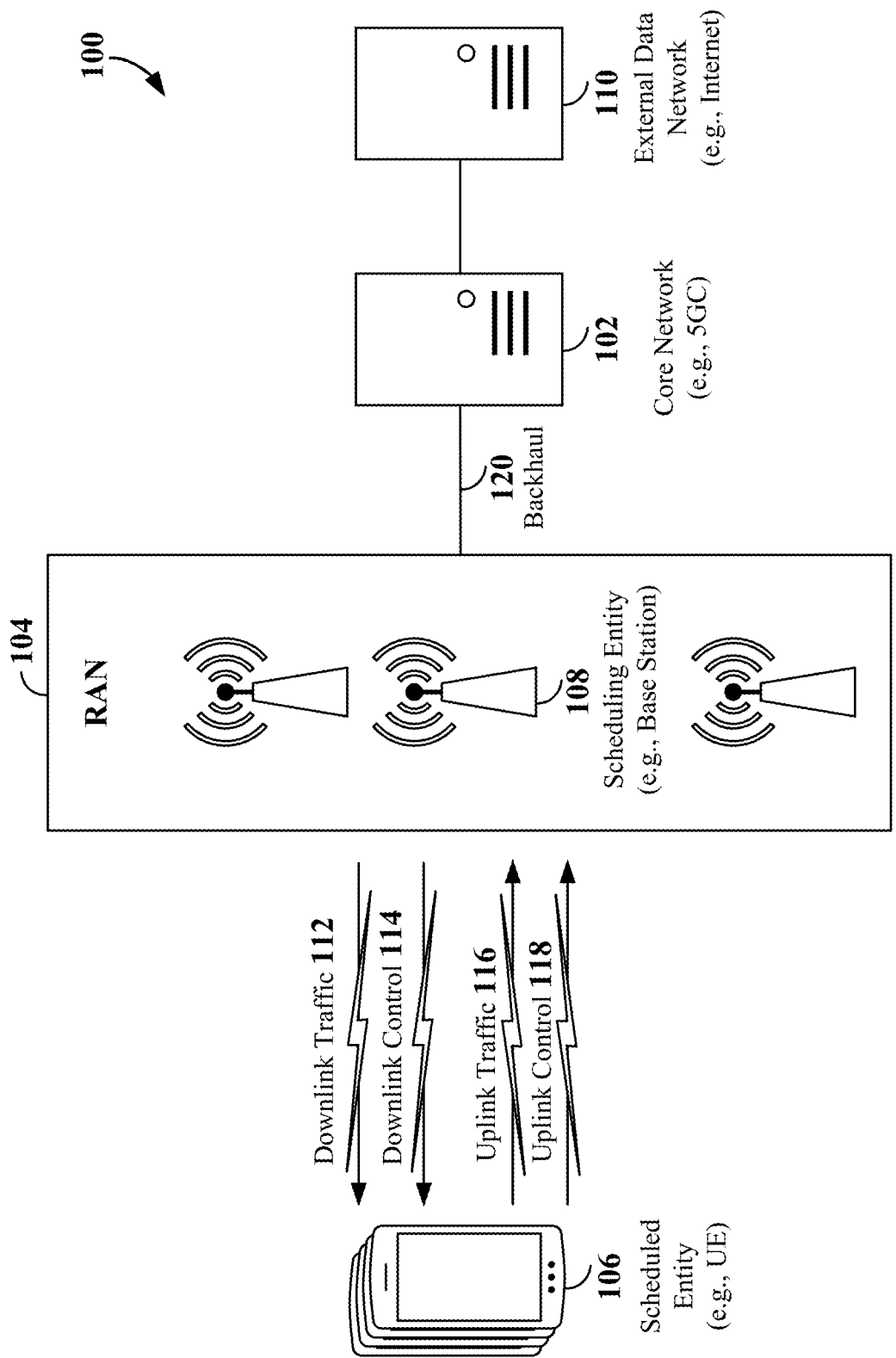
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1 or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The disclosure relates to a radio access network (RAN) entity that, according to some aspects, may transmit a first transmission configuration indicator (TCI) state activation message. The first TCI state activation message may map (at or for a UE) at least the first TCI state, a second TCI state, and a first mTRP configuration to at least a first TCI codepoint, and activate (at the UE) the first TCI codepoint. The first TCI state activation message may also. The RAN entity may transmit a beam indication message indicating the at least the first TCI codepoint. The RAN entity may further transmit a scheduling message indicating scheduled resources corresponding to a first beam associated with the first TCI state and a second beam associated with the second TCI state (the first TCI state and the second TCI state being mapped to the first TCI codepoint). Additional TCI state activation messages, which may map (at or for a UE) at least a third TCI state, a fourth TCI state, and a second mTRP configuration to at least a second TCI codepoint, and may activate (at the UE) the at least the second TCI codepoint may also be transmitted.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, TX chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control 114 information, including but not limited to scheduling information (e.g., a grant), synchronization or timing information, or other control information from another entity in the wireless communication network such as the scheduling entity 108. The scheduled entity (e.g., a UE 106) may transmit uplink control 118 information including one or more uplink control channels to the scheduling entity 108. Uplink control 118 information may include a variety of packet types and categories, including pilots, reference signals, and information configured to enable or assist in decoding uplink data transmissions.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC) or any other suitable standard or configuration.

Figure 2:
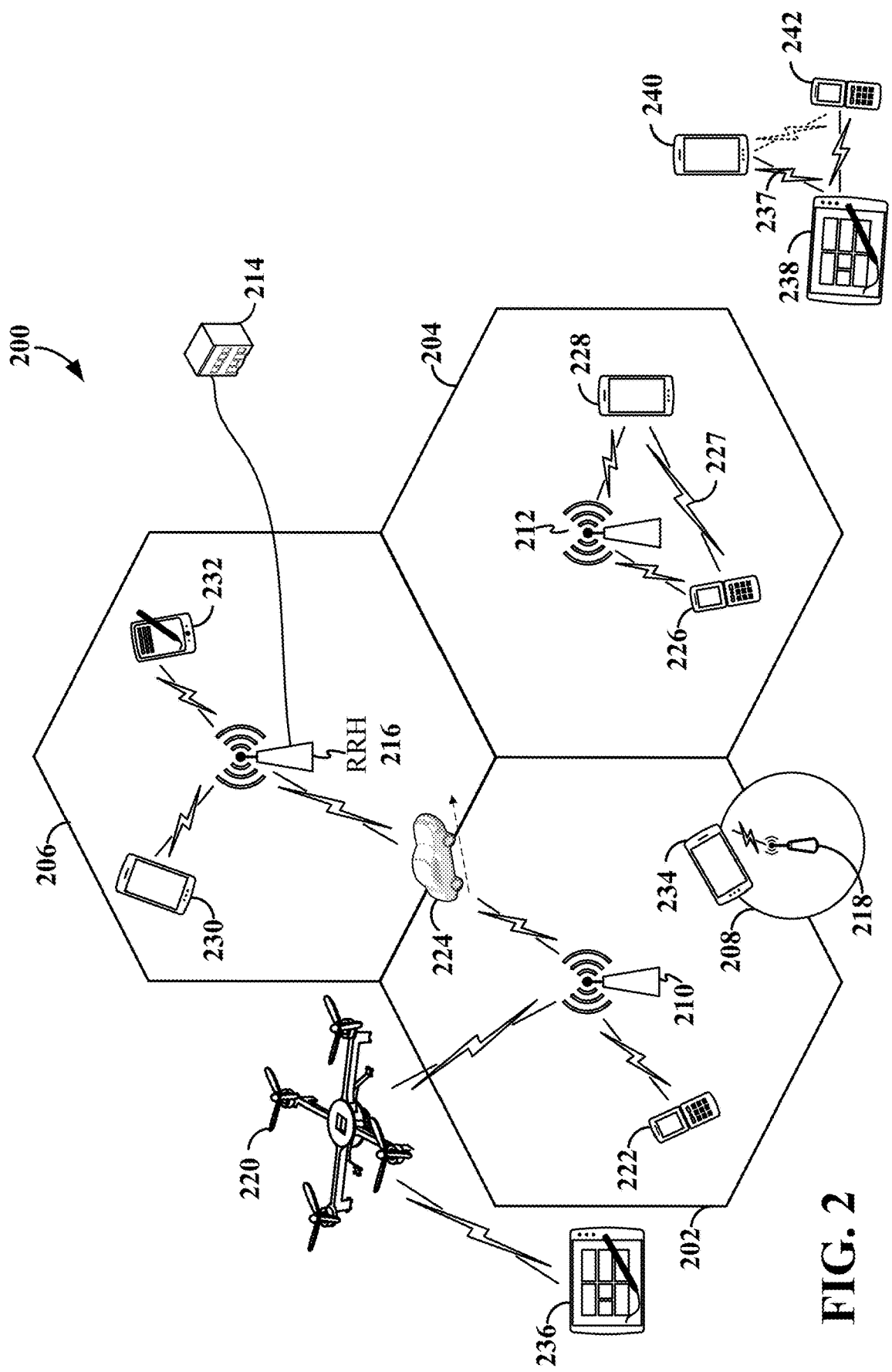
FIG. 2 is a schematic illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
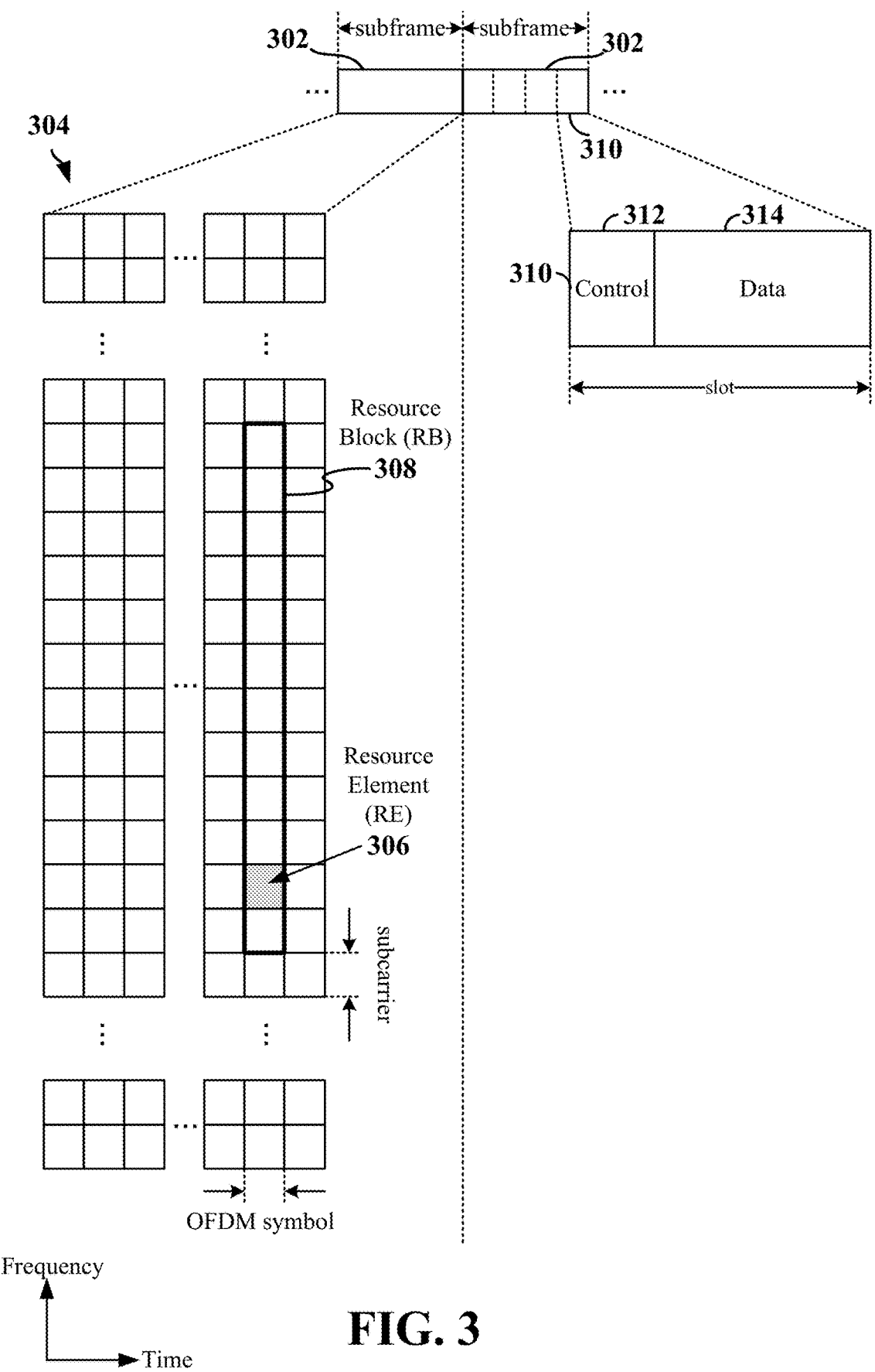
FIG. 3 is a schematic illustration of wireless resources in an air interface utilizing orthogonal frequency divisional multiplexing according to some aspects.

Referring now to FIG. 3, an expanded view of an exemplary subframe 302 is illustrated, showing an OFDM resource grid. However, as those skilled in the art will readily appreciate, the physical (PHY) transmission structure for any particular application may vary from the example described here, depending on any number of factors. Here, time is in the horizontal direction with units of OFDM symbols, and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
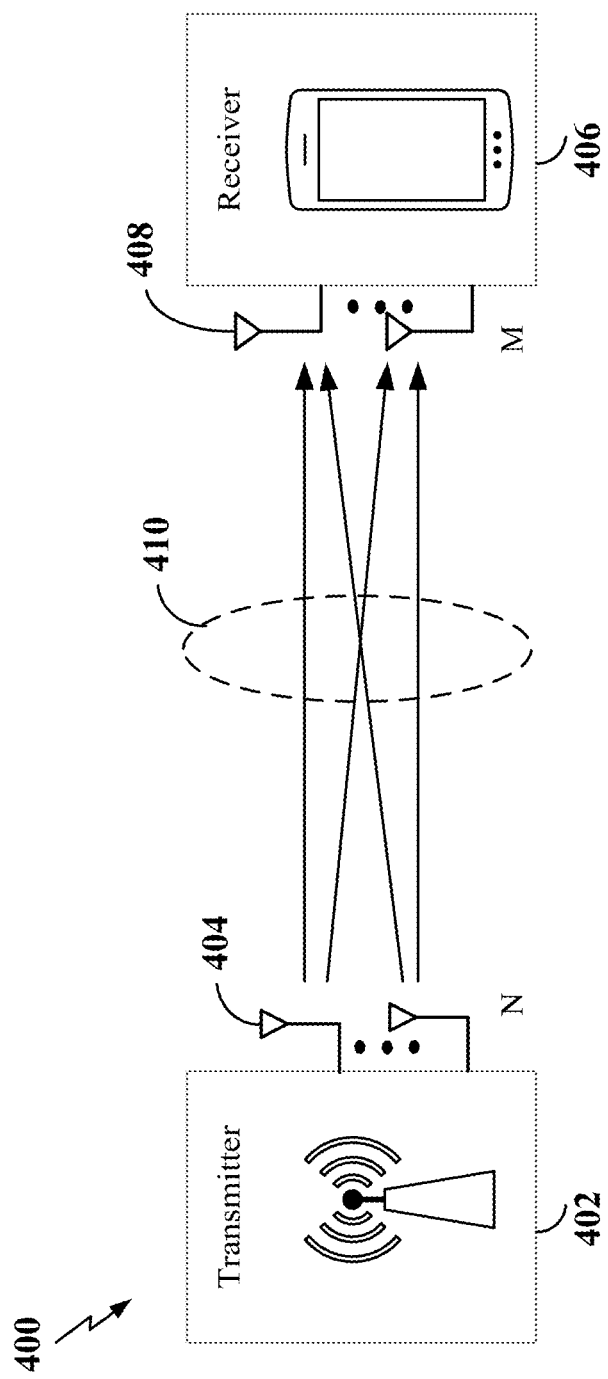
FIG. 4 is a diagram illustrating an example of a wireless communication system supporting beamforming and/or multiple-input multiple-output according to some aspects.

In some aspects of the disclosure, the scheduling entity and/or scheduled entity may be configured for beamforming and/or multiple-input multiple-output (MIMO) technology. FIG. 4 is a diagram illustrating an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. The multiple transmit antennas 404 and multiple receive antennas 408 may each be configured in a single panel or multi-panel antenna array. Each of the transmitter 402 and the receiver 406 may be implemented, for example, within a scheduling entity (e.g., base station 108), as illustrated in FIGS. 1 and/or 2, a scheduled entity (e.g., UE 106), as illustrated in FIGS. 1 and/or 2, or any other suitable wireless communication device.

The use of such multiple antenna technology enables the wireless communication system 400 to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system (e.g., the wireless communication system 400 supporting MIMO) is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a sounding reference signal (SRS) transmitted from the UE or other pilot signal). Based on the assigned rank, the base station may then transmit a channel state information-reference signal (CSI-RS) with separate CSI-RS sequences for each layer to provide for multi-layer channel estimation. From the CSI-RS, the UE may measure the channel quality across layers and resource blocks and feed back channel quality indicator (CQI) and rank indicator (RI) values to the base station for use in updating the rank and assigning REs for future downlink transmissions.

In one example, as shown in FIG. 4, a rank-2 spatial multiplexing transmission on a 2×2 MIMO antenna configuration will transmit one data stream from each of the transmit antennas 404. Each data stream reaches each of the receive antennas 408 along a different one of the signal paths 410. The receiver 406 may then reconstruct the data streams using the received signals from each of the receive antennas 408.

Beamforming is a signal processing technique that may be used at the transmitter 402 or receiver 406 to shape or steer an antenna beam (e.g., a transmit/receive beam) along a spatial path between the transmitter 402 and the receiver 406. Beamforming may be achieved by combining the signals communicated via antennas 404 or 408 (e.g., antenna elements of an antenna array) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlinks receive beams to receive signals from the base station.

In some examples, to select one or more serving beams (e.g., one or more downlink transmit beams and one or more downlink receive beams) for communication with a UE, the base station may transmit a reference signal, such as a synchronization signal block (SSB), a tracking reference signal (TRS), or a channel state information reference signal (CSI-RS), on each of a plurality of beams (e.g., on each of a plurality of downlink transmit beams) in a beam-sweeping manner. The UE may measure the reference signal received power (RSRP) on each of the beams (e.g., measure RSRP on each of the plurality of downlink transmit beams) and transmit a beam measurement report to the base station indicating the Layer 1 RSRP (L-1 RSRP) of each of the measured beams. The base station may then select the serving beam(s) for communication with the UE based on the beam measurement report. In other examples, when the channel is reciprocal, the base station may derive the particular beam(s) (e.g., the particular downlink beam(s)) to communicate with the UE based on uplink measurements of one or more uplink reference signals, such as a sounding reference signal (SRS).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

In 5G New Radio (NR) systems, particularly for above 6 GHz or millimeter wave (mmWave) systems, beamformed signals may be utilized for downlink channels, including the physical downlink control channel (PDCCH) and physical downlink shared channel (PDSCH). In addition, for UEs configured with beamforming antenna array modules, beamformed signals may also be utilized for uplink channels, including the physical uplink control channel (PUCCH) and the physical uplink shared channel (PUSCH). However, it should be understood that beamformed signals may also be utilized by, for example, enhanced mobile broadband (eMBB) gNBs for sub 6 GHz systems.

Figure 5:
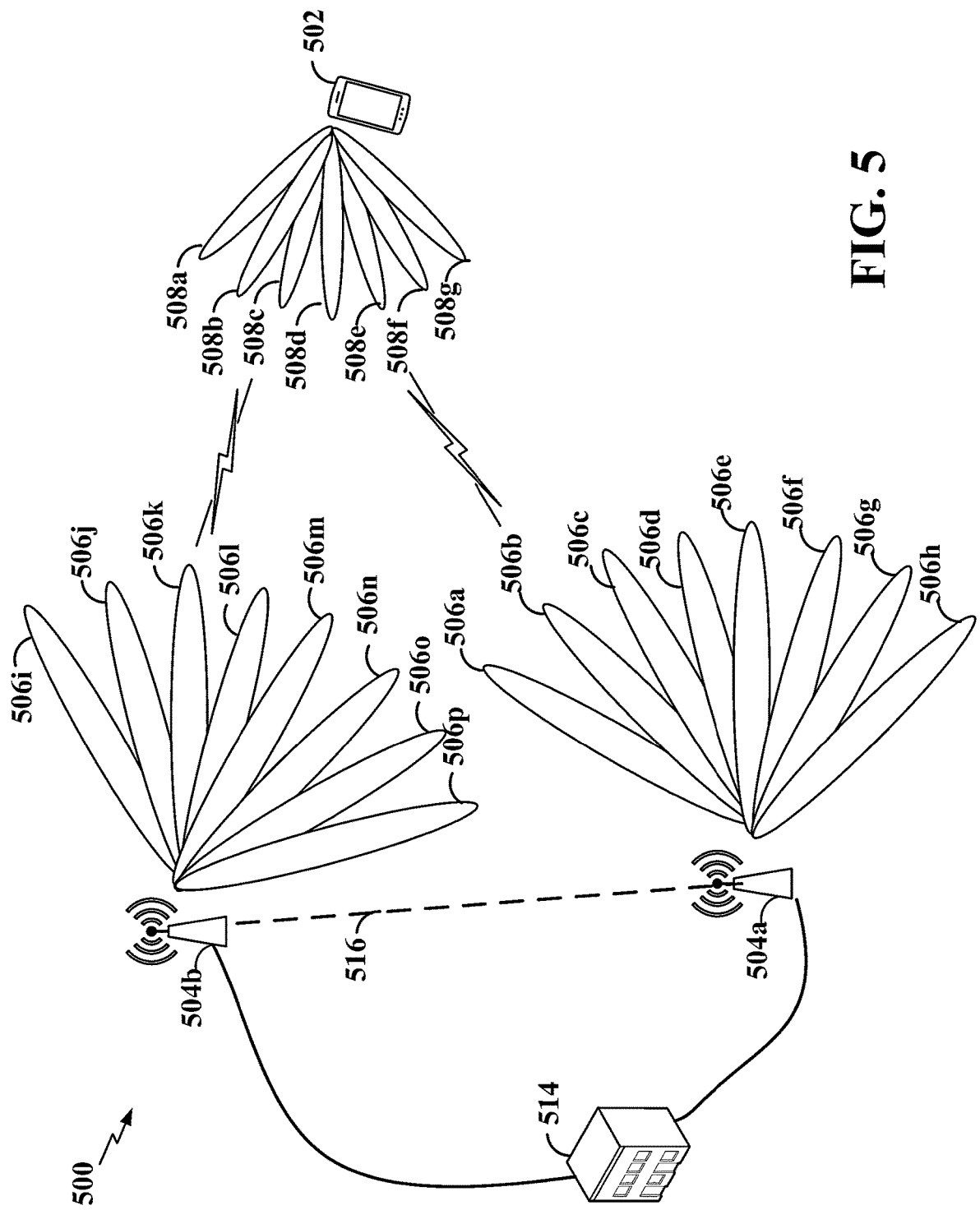
FIG. 5 is a diagram illustrating an example of beamforming in a multiple transmission and reception point (mTRP) environment according to some aspects.

FIG. 5 is a diagram illustrating an example of beamforming in a multiple transmission and reception point (mTRP) environment 500 according to some aspects. The multi-TRP environment 500 may include a plurality of TRPs 504a and 504b, two of which are illustrated for simplicity. The multi-TRP environment 500 may implement spatial division multiplexing (SDM) in which transmissions (streams) from the TRPs 504a and 504b may be simultaneously directed towards a single UE 502. In FIG. 5, communication may be between the UE 502 and a RAN entity 514 via at least one of the TRPs 504a and 504b. In such a multi-TRP environment 500 providing multi-stream transmission, the multiple TRPs 504a and 504b may be collocated (e.g., at the same geographical location and coupled to the same antenna tower or pole) and/or non-collocated, the latter being illustrated.

The TRPs 504a and 504b may correspond to macro-cells, small cells, pico cells, femtocells, remote radio heads, relay nodes, or other radio access network (RAN) nodes. Coordination among the TRPs 504a and 504b for transmission of multiple streams to the UE 502 may be facilitated by the RAN entity 514 (e.g., a centralized RAN node, a virtual RAN node, a base station, a gNB, or another type of RAN entity 514) or via backhaul signaling between the TRPs 504a and 504b. In the example shown in FIG. 5, each of the TRPs 504a and 504b may be remote radio heads (RRHs) of the RAN entity 514. In other examples, each of the TRPs 504a and 504b may be a separate base station and coordination may occur over an optional backhaul link 516. The RAN entity 514 combined with the first TRP 504a and the second TRP 504b may be any of the base stations (e.g., gNBs) or scheduling entities illustrated in FIGS. 1, 2, and/or 4. The UE 502 may be any of the UEs or scheduled entities illustrated in FIGS. 1, 2, and/or 4.

The RAN entity 514 may generally be capable of communicating with the UE 502 using one or more transmit beams 506a-506h, 506i-506p of one or more of the first TRP 504a and the second TRP 504b, respectively. The UE 502 may be capable of communicating with the RAN entity 514 via one or more of the first TRP 504a and the second TRP 504b using one or more receive beams 508a-508g. As used herein, the term transmit beam refers to any one of the one or more transmit beams 506a-506h, 506i-506p of one or more of the first TRP 504a and the second TRP 504b, respectively that may be utilized for downlink or uplink communication with the UE 502. In addition, the term receive beam refers to any one of the one or more receive beams 508a-508g of the UE 502 that may be utilized for downlink or uplink communication with the RAN entity 514 via one or more of the first TRP 504a and the second TRP 504b.

In the example shown in FIG. 5, each of the first TRP 504a and the second TRP 504b of the RAN entity 514 may be configured to generate a plurality of transmit beams 506a-506h and 506i-506p, respectively. Each of the plurality of transmit beams 506a-506p is associated with a different spatial direction. In addition, the UE 502 may be configured to generate the plurality of receive beams 508a-508g. Each of the plurality of receive beams 508a-508g is associated with a different spatial direction. It should be noted that while some beams are illustrated as adjacent to one another, such an arrangement may be different in different aspects. For example, transmit beams 506a-506h and/or 506i-506p transmitted during a same symbol may not be adjacent to one another. In some examples, the first TRP 504a, the second TRP 504b, and UE 502 may each transmit more or less beams distributed in all directions (e.g., 360 degrees) and in three-dimensions. In addition, the transmit beams 506a-506p may include beams of varying beam width. For example, each of the first TRP 504a and the second TRP 504b may transmit certain signals (e.g., SSBs) on wider beams and other signals (e.g., CSI-RSs) on narrower beams.

Generally speaking, two signals transmitted from the same antenna port should experience the same radio channel, whereas transmitting signals from two different antenna ports should experience different radio conditions. In some cases, transmitted signals from two different antenna ports experience radio channels having common properties. In such cases, the antenna ports are said to be in quasi-colocation (QCL). Two antenna ports may be considered quasi co-located if properties of the channel over which a symbol on one antenna port is conveyed can be inferred from the channel over which a symbol on the other antenna port is conveyed. In 5G NR, UE are equipped with channel estimation, frequency offset error estimation and synchronization procedures for processing QCL. For example, if the UE knows that the radio channels corresponding to two different antenna ports are QCL in terms of Doppler shift, then the UE can determine the Doppler shift for one antenna port and then apply the result on both antenna ports for channel estimation. This avoids the UE having to calculate Doppler shift for both antenna ports separately.

Four types of QCL are defined in 5G NR: QCL-TypeA; QCL-TypeB; QCL-TypeC; and QCL-TypeD. For example, QCL-TypeA may indicate a downlink reference signal (e.g., SSB or CSI-RS) or uplink reference signal (e.g., SRS) from which the large-scale channel properties (LSCPs), such as Doppler shift, Doppler spread, average delay, and/or delay spread, of a downlink channel or signal or uplink channel or signal may be inferred. QCL-TypeB and QCL-TypeC may also indicate reference signals (e.g., SSB, CSI-RS, or SRS) from which specific LSPCPs (e.g., Doppler shift and/or Doppler spread for QCL-TypeB and average delay and/or delay spread for QCL-TypeC) may be inferred. QCL-TypeD may indicate a spatial receiver (RX) parameter (e.g., spatial property of the beam on which a downlink/uplink channel or signal is transmitted). The spatial property of the beam may be inferred from the beam utilized for transmission of a reference signal (e.g., SSB, CSI-RS, or SRS) and may indicate, for example, at least one of a beam direction or a beam width.

QCL information may be conveyed via transmission configuration indicator (TCI) states. A TCI state includes or maps to QCL relationship configurations between one or more reference signals (e.g., SSB, CSI-RS, and SRS) and downlink (DL) or uplink (UL) transmissions. For example, a TCI state may include a DL TCI for a downlink transmission, a joint DL/UL TCI, or spatial relation information for an UL transmission. For example, the TCI state can include one or more reference signal identifications (IDs), each identifying an SSB resource, a CSI-RS resource, or an SRS resource. Each resource (SSB, CSI-RS, or SRS resource)

indicates the particular beam, frequency resource, and OFDM symbol on which the corresponding reference signal is communicated. Thus, in examples in which the TCI state indicates QCL-TypeD for a downlink or uplink transmission, the reference signal ID may be utilized to identify the beam to be used for the downlink or uplink transmission based on the QCL relationship with an associated reference signal (e.g., SSB, CSI-RS, or SRS) indicated in the TCI state.

By way of example, for multi-stream communication, the RAN entity 514 may configure a plurality of TCI states and at least one mTRP configuration via radio resource control (RRC) signaling. Each of the mTRP configurations may indicate, for example, a type of multiplexing associated with at least two of the plurality of configured TCI states. In some examples, the RAN entity 514 may activate a subset of the plurality of configured TCI states and associated mTRP configurations. In some examples, the RAN entity 514 may transmit a TCI state activation message (e.g., medium access control (MAC) control element (MAC-CE)) activating at least two of the configured plurality of TCI states and an associated at least one mTRP configuration. In some examples, the TCI state activation message may map at least a first TCI state, a second TCI state, and an mTRP configuration to at least one TCI codepoint. There may be between one and eight TCI codepoints in some examples, each codepoint associated with a set of at least two TCI states and at least one mTRP configuration. The UE 502 may store the set of activated TCI states and associated mTRP configurations.

In some examples, the RAN entity 514 may transmit a beam indication message (e.g., a first DCI), selecting at least two beams defined by the at least the first TCI state and the second TCI state. The at least the first TCI state and the second TCI state (and an associated mTRP configuration) may be associated with at least one TCI codepoint. In some examples, the RAN entity 514 may transmit a scheduling message (e.g., a second DCI), different from the beam indication message, to configure the UE 502 to receive data according to the at the least the first TCI state, the second TCI state, and the mTRP configuration. For example, in a multi-stream PDSCH communication such as one shown in connection with FIG. 5, the RAN entity 514 may indicate an activated set of at least two TCI states (e.g., a first TCI state and a second TCI state, different from the first TCI state) and at least one mTRP configuration, by indicating a first TCI codepoint.

In the example of FIG. 5, the multi-stream PDSCH communication may be transmitted via at least two beam pair links (e.g., a first beam pair link between the first TRP 504a and the UE 502 defined by a first TCI state, and a second beam pair link between the second TRP 504b and the UE 502 defined by a second TCI state). In the example, the multi-stream PDSCH communication may be multiplexed between the at least two TCI states (e.g., between the two beams) according to the at least one mTRP configuration associated with the at least two TCI states via the first TCI codepoint.

Figure 6:
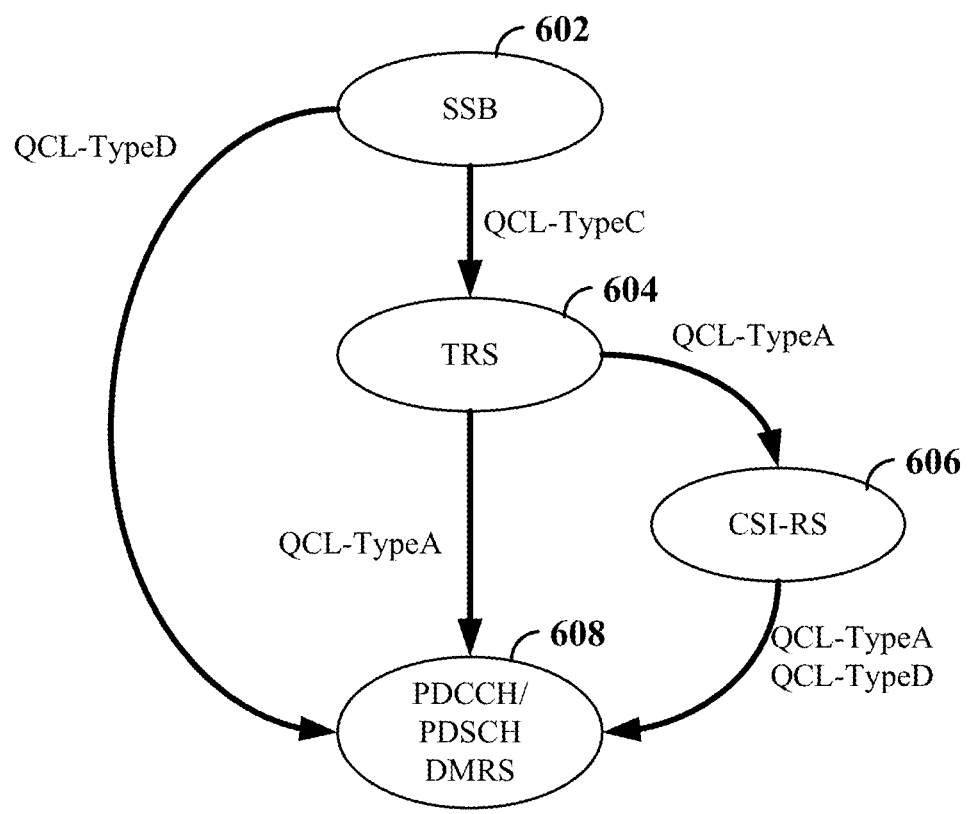
FIG. 6 is a diagram illustrating exemplary quasi-colocation (QCL) relationships between downlink reference signals and other downlink transmissions according to some aspects.

FIG. 6 is a diagram illustrating exemplary quasi-colocation (QCL) relationships between downlink reference signals and other downlink transmissions according to some aspects. As described above, a UE can be configured (e.g., via RRC signaling) with TCI states to decode downlink transmissions, such as PDCCH and PDSCH transmissions. Each TCI state includes parameters for configuring the QCL relationship between one or two downlink reference signals and the DMRS ports of a PDCCH or PDSCH.

In the example shown in FIG. 6, three downlink reference signals, SSB 602, TRS 604, and CSI-RS 606 are illustrated. The QCL relationships between these downlink reference signals and between the downlink reference signals and the PDCCH/PDSCH DMRS ports 608 are shown. Each QCL relationship may be indicated via, for example, a TCI state. For example, the TCI state for a TRS 604 may indicate a QCL-TypeC relationship with an SSB 602. In addition, the TCI state for a CSI-RS 606 may indicate a QCL-TypeA relationship with a TRS 604. Furthermore, the TCI state for a PDCCH/PDSCH DMRS port 608 may indicate a QCL-TypeA and/or QCL-TypeD relationship with a CSI-RS 606 and/or a QCL-TypeD relationship with an SSB 602.

Each TCI state may be configured via RRC using, for example, the following format.

```
TCI State ::=
    tci-StateID           SEQUENCE {
    qcl-Type1                 TCI-StateID,
    qcl-Type2                 QCL-Info,
    qcl-Type3                 QCL-Info
    ...
}
QCL-Info ::=              SEQUENCE {
    cell                      ServCellIndex
    bwp-ID                    BWP-ID
    referenceSignal           CHOICE {
        csi-rs                    NZP-CSI-RS-ResourceID,
        ssb                       SSB-Index
    },
    qcl-Type                  Enumerated (typeA, typeB, typeC,
    ...                           typeD),
}
```

Once configured, the base station may transmit a TCI state activation message to the UE to activate a TCI state on the UE for PDCCH or PDSCH transmissions. In some examples, the TCI state activation message is a MAC-CE. For example, the base station may activate a TCI state for a PDCCH downlink transmission using a UE-specific PDCCH MAC-CE.

FIGS. 7A and 7B are diagrammatic illustrations of an example of spatial division multiplexing (SDM) 700 for PDSCH according to some aspects. In FIG. 7A, two layers of orthogonal frequency division multiplexed (OFDM) resource grids are illustrated. A first layer 701 corresponding to a first TCI state 704 may represent a first set of resource blocks 702 transmitted from an antenna array along a first path (not shown). A second layer 703 corresponding to a second TCI state 708 may represent a second set of resource blocks 706 transmitted from the antenna array (or a different antenna array) along a second path (not shown).

In FIG. 7B, the first DMRS ports 710 (0, 1) associated with the first TCI state 704 (and the first layer 701 of FIG. 7A) and the second DMRS ports 712 (2, 3) associated with the second TCI state 708 (and the second layer 703 of FIG. 7A) may belong to two code division multiplex (CDM) groups. A rank layer combination of 1+1 is depicted; however, according to some aspects, other rank layer combinations, such as 1+1, 1+2, 2+1, and 2+2, may be supported. All rank layer combinations are within the scope of the disclosure. In the example of FIG. 7, the DMRS length is equal to 1 (e.g., DMRS-max-len=1). DMRS port entry {0, 2, 3} may be supported, for example, for the rank layer combination of 1+2. Two phase tracking reference signal (PTRS) ports corresponding to the two groups of DMRS ports may be supported. The first TCI state 704 may be quasi-co-located (QCL) with a first TRP (not shown). The second TCI state 708 may be QCL with a second TRP (not shown).

Figure 8A:
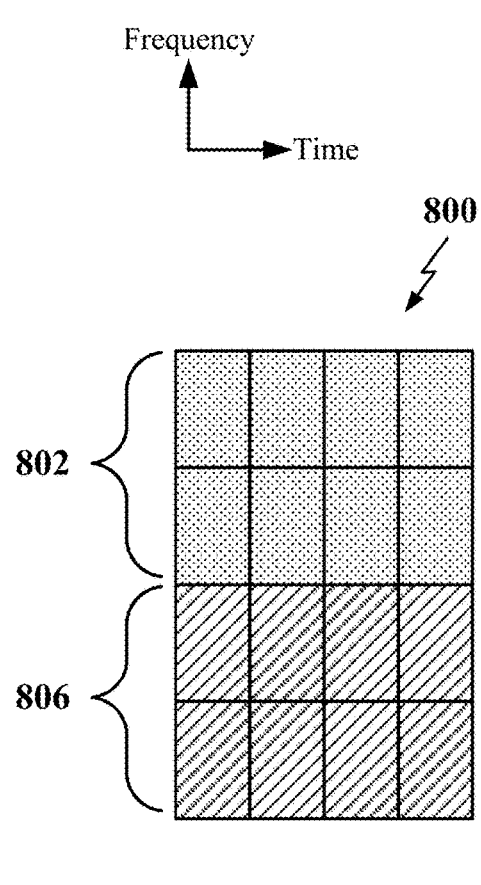
FIGS. 8A and 8B are diagrammatic illustrations of an example of frequency division multiplexing (FDM) for PDSCH according to some aspects.
Figure 8B:
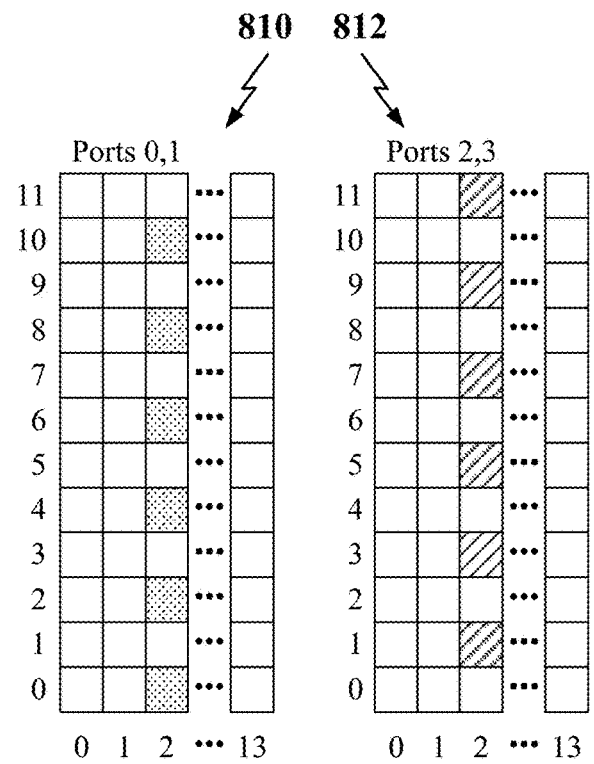

FIGS. 8A and 8B are diagrammatic illustrations of an example of frequency division multiplexing (FDM) 800 for PDSCH according to some aspects. In FIG. 7A, a portion of an orthogonal frequency division multiplexed (OFDM) resource grid is illustrated. As shown in FIG. 8A, two sets of resource blocks may be transmitted with different TCI states. The first set of resource blocks 802 associated with a first TCI state 804 may represent a set of resource blocks transmitted at a higher frequency than a transmission frequency of a second set of resource blocks 806 corresponding to a second TCI state 808.

In FIG. 8B, the first DMRS ports 810 (0, 1) are associated with a first TCI state 804 (and the first set of resource blocks 802 of FIG. 8A) and the second DMRS ports 812 (2, 3) are associated with a second TCI state 808 (and the second set of resource blocks 806 of FIG. 8A). The DMRS length is equal to 1 (e.g., DMRS-max-len=1). The first TCI state 804 may be quasi-co-located (QCL) with a first TRP (not shown). The second TCI state 808 may be QCL with a second TRP (not shown). At least two configurations (a.k.a., schemes) for FDM 800 may be supported. According to a first FDM configuration (a.k.a., FDM Scheme A), one codeword (CW) with one redundancy version (RV) may be supported. The first FDM configuration may be transparent to a UE from a rate matching and/or RE mapping point of view. According to a second FDM configuration (a.k.a., FDM Scheme B), two CWs (CW 1 and CW 2) of the same transport block with different RVs may be supported. In the first set of resource blocks 802, CW 1 is transmitted. In the second set of resource blocks 806, CW 2 is transmitted. The same number of layers/DMRs port(s) are found across the first set of resource blocks 802 and the second set of resource blocks 806. The first DMRS ports 810 (0, 1) associated with the first TCI state 804 and the second DMRS ports 812 (2, 3) associated with the second TCI state 808 may belong to one code division multiplex (CDM) group.

FIGS. 9A, 9B, 9C, and 9D are diagrammatic illustrations of examples of time division multiplexing (TDM) 900 for PDSCH according to some aspects. In FIG. 9A, a portion of an orthogonal frequency division multiplexed (OFDM) resource grid is illustrated. As illustrated above in FIGS. 7 and 8, two sets of resource blocks may be transmitted with different TCI states. The first set of resource blocks 902 associated with a first TCI state 904 may represent a set of resource blocks having an earlier transmission time than that of a second set of resource blocks 906 corresponding to a second TCI state 908.

In FIG. 9B, the first DMRS ports 910 (0, 1) are associated with the first TCI state 904 (and the first set of resource blocks 902 of FIG. 9A) and the second DMRS ports 912 (2, 3) are associated with the second TCI state 908 (and the second set of resource blocks 906 of FIG. 9A). The DMRS length is equal to 1 (e.g., DMRS-max-len=1). The first TCI state 904 may be quasi-co-located (QCL) with a first TRP (not shown). The second TCI state 908 may be QCL with a second TRP (not shown). At least two configurations (a.k.a., schemes) for TDM 900 may be supported.

In FIG. 9C, a first TDM configuration may be referred to as an intra-slot TDM configuration 914 (also referred to herein as TDM Scheme A). In the intra-slot TDM configuration 914, there may be two repetitions of a PDSCH when a TCI field indicates there are two TCI states (or a given codepoint corresponds to at least two TCI states and at least one mTRP configuration as exemplified herein). According to some aspects, a time domain resource allocation (TDRA) field may be used for a first repetition 916 of the PDSCH. The second repetition 918 may have the same length as the first repetition. A gap 920 between the two repetitions (exemplified in FIG. 9 as being two symbols in duration) may be configured.

In FIG. 9D, a second TDM configuration may be referred to as an inter-slot TDM configuration 922 (also referred to herein as TDM Scheme B). In the inter-slot TDM configuration 922, there may be up to sixteen repetitions of a PDSCH (across two TCI states). In the example of FIG. 9, the inter-slot TDM configuration 922 depicts eight repetitions (one in each of eight illustrated slots). The number of repetitions may be dynamically indicated as part of the TDRA. The TCI state pattern may be configurable. For example, the TCI state pattern in the example of the inter-slot TDM configuration 922 of FIG. 9 corresponds to the TCI state pattern of 12121212. Other TCI state patterns, such as for example and without limitation, 11221122, are within the scope of the disclosure.

Figure 10A:
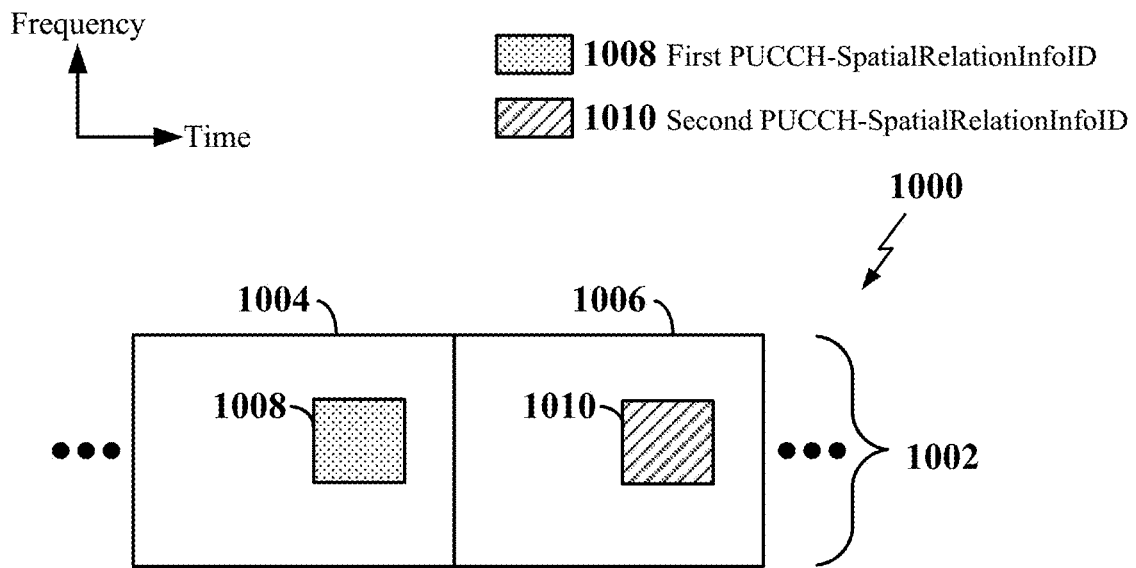
FIGS. 10A, 10B, and 10C are diagrammatic illustrations of three examples of TDM for physical uplink control channel (PUCCH) according to some aspects.
Figure 10B:
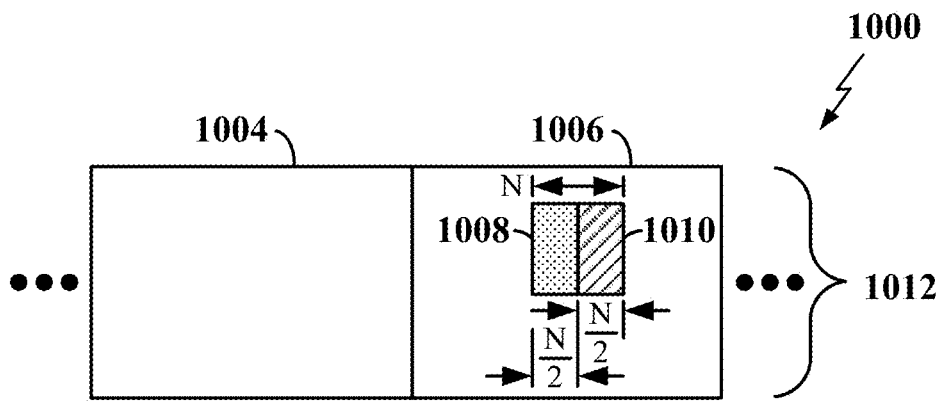
Figure 10C:
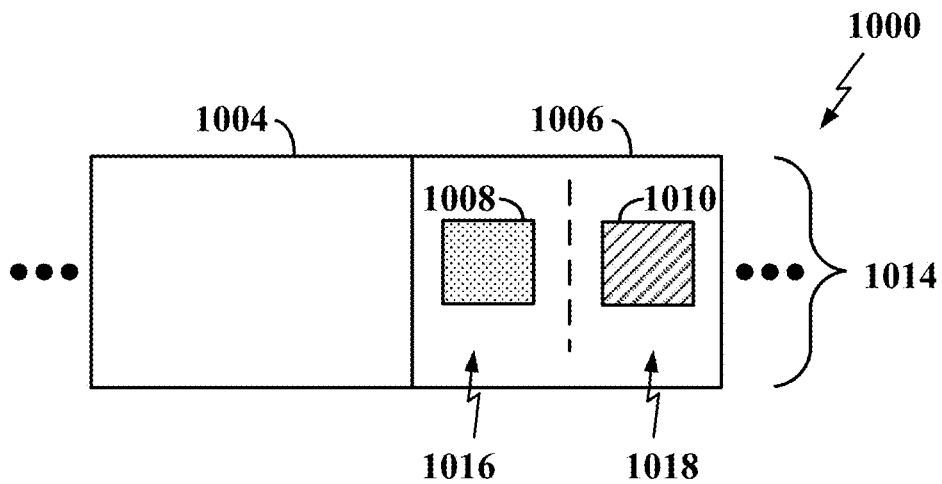

FIGS. 10A, 10B, and 10C are diagrammatic illustrations of three examples of time division multiplexing (TDM) 1000 for PUCCH according to some aspects. TDM 1000 for PUCCH may enable PUCCH transmission of the same uplink control information (UCI) to different TRPs for enhanced reliability. In FR2, the transmissions may have different beams (e.g., different spatial relations) and different transmission power, while in FR1, the transmissions have different transmission power, but a beam may not be defined or configured. Three different TDM configurations (also referred to herein as schemes) that may be used in an mTRP environment are illustrated in FIGS. 10A, 10B, and 10C, respectively.

In FIG. 10A, a first TDM mTRP for PUCCH configuration 1002 (also referred to herein as mTRP TDM for PUCCH Scheme 1), which supports mTRP inter-slot repetition, is illustrated. In the first TDM mTRP for PUCCH configuration 1002, a first PUCCH resource having a first PUCCH-SpatialRelationInfoID 1008 in a first slot 1004 carries UCI. The same PUCCH resource, depicted as a second PUCCH resource having a second PUCCH-SpatialRelationInfoID 1010 in a second slot 1006 carries a repetition of the UCI. The repetition may be carried in another one or more slots (different from the second slot 1006). The number of repetitions may be configured.

In FIG. 10B, a second TDM mTRP for PUCCH configuration 1012 (also referred to herein as TDM PUCCH Scheme 2), which supports mTRP intra-slot beam hopping, is illustrated. In the second TDM mTRP for PUCCH configuration 1012, N symbols are configured for a first transmission and a repetition of a UCI on a PUCCH resource in one slot. The example of the second TDM mTRP for PUCCH configuration 1012 is illustrated in the second slot 1006 for illustrative and non-limiting reasons. The first transmission of the UCI (in a PUCCH resource having a first PUCCH-SpatialRelationInfoID 1008) may be allotted N/2 symbols, and the retransmission of the UCI (in a PUCCH resource having a second PUCCH-SpatialRelationInfoID 1010) may be allotted the remaining N/2 symbols. The UCI may be transmitted in one PUCCH resource in which different sets of symbols within the PUCCH resource have different beams.

In FIG. 10C, a third TDM mTRP for PUCCH configuration 1014 (also referred to herein as TDM PUCCH Scheme 3), which supports mTRP intra-slot repetition, is illustrated. In the third TDM mTRP for PUCCH configuration 1014, a given slot (e.g., the second slot 1006) is divided into sub-slots (e.g., first sub-slot 1016 and second sub-slot 1018). The example of the third TDM mTRP for PUCCH configuration 1014 is illustrated in the second slot 1006 for illustrative and non-limiting reasons. In the example, a first PUCCH resource (having a first PUCCH-SpatialRelationInfoID 1008) in the first sub-slot 1016 of the second slot 1006 carries the first transmission of the UCI, the same PUCCH resource (having a second PUCCH-SpatialRelationInfoID 1010) in a second sub-slot 1018 of the second slot 1006 carries a repetition of the UCI. In general, the repetition of the UCI may be carried in any one or more sub-slots (except for the first sub-slot 1016) within the same slot as the first transmission of the UCI.

FIGS. 11A, 11B, 11C, and 11D are diagrammatic illustrations of a first example of mTRP SDM for PUSCH 1100, a second example of mTRP SDM for PUSCH 1101, an example of mTRP FDM for PUSCH 1102, and an example of mTRP TDM for PUSCH 1104, respectively, according to some aspects.

Figure 11A:
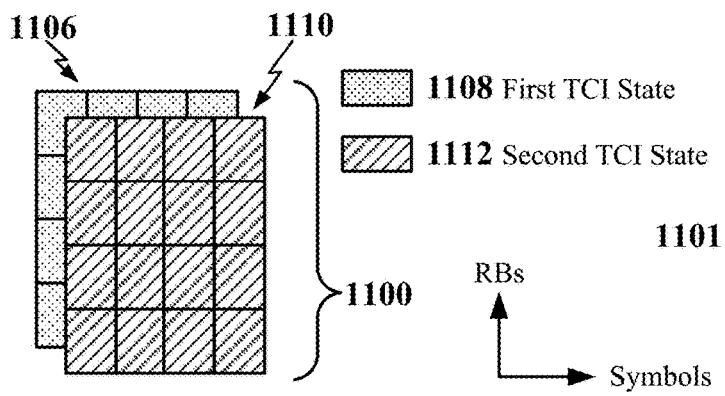
FIGS. 11A, 11B, 11C, and 11D are diagrammatic illustrations of examples of mTRP SDM for physical uplink shared channel (PUSCH), mTRP FDM for PUSCH, and mTRP TDM for PUSCH according to some aspects.

In FIG. 11A, a first example of mTRP SDM for PUSCH 1100 is illustrated according to some aspects. Two layers of OFDM resource grids for a rank combination of 1+1 are illustrated. A first layer 1106, which may correspond to a first TCI state 1108, may represent a first resource block set transmitted from an antenna array of a first TRP along a first path (not shown). A second layer 1110, which may correspond to a second TCI state 1112, may represent a second resource block set transmitted from an antenna array of a second TRP along a second path (not shown).

Figure 11B:
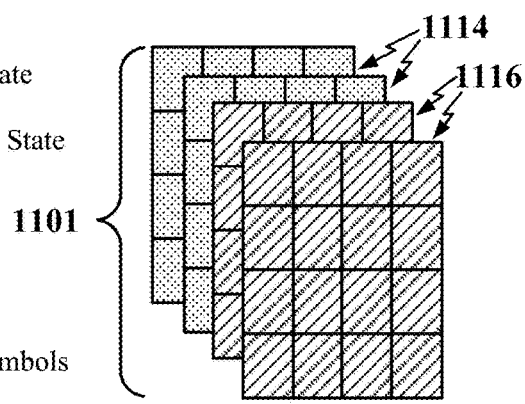

In FIG. 11B, a second example of mTRP SDM for PUSCH 1101 is illustrated according to some aspects. Four layers of OFDM resource grids for a rank combination of 2+2 are illustrated. The two first layers 1114, which may correspond the first TCI state 1108, may represent two resource block sets transmitted from an antenna array of a first TRP along a first path (not shown). The second two layers 1116, which may correspond to the second TCI state 1112, may represent two other resource block sets transmitted from an antenna array of a second TRP along a second path (not shown).

Figure 11C:
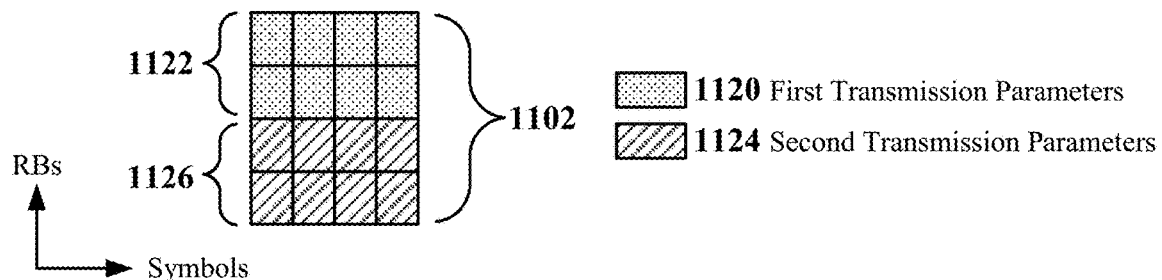

In FIG. 11C, an example of mTRP FDM for PUSCH 1102 is illustrated. Different sets of RBs may have different transmission parameters. Transmission parameters may include, but are not limited to, beam direction (e.g., spatial information), power control parameters, and/or precoding. For example, the first transmission parameters 1120 for associated with a first set of resource blocks 1122, may be different from the second transmission parameters 1124 associated with a second set of resource blocks 1126.

Figure 11D:
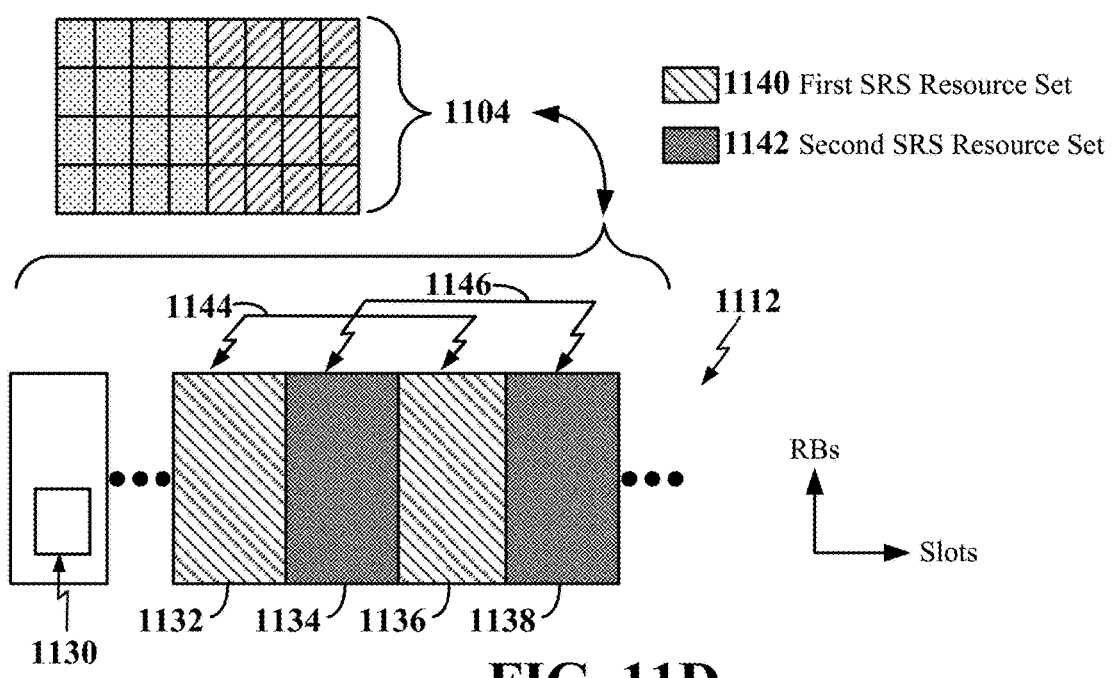

In FIG. 11D, an example of mTRP TDM for PUSCH 1104 is illustrated. In mTRP TDM for PUSCH 1104, a single DCI based PUSCH repetition in a TDM manner corresponding to different transmission parameters may be specified. For example, in FIG. 11, the single DCI may be represented by DCI 1130. In the example, the single DCI 1130 may schedule four PUSCH repetitions (e.g., first PUSCH repetition 1132, second PUSCH repetition 1134, third PUSCH repetition 1136, and fourth PUSCH repetition 1138). For example, the PUSCH repetitions (scheduled by the DCI 1130) may be associated with two SRS resource sets, referred to herein as a first SRS resource set 1140 and a second SRS resource set 1142. The first SRS resource set 1140 set may have a first beam/spatial relation, first power control parameters, and first precoding parameters, etc. The second SRS resource set 1142 set may have a second beam/spatial relation, second power control parameters, and second precoding parameters, etc. To enable the four repetitions of PUSCH 1132, 1134, 1136, 1138, the DCI 1130 may indicate two beams, two sets of power control, and two sets of precoding, etc. by two corresponding synchronization signal block (SSB) resource indicator (SRI) fields for both codebook based and non-codebook based scenarios. As illustrated in the mTRP TDM for PUSCH 1104, the DCI 1130 may specify a first set 1144 of two repetitions (associated with the first SRS resource set 1140) using a first beam and first set of power control parameters (e.g., targeted toward a first TRP (not shown)), and may specify a second set 1146 of two repetitions (associated with the second SRS resource set 1142) using a second beam and second set of power control parameters (e.g., targeted toward a second TRP (not shown)). The first SRS resource set 1140 may be associated with a first TCI, and the second SRS resource set 1143 may be associated with a second TCI. In the example of FIG. 11, the first PUSCH repetition 1132 and third PUSCH repetition 1136 may be associated with the first SRS resource set 1140, while the second PUSCH repetition 1134 and the fourth PUSCH repetition 1138 may be associated with the second SRS resource set 1142.

Beam indication (e.g., utilizing TCI states to indicate beams) may be handled in various ways. According to one example, TCI states may be defined for DL and UL signals/channels. For example, up to 128 TCI states may be RRC-configured. In one example, for PDCCH, one TCI state may be activated by MAC-CE per CORESET. In one example, for PDSCH, up to eight TCI states may be activated by a MAC-CE (e.g., a TCI state activation message herein) that is mapped to eight respective TCI codepoints. A first DCI (e.g., a beam indication DCI or a beam indication message herein) may indicate one of the activated TCI states via a TCI field (e.g., DCI formats 1_1 and 1_2), or a plurality of activated TCI states by indicating at least one TCI codepoint mapped to the activated TCI states. The indication by the first DCI may be for a scheduled PDSCH but may not be applicable to other PDSCHs. A second DCI (e.g., a scheduling DCI or a scheduling message herein) may schedule various beams of a UE according to the activated TCI states mapped to the at least one TCI codepoint, for example.

According to some aspects, for uplink, spatial relation information may be used (instead of TCI state) to define an uplink beam. According to such aspects, for PUCCH, one spatial relation information parameter may be activated by one MAC-CE per PUCCH resource. According to these aspects, for PUSCH, an SRI field in a scheduling DCI may point to one or more SRS resources (within a configured SRS resource set for codebook or non-codebook-based uplink), and the spatial relation information associated with the indicated SRS resource(s) may be used for the scheduled PUSCH. According to these aspects, for SRS, spatial relation information may be configured by RRC (for periodic-SRS (P-SRS)) or indicated by MAC-CE (for semi-persistent-SRS (SP-SRS) or aperiodic-SRS (AP-SRS)) per SRS resource.

In other examples, beam indication (e.g., utilizing TCI states to indicate beams) in association with an indication of a multiplexing configuration (also referred to as an mTRP configuration herein) may be utilized. The following examples may be realized for PDSCH with two TCI states and one multiplexing configuration. For SDM, two TCI states for two sets of layers (or two sets of DMRS ports) may be utilized. For FDM, two TCI states for two sets of RBs may be used. For intra-slot TDM, two TCI states for two repetitions within a slot may be utilized. For inter-slot TDM, two TCI states for multiple (two or more) repetitions in different slots may be used. TCI state indication for all the examples above may be via a TCI state activation message that maps the two TCI states and one mTRP configuration to one TCI codepoint, for example. Indication of the beams associated with the two TCI states via the one TCI codepoint may be made by a beam identification message that indicates at least one TCI codepoint, for example. A scheduling message may schedule the activated and indicated beams for the PDSCH, for example. According to some aspects, the TCI state indication message may map 1 or 2 TCI states to a given TCI codepoint. The TCI codepoint may be indicated by the beam indicating message. If the indicated TCI codepoint is mapped to two TCI states, a PDSCH with two TCI states is understood to be scheduled.

Other examples of beam indication may be utilized. For example, according to one aspect, PUCCH and/or PUSCH repetitions with different transmission parameters (e.g., different spatial relation information, different power control parameters) may be utilized. For example, for PUCCH, two spatial relation information parameters may be activated by MAC-CE per PUCCH resource. When a PUCCH repetition with n repetitions (in different slots or sub-slots) is configured (or scheduled), the two spatial relation information parameters may be activated for that PUCCH resource and may be applied to two sets of repetitions. According to some aspects, for PUSCH, a scheduling message (e.g., a scheduling DCI) may indicate whether scheduled PUSCH repetitions are associated with two SRS resource sets, and two SRI fields in the DCI (indirectly) may indicate the two spatial relation information parameters to be applied to two sets of repetitions.

According to aspects of a unified TCI, downlink TCI states, uplink TCI states, or joint downlink/uplink TCI states may be RRC-configured. According to such aspects, a TCI state activation message (e.g., a MAC-CE) may map a number of RRC-configured TCI states to TCI codepoints and may activate the mapped TCI states (e.g., activate the TCI codepoints). The mapping may take on the following exemplary and non-limiting examples. As a first example, one TCI field may represent a joint DL/UL TCI state and may be mapped to one TCI codepoint. This first example may be used for joint DL/UL beam indication. As a second example, one TCI field may represent a pair of a DL TCI state and an UL TCI state and may be mapped to one TCI codepoint. This second example may be utilized for separate DL/UL beam indications. As a third example, one TCI field may represent only a DL TCI state and may be mapped to one TCI codepoint. The third example may be utilized when only a DL beam indication is present. As a fourth example, one TCI field may represent only an UL TCI state and may be mapped to one TCI codepoint. The fourth example may be utilized when only an UL beam indication is present.

In some examples described herein, if a TCI state activation message (e.g., a MAC-CE), transmitted by a RAN entity, indicates that a single TCI codepoint maps to at least two TCI states and at least one mTRP configuration, that single TCI codepoint may serve as a beam indication. For example, as prompted by receipt of a beam scheduling message indicating the single TCI codepoint, a certain amount of time (e.g., 3 ms or Y symbols) after transmission of a HARQ-ACK in response to the receipt of the beam scheduling message, a user equipment may apply the beam indications associated with the indicated TCI codepoint to the repetitions of traffic on a PDSCH.

In some examples described herein, a plurality of TCI states may be configured to a UE via, for example, RRC signaling from a RAN entity. A TCI state activation message (e.g., a MAC-CE), transmitted by the RAN entity, may activate a subset of the plurality of TCI states (e.g., may activate at least a first TCI state and a second TCI state from the plurality of TCI states) and map the activated TCI states and at least one associated mTRP configurations to at least one TCI codepoint. In other words, the RAN entity may transmit a TCI state activation message, mapping at least a first TCI state, a second TCI state, and an mTRP configuration to a TCI codepoint, and activating the TCI codepoint (e.g., activating at least the first TCI state, the second TCI state, and the mTRP configuration).

Following the transmission of the TCI state activation message, the RAN entity may transmit a beam indication message (e.g., also referred to herein as a beam indication DCI) identifying at least one TCI codepoint, and therefore identifying at least a first beam (defined by a first TCI state), a second beam (defined by a second TCI state), and a multiplexing configuration (defined by an mTRP configuration), which are all mapped to the at least one TCI codepoint. In some examples, the beam indication message may serve only as a beam indicator (e.g., it may only assign beams for channels). For example, the beam indication message may or may not include resource assignments for PDSCH, PUCCH, or PUSCH. For example, in a scenario where the beam indication message is, or parameters related thereto are included in, a DCI, the DCI may or may not include channel scheduling information (e.g., resource assignments for PDSCH, PUCCH, PUSCH). As another example, the beam indication message may be a DCI format 1_1 (scheduling of one or multiple PDSCH in one cell, and/or triggering one-shot HARQ-ACK codebook feedback) or a DCI format 1_2 (scheduling of PDSCH in one cell), with or without a downlink assignment. In such a non-limiting example, the beam indication may be applied, for example, and without limitation, beginning in a first slot that is at a configurable time (e.g., 3 ms, or Y symbols) after a last symbol of a PUCCH carrying a HARQ-ACK that is transmitted in response to the receipt of the beam indication message. In some examples, the configurable time may be RRC-configured. In some examples, the configurable time may be based on UE capability.

In some examples described herein, a beam indication may remain as applied to the appropriate channels and/or signals until another beam indication is received (e.g., until a next beam indication message, a next beam indication DCI, a next DCI format 1_1, or a next DCI format 1_2) changes the beam indication. Accordingly, the beam indication may not be related to a scheduled PDSCH and may not be a one-time indication. In some examples, the beam indication may be for UL or for both DL and UL (even though the beam indication may be indicated in DCI formats 1_1 or 1_2). In some examples, the beam indication may be common for multiple DL channels and/or signals (e.g., PDSCH, PDCCH, CSI-RS) and/or multiple UL channels and/or signals (e.g., PUSCH, PUCCH, SRS).

FIGS. 12A and 12B are examples of a TCI state activation message 1200 (e.g., illustrated as a MAC-CE) and a related mTRP configuration table 1201, respectively, according to some aspects. Although the TCI state activation message 1200 is depicted as a MAC-CE, other mechanisms and/or signaling may be used to convey some or all of the information presented in the TCI state activation message 1200 of FIG. 12A. All such other mechanisms and/or signaling are within the scope of the disclosure. According to the aspect presented in FIG. 12A, the TCI state activation message 1200 may be eight bits wide and M octets in length, where M is a positive integer. However, these dimensions are exemplary; the TCI state activation message 1200 may have a variable width and/or a variable length.

The TCI state activation message 1200 may include a Serving Cell ID 1204 field. The Serving Cell ID 1204 field may indicate the identity of the serving cell for which the TCI state activation message 1200 applies. In the example, the length of the Serving Cell ID 1204 field is 5 bits. Other lengths are within the scope of the disclosure. The TCI state activation message 1200 may include a bandwidth part ID (BWP ID) 1206 field, the BWP ID 1206 filed may indicate a DL BWP for which the TCI state activation message 1200 applies. In the example, the length of the BWP ID 1206 field is 2 bits. Other lengths are within the scope of the disclosure.

The TCI state activation message 1200 may include a plurality of Ci 1208, 1220 fields. Each of the plurality of Ci 1208, 1220 fields may indicate whether the octet containing TCI state $ID_{i,2}$ is present, where $0 \le i \le 1$ plus the maximum number of TCI codepoints associated with the TCI state activation message 1200. In other words, each of the plurality of Ci 1208, 1220 fields may indicate whether a second TCI state is associated with an $i^{th}$ TCI codepoint. In one example, if the Ci 1208, 1220 field is set, the octet containing TCI state $ID_{i,2}$ is present. In the example, if the Ci 1208, 1220 field is not set, the octet containing TCI state $ID_{i,2}$ is not present.

The TCI state activation message 1200 may include a plurality of Di 1212, 1224 fields. Each of the plurality of Di 1212, 1224 fields may indicate whether at least one mTRP configuration is indicated in the next octet. If present, the at least one mTRP configuration in the next octet may be mapped to the same codepoint as the at least two TCI state IDs preceding the at least one mTRP configuration. In one example, if the Di 1212, 1224 field is set, the octet containing mTRP configuration $ID_i$ is present. In the example, if the Di 1212, 1224 field is not set, the octet containing mTRP configuration $ID_i$ is not present.

The TCI state activation message 1200 may include a plurality of TCI state $ID_i$ 1210, 1214, 1222, 1226 fields, where i is the index of the codepoint of TCI transmission configuration indication field and $0 \le i \le (1$ plus the maximum number of TCI codepoints associated with the TCI state activation message 1200) and $j=\{1, 2\}$. If more than two TCI states are mapped to a given TCI codepoint, then the set of j may be expanded to cover the additional TCI states. As shown in the example, each of the plurality of $ID_{i,j}$ 1210, 1214, 1222, 1226 fields indicate the TCI state identified by a TCI state ID. The TCI state $ID_{i,j}$ denotes the $j^{th}$ TCI state indicated for the $i^{th}$ codepoint in a transmission configuration indication field of a DCI (not shown), for example.

The TCI codepoint to which the TCI states are mapped may be determined by its ordinal position among all the TCI codepoints with sets of TCI state $ID_{i,j}$ fields. For example, TCI state $ID_{0,1}$ 1210, TCI state $ID_{0,2}$ 1214, and mTRP Configuration $ID_0$ 1218 may be mapped to the Pt TCI codepoint 1221 (which has a TCI codepoint index value (i) of 0); the next set of TCI state $ID_{1,1}$ (not shown), TCI state $ID_{i,2}$ (not shown), and mTRP configuration $ID_1$ (not shown) may be mapped to the $2^{nd}$ TCI codepoint (not shown) (which has the TCI codepoint index value of 1); the final set of the TCI state $ID_{1,1}$ 1222, TCI state $ID_{i,2}$ 1226, and mTRP Configuration $ID_i$ 1230 may be mapped to an $N^{th}$ TCI codepoint 1223 (which has a TCI codepoint value of 1) (for example only, i may be equal to 8). N may be the total number of TCI codepoints in the TCI state activation message 1200. The TCI state activation message 1200 may include an mTRP configuration $ID_i$ 1218, 1230 field. The mTRP configuration $ID_i$ 1218, 1230 field may indicate an mTRP configuration to be applied to the repetitions of the PDSCH, PUCCH, or PUSCH.

FIG. 12B provides one example of an mTRP configuration table 1201 that cross-references mTRP configuration IDs 1240 to mTRP configurations 1241. The TCI state activation message 1200 may include a plurality of reserved (R) 1202, 1216, 1228 fields. In the example, each R 1202, 1216, 1228 field is one bit. Other lengths of the R fields are within the scope of the disclosure. According to some aspects, the maximum number of activated TCI codepoints may be eight. At least two TCI states and at least one mTRP configuration may be mapped to at least one TCI codepoint.

FIG. 12B provides several examples of mTRP configurations cross referenced to mTRP configuration IDs. A table similar to that of FIG. 12B may be stored in a memory of a RAN entity. By way of example and not limitation, mTRP configuration ID 0 may correspond to a first FDM configuration for PDSCH 1242 (e.g., fdmSchemeA). The mTRP configuration ID 1 may correspond to a second FDM configuration for PDSCH 1243 (e.g., fdmSchemeB). The mTRP configuration ID 2 may correspond to an intra-slot TDM configuration for PDSCH 1244. The mTRP configuration ID 3 may correspond to an inter-slot TDM configuration for PDSCH 1245. The mTRP configuration ID 4 may correspond to an SDM configuration for PDSCH 1246. The mTRP configuration ID 5 may correspond to a first TDM repetition configuration for PUSCH 1247. The mTRP configuration ID 6 may correspond to a second TDM repetition configuration for PUSCH 1248. The mTRP configuration ID 7 may correspond to an inter-slot TDM repetition configuration for PUSCH 1249. The mTRP configuration ID X may correspond to a sub-slot TDM configuration for PUSCH 1250. The value of X may be a positive integer and generally represents the total number of mTRP configurations.

Instead of relying on RRC configurations to switch between the various mTRP FDM, TDM, and SDM configurations for PDSCH, PUSCH, and PUCCH, the switching between the different mTRP configurations may be accomplished using a combination of the mapping of TCI states and mTRP configurations to TCI codepoints, TCI state activation messages, beam indication messages, and/or scheduling messages as described herein. According to some aspects, the mapping of mTRP configurations (indexed in a table such as that of FIG. 12B) to TCI codepoints, as a way of enabling switching between the different mTRP configurations, may provide for faster switching for both DL and UL, in comparison to the use of RRC signaling to switch between the mTRP configurations.

Figure 13:
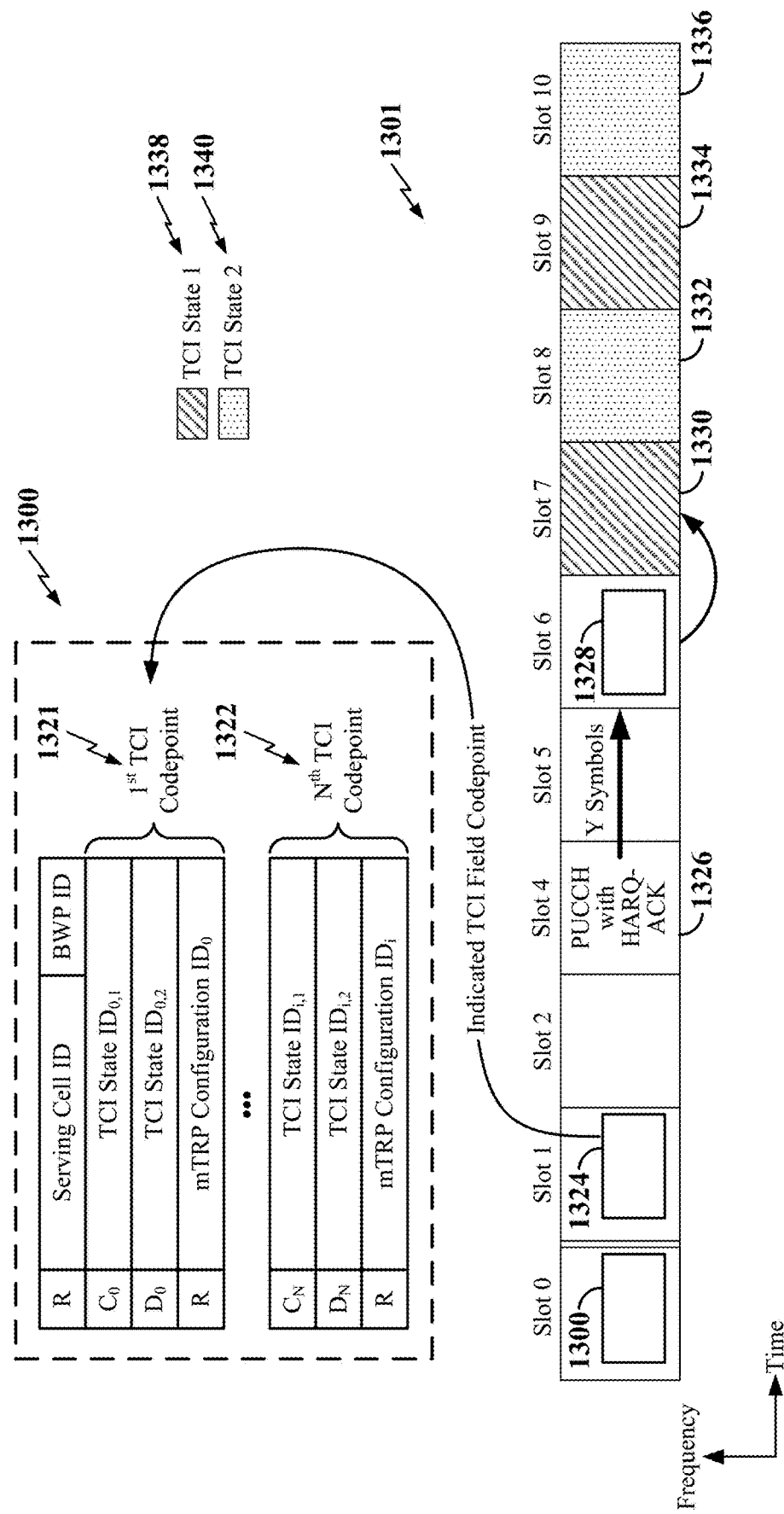
FIG. 13 is an example of TCI for flexible mTRP beam indication and multiplexing configurations according to some aspects.

FIG. 13 illustrates an example of transmission configuration indicator (TCI) for flexible multiple transmission and reception point (mTRP) beam indication and multiplexing configuration according to some aspects. FIG. 13 includes an example of a first TCI state activation message 1300 (e.g., a MAC-CE) as an inset to the figure. The example of the first TCI state activation message 1300 may be the same as or similar to the TCI state activation message 1200 of FIG. 12A. According to some aspects, a UE (not shown) may be configured with a plurality of TCI states (e.g., configured via RRC signaling (not shown)). A RAN entity, such as the RAN entity 514 of FIG. 5, may transmit the first TCI state activation message 1300. The first TCI state activation message 1300 may, for example, map at least a first TCI state, a second TCI state, and a first mTRP configuration to at least a first TCI codepoint, and may activate the at least the first TCI codepoint (e.g., activate at least the first TCI state, the second TCI state, and the first mTRP configuration).

For example, with i=0, the first TCI state activation message 1300 may indicate that TCI State $ID_{0,1}$, TCI State $ID_{0,2}$, and mTRP Configuration $ID_0$, are activated and mapped to a first TCI codepoint 1321. For the $N^{th}$ TCI codepoint, with i=x, the first TCI state activation message 1300 may also indicate that TCI State $ID_{x,1}$, TCI State $ID_{x,2}$, and mTRP Configuration ID, are activated and mapped to the $N^{th}$ TCI codepoint 1322, where N may be the total number of TCI codepoints in the first TCI state activation message 1300. Two TCI codepoints are provided for example and without limitation. One or more TCI codepoints in a TCI state activation message, such as the first TCI state activation message 1300, are within the scope of the disclosure.

The RAN entity may also transmit a beam indication message 1324. Through use of the beam indication message 1324, the RAN entity may indicate that at least some beams associated with some TCI states mapped to the first TCI codepoint 1321 may be used in association with a given channel or signal. For example, the RAN entity may transmit the beam indication message 1324, indicating the first TCI codepoint 1321 (corresponding to a first beam associated with TCI state $ID_{0,1}$ and a second beam associated with TCI state $ID_{0,2}$ and an mTRP configuration associated with mTRP configuration $ID_0$) to the UE. The UE may thus be informed that the beams corresponding to the first TCI codepoint 1321 may be utilized for a PDSCH, for example.

In some examples, the beam indication message may be a DCI, which includes, as part of its payload, a TCI configuration field, which may be populated with the identification of the TCI codepoint. Thus, in the preceding example, the TCI configuration field would indicate the first TCI codepoint 1321. In some examples, the DCI may be DCI configured according to a first DCI format or a second DCI format. The first DCI format may correspond to a DCI utilized to schedule a first PDSCH in a first cell or trigger a one-shot HARQ-ACK codebook feedback. For example, the first DCI format may be a DCI format 1_1. The second DCI format may correspond to a DCI that schedules a second PDSCH in a second cell. For example, the second DCI format may be a DCI format 1_2. Other DCI formats are within the scope of the disclosure.

According to some aspects, the beam indication message 1324 may or may not include scheduling information. For example, when DCI formats 1_1 or 1_2 are utilized (both associated with PDSCH), the beam indication message (e.g., the DCI formats 1_1 or 1_2) may or may not include PDSCH scheduling.

The UE (not shown) receiving the beam indication message 1324 may respond in a PUCCH with a HARQ-ACK 1326, for example at slot 4 of the OFDM resources 1301 as shown in FIG. 13. The HARQ-ACK 1326 may acknowledge the receipt of the beam indication message 1334.

The RAN entity may transmit a scheduling message 1328, different from the beam indication message 1324, to configure the UE to receive data on at least the first beam and the second beam, the data being multiplexed according to the first mTRP configuration, all as mapped to the first TCI codepoint 1321, for example, identified in the beam indication message 1324. For example, the RAN entity may transmit the scheduling message 1328 indicating scheduled resources corresponding to a first beam associated with the first TCI state and a second beam associated with the second TCI state. In one example, the scheduling message 1328 may configure the UE to receive a physical downlink shared channel (PDSCH) on the first beam (identified by the at least the first TCI state (e.g., TCI state $ID_{0,1}$ of the first TCI state activation message 1300)), the second beam (identified by the at least the second TCI state (e.g., TCI state $ID_{0,2}$ of the first TCI state activation message 1300)), according to the mTRP configuration (identified by the mTRP configuration $ID_0$ of the first TCI state activation message 1300).

In the example of FIG. 13, the mTRP configuration identified by the first TCI codepoint 1321 in the beam indication message 1324 might have been mTRP configuration ID 3, which is depicted in the mTRP configuration table 1201 of FIG. 12B as corresponding to an inter-slot TDM configuration for PDSCH. In the example illustrated in FIG. 13, the inter-slot TDM configuration for PDSCH is shown as having repetitions with a cyclic beam mapping pattern (i.e., 1, 2, 1, 2). According to some aspects, the beam indication applied to the DL channel(s)/signal(s) (e.g., PDSCH) may remain unchanged until a beam indication is received.

Figures 14A, 14B:
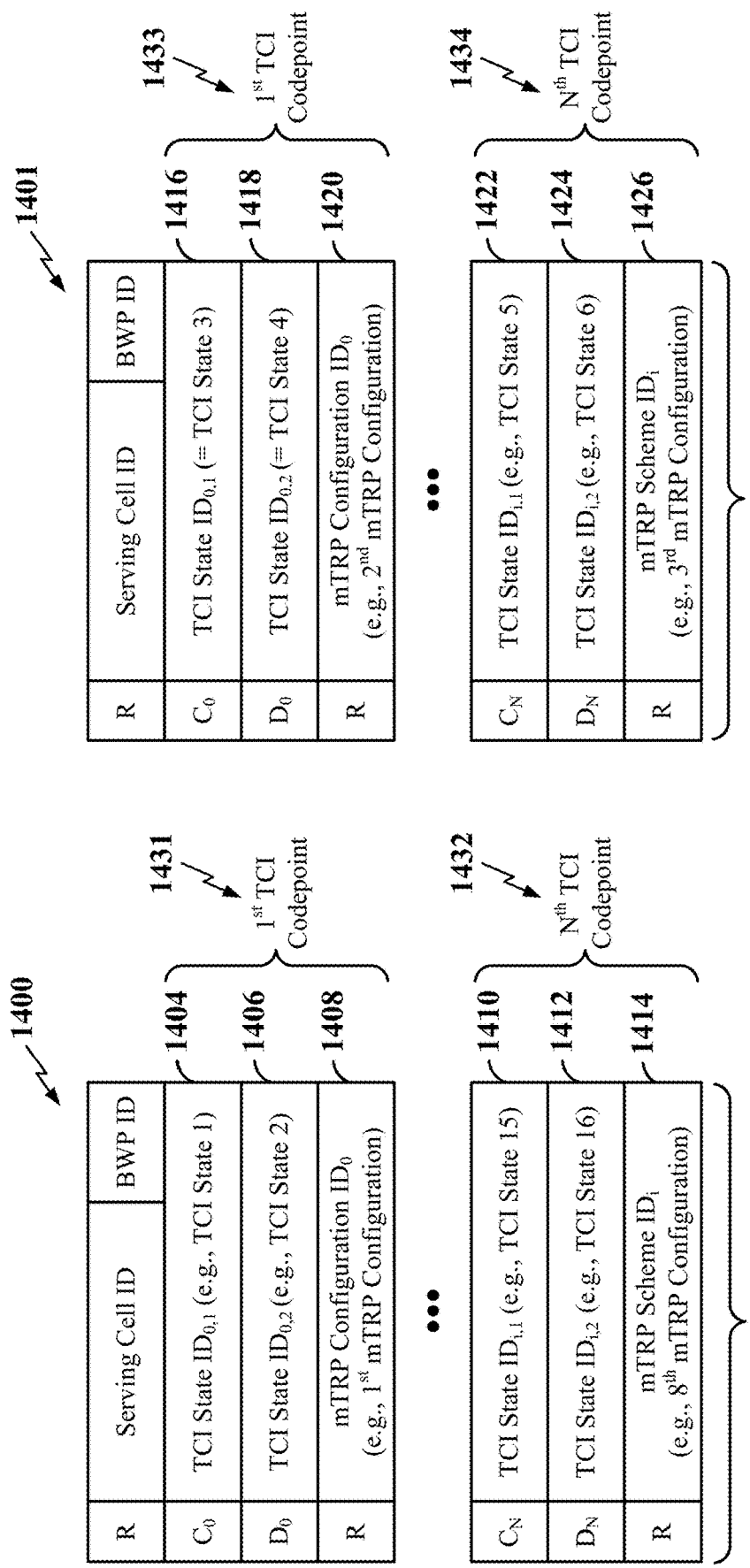
FIGS. 14A and 14B are examples of a first TCI state activation message and a second TCI state activation message according to some aspects.

FIGS. 14A and 14B are examples of a first TCI state activation message 1400 (e.g., a first MAC-CE) and a second TCI state activation message 1401 (e.g., a second MAC-CE) according to some aspects. According to some aspects, the first TCI state activation message 1400 may indicate or be understood as indicating that all TCI codepoints in the first TCI state activation message 1400 correspond to a first DCI format 1436, while the second TCI state activation message 1401 may indicate or be understood as indicating that all TCI codepoints in the second TCI state activation message 1401 correspond to a second DCI format 1437. For example, the first DCI format 1436 may be a DCI format 1_1 and the second DCI format 1437 may be a DCI format 1_2. Other DCI formats are within the scope of the disclosure. The fields R, Ci, Di, Serving Cell ID, BWP ID, and TCI state $ID_{i,j}$ are the same as those described in connection with FIG. 12A. Their descriptions will not be repeated for the sake of brevity.

According to some aspects, the first TCI state activation message 1400 and the second TCI state activation message 1401 may indicate various pluralities of TCI states and mTRP configurations mapped to various TCI codepoints. For example, in relation to any of the TCI codepoints 1431 through 1432 of FIG. 14A and the TCI codepoints 1433 through 1434 of FIG. 14B, each TCI codepoint may be mapped to at least two TCI states and at least one mTRP configuration. The two TCI states may be, for example, two DL TCI states, two UL TCI states, two DL TCI states and two UL TCI states, or two joint DL/UL TCI states. Of course, FIGS. 14A and 14B are non-limiting examples. Not all TCI codepoints may need to be mapped to two TCI states and one mTRP configuration. Other combinations of mappings of TCI states and mTRP configurations to TCI codepoints include, but are not limited to, mappings of one TCI state and no mTRP configurations to a TCI codepoint, mappings of one TCI state and one mTRP configuration to a TCI codepoint, and mappings of two or more TCI states and one or more mTRP configurations to a TCI codepoint.

According to one example, a radio access network (RAN) entity may transmit the first TCI state activation message 1400. The first TCI state activation message 1400 may map at least a first TCI state 1404, a second TCI state 1406, and a first mTRP configuration 1408 to at least a first TCI codepoint 1431, and may activate the at least the first TCI codepoint 1431 (e.g., activate at least the first TCI state 1404, the second TCI state 1406, and the first mTRP configuration 1408 of the first TCI state activation message 1400). According to some aspects, the first TCI state activation message 1400, including the at least the first TCI codepoint 1431, may correspond to a first DCI format 1436.

Still further, the RAN entity may also transmit the second TCI state activation message 1401. The second TCI state activation message 1401 may map at least a third TCI state 1416, a fourth TCI state 1418, and a second mTRP configuration 1420 to a second TCI codepoint (represented in this example as the first TCI codepoint 1433 of the second TCI state activation message 1401), and may activate the second TCI codepoint (e.g., activate at least the third TCI state 1416, the fourth TCI state 1418, and the second mTRP configuration 1420 of the second TCI state activation message 1401). According to some aspects, the second TCI state activation message 1401, including the second TCI codepoint (e.g., the first TCI codepoint 1433 of the second TCI state activation message 1401), may correspond to a second DCI format 1437. Still further, the RAN entity may transmit a beam indication message (e.g., 1324 of FIG. 13), indicating at least one of: the at least the first TCI codepoint 1431, or the second TCI codepoint (e.g., the first TCI codepoint 1433 of the second TCI state activation message 1401), to a UE, for example.

According to some examples, a value of the first TCI codepoint 1431 of the first TCI state activation message 1400 may be equal to a value of the second TCI codepoint (e.g., the first TCI codepoint 1433 of the second TCI state activation message 1401). According to such examples, the beam indication message may indicate one value corresponding to both the first TCI codepoint 1431 of the first TCI state activation message 1400 and the second TCI codepoint (e.g., the first TCI codepoint 1433 of the second TCI state activation message 1401). In other examples, the value of the first TCI codepoint 1431 of the first TCI state activation message 1400 may be different from the value of the second TCI codepoint (e.g., any one of the TCI codepoints 1433-1434 of the second TCI state activation message 1401). For example, the beam indication message may indicate the first TCI codepoint 1431 of the first TCI state activation message 1400 and a third TCI codepoint (e.g., a TCI codepoint other than the first TCI codepoint 1433). According to some aspects, a total number of TCI codepoints, N, in the first TCI state activation message 1400 may equal a total number of TCI codepoints in the second TCI state activation message 1401, as shown in FIGS. 14A and 14B. However, FIGS. 14A and 14B are non-limiting examples and, in other examples (not shown) the total number of TCI codepoints in the first TCI state activation message 1400 may be unequal to the total number of TCI codepoints in the second TCI state activation message 1401.

In more detail, and by way of example and not limitation, in FIG. 14A, the first TCI state activation message 1400 maps TCI state $ID_{0,1}$ (e.g., the first TCI state 1404), TCI state $ID_{0,2}$ (e.g., the second TCI state 1406), and mTRP configuration $ID_0$ (e.g., the first mTRP configuration 1408) to the first TCI codepoint 1431. For i=x, the first TCI state activation message 1400 also maps TCI state $ID_{x,1}$ (e.g., the $15^{th}$ TCI state 1410), TCI state $ID_{0,2}$ (e.g., the $16^{th}$ TCI state 1412), and mTRP configuration $ID_x$ (e.g., the $8^{th}$ mTRP configuration 1414) to the $N^{th}$ TCI codepoint 1432, where N is the total number of TCI codepoints and i is an index number. All TCI states, mTRP configurations, and TCI codepoints in the first TCI state activation message 1400 may correspond to a first DCI format (e.g., DCI format 1_1). In FIG. 14B, the second TCI state activation message 1401 maps its TCI state $ID_{0,1}$ (e.g., the third TCI state 1416), TCI state $ID_{0,2}$ (e.g., the fourth TCI state 1418), and mTRP configuration $ID_0$ (e.g., second mTRP configuration 1420) to its first TCI codepoint 1433. For i=x, the second TCI state activation message 1401 also maps its TCI state $ID_{x,1}$ (e.g., the $5^{th}$ TCI state 1422), TCI state $ID_{x,2}$ (e.g., the $6^{th}$ TCI state 1424), and mTRP configuration $ID_x$ (e.g., the 3rd mTRP configuration 1426) to the $N^{th}$ TCI codepoint 1434. All TCI states, mTRP configurations, and TCI codepoints in the second TCI state activation message 1401 may correspond to a second DCI format (e.g., DCI format 1_2). The numbers (e.g., 1, 2, 3, 4, 5, 6, 15, and 16) attributed to the various TCI states, mTRP configurations, and TCI codepoints are provided for explanatory purposes only and are non-limiting.

Figure 15:
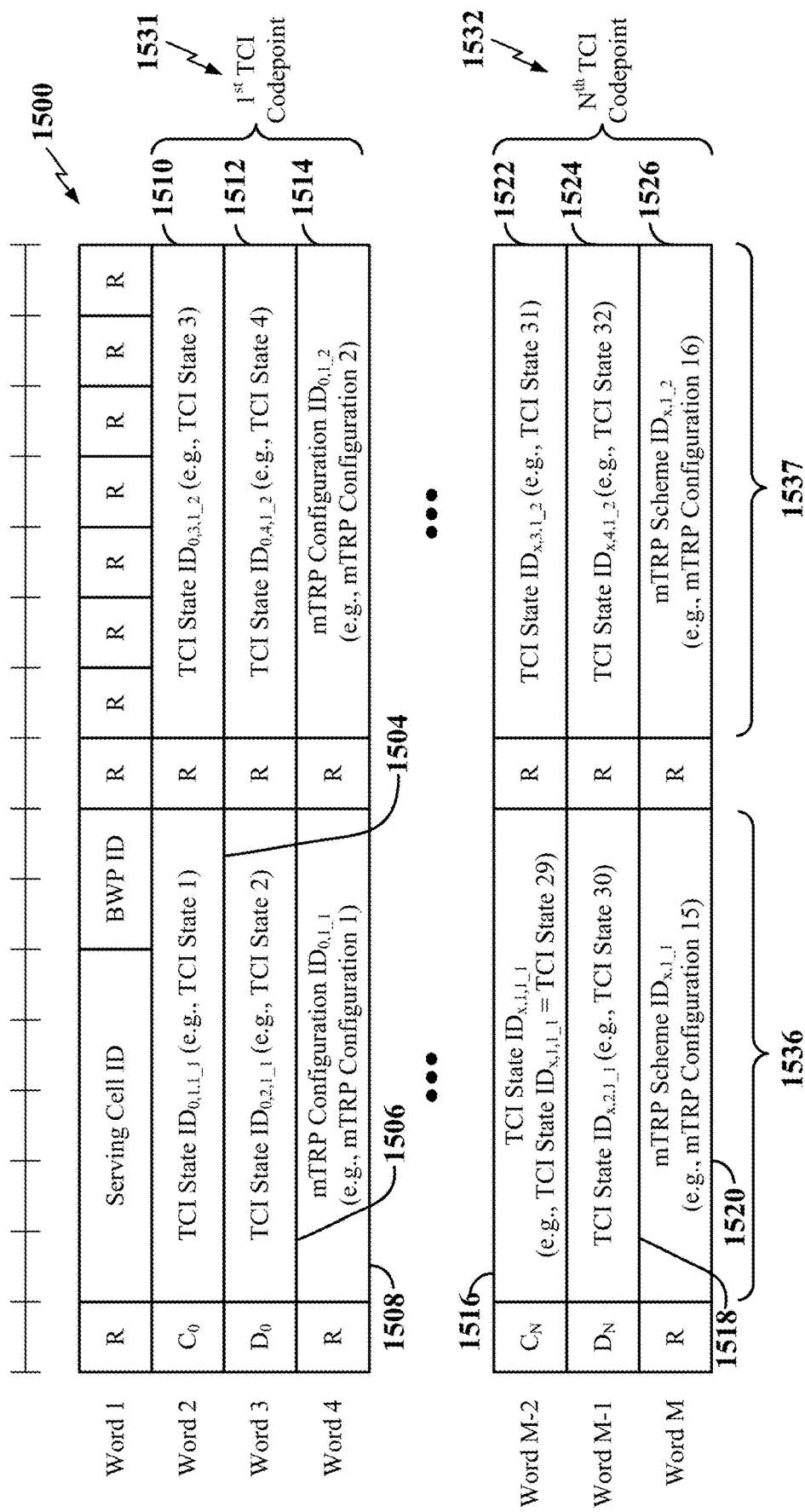
FIG. 15 is an example of a first TCI state activation message according to some aspects.

FIG. 15 is an example of a first TCI state activation message 1500 (e.g., a first MAC-CE) according to some aspects. According to one example, a radio access network (RAN) entity may transmit the first TCI state activation message 1500. The first TCI state activation message 1500 may map at least a first TCI state 1504, a second TCI state 1506, a first mTRP configuration 1508, a third TCI state 1510, a fourth TCI state 1512, and a second mTRP configuration 1514 to at least a first TCI codepoint 1531. The first TCI state activation message 1500 may also activate the at least the first TCI codepoint 1531 (e.g., activate the at least the first TCI state 1504, the second TCI state 1506, the first mTRP configuration 1508, the third TCI state 1510, the fourth TCI state 1512, and the second mTRP configuration 1514 of the first TCI state activation message 1500). According to some aspects, the at least the first TCI state 1504, the second TCI state 1506, and the first mTRP configuration 1508 of the first TCI codepoint 1531 of the first TCI state activation message 1500 may correspond to a first DCI format 1536. Still further, the third TCI state 1510, the fourth TCI state 1512, and the second mTRP configuration 1514 of the first TCI codepoint 1531 of the first TCI state activation message 1500 may correspond to a second DCI format 1537. The first DCI format 1536 may be different from the second DCI format 1537. For example, the first DCI format 1536 may be a DCI format 1_1 and the second DCI format 1537 may be a DCI format 1_2. Other DCI formats are within the scope of the disclosure. Still further, the RAN entity may transmit a beam indication message (e.g., 1624 of FIG. 16), indicating the at least the first TCI codepoint 1531, to a UE, for example.

The fields R, Ci, Di, Serving Cell ID, and BWP ID are the same or similar to those described in FIG. 12A. Their descriptions will not be repeated for the sake of brevity. In FIG. 15, the parameter TCI State $ID_{i,j,f}$ is used, where: i is an index of a codepoint (e.g., i=0-7 for codepoint 1-codepoint 8, respectively), j is the jth TCI state indicated for the ith codepoint. For example, j={1, 2, 3, 4} in cases where each codepoint maps to four TCI states. Sets of j that are smaller than four or larger than four are within the scope of the disclosure. The value of f corresponds to a DCI format identification. DCI formats 1_1 and 1_2 are given as examples. Other DCI formats are within the scope of the disclosure. The field Ci, field indicates whether the words (each word corresponding to two octets) including TCI states $ID_{i,2,f}$, $ID_{i,3,f}$, $ID_{i,4,f}$ are present. In one example, if this field is set, the words including TCI states $ID_{i,2,f}$, $ID_{i,3,f}$, $ID_{i,4,f}$ are present. In this example, if this field is not set, the words including TCI states $ID_{i,2,f}$, $ID_{i,3,f}$, $ID_{i,4,f}$ are not present. The parameter mTRP Configuration $ID_{i,f}$ is used, where: i is the index of the codepoint, and the value of f corresponds to a DCI format indication. N may be the total number of TCI codepoints in the first TCI state activation message 1500.

In more detail, in word 2, word 3, and word 4 of FIG. 15, the first TCI state activation message 1500 maps TCI state $ID_{0,1,1\_1}$ (e.g., the first TCI state 1504), TCI state $ID_{0,2,1\_1}$ (e.g., the second TCI state 1506), and mTRP configuration $ID_{0,1\_1}$ (e.g., the first mTRP configuration 1508), all corresponding to a first DCI format 1536 (e.g., DCI format 1_1), to the first TCI codepoint 1531, and also maps TCI state $ID_{0,3,1\_2}$ (e.g., the third TCI state 1510), TCI state $ID_{0,4,1\_2}$ (e.g., the fourth TCI state 1512), and mTRP configuration $ID_{0,1\_2}$ (e.g., the second mTRP configuration 1514), all corresponding to a second DCI format 1537 (e.g., DCI format 1_2) to the first TCI codepoint 1531. For i=x, for example, in word M-2, word M-1, and word M of FIG. 15, the first TCI state activation message 1500 maps TCI state $ID_{x,1,1\_1}$ (e.g., the 29th TCI state 1516), TCI state $ID_{x,2,1\_1}$ (e.g., the $30^{th}$ TCI state 1518), and mTRP configuration $ID_{x,1\_1}$ (e.g., the $15^{th}$ mTRP configuration 1520), all corresponding to the first DCI format 1536 (e.g., DCI format 1_1), to the $N^{th}$ TCI codepoint 1532, and also maps TCI state $ID_{X,3,1\_2}$ (e.g., the $31^{st}$ TCI state 1522), TCI state $ID_{X,4,1\_2}$ (e.g., the $32^{nd}$ TCI state 1524), and mTRP configuration (e.g., the $16^{th}$ mTRP configuration 1526), all corresponding to the second DCI format 1537 (e.g., DCI format 1_2) to the $N^{th}$ TCI codepoint 1532 of the first TCI state activation message 1500.

Figure 16:
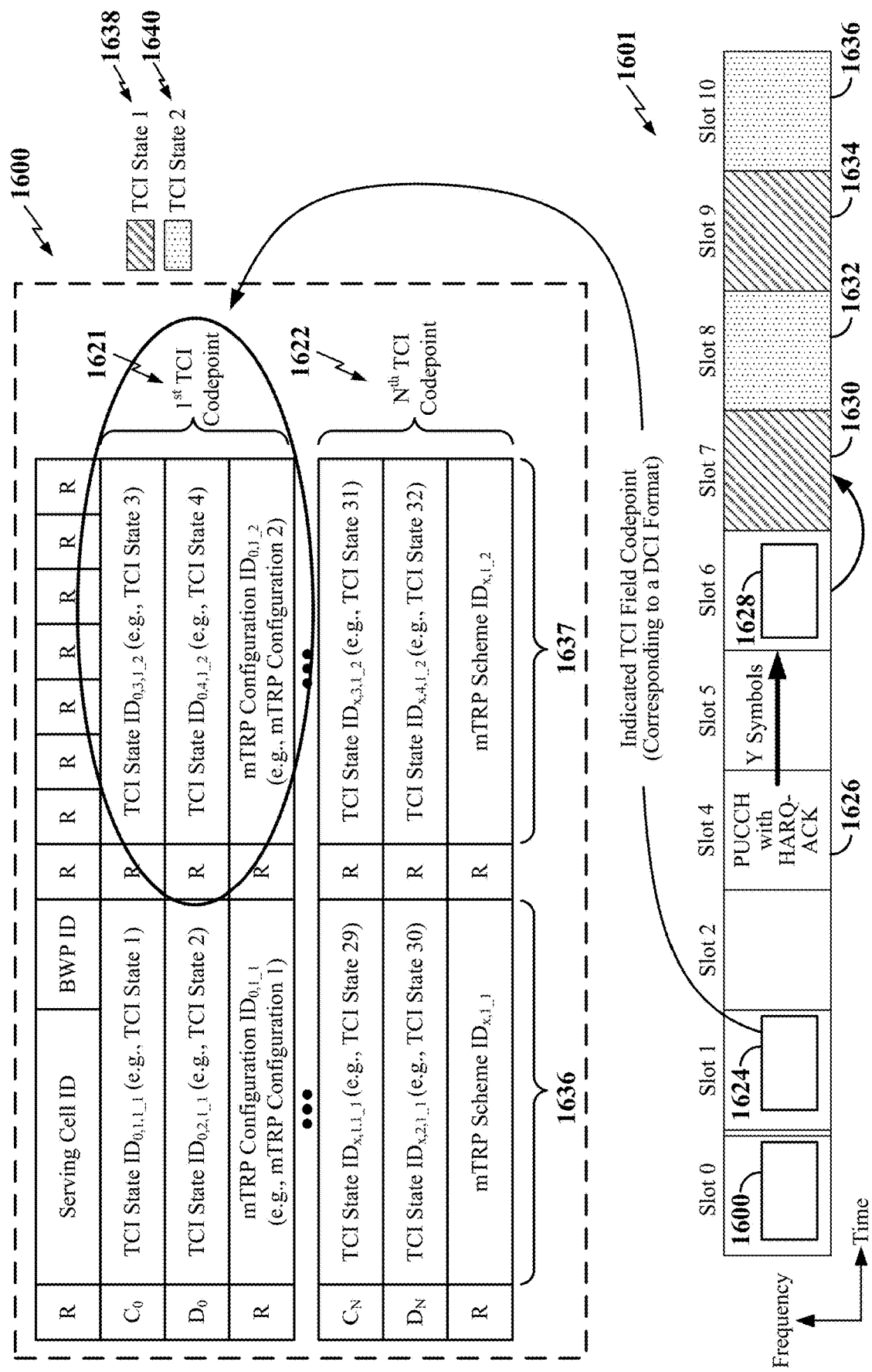
FIG. 16 illustrates an example of transmission configuration indicator (TCI) for flexible multiple transmission and reception point (mTRP) beam indication and multiplexing configuration according to some aspects.

FIG. 16 illustrates an example of transmission configuration indicator (TCI) for flexible multiple transmission and reception point (mTRP) beam indication and multiplexing configuration according to some aspects. FIG. 16 includes an example of a first TCI state activation message 1600 (e.g., a MAC-CE) as an inset to the figure. The example of the first TCI state activation message 1600 may be the same as or similar to the TCI state activation message 1500 of FIG. 15. According to some aspects, a UE (not shown) may be configured with a plurality of TCI states (e.g., configured via RRC signaling (not shown)). A RAN entity, such as the RAN entity 514 of FIG. 5, may transmit the first transmission configuration indicator (TCI) state activation message 1600, the first TCI state activation message 1600 may map at least a first TCI state, a second TCI state, a first mTRP configuration, a third TCI state, a fourth TCI state, and a second mTRP configuration to at least a first TCI codepoint 1621. The first TCI state activation message 1600 may also activate the at least the first TCI codepoint (e.g., activate the at least the first TCI state, the second TCI state, the first mTRP configuration, the third TCI state, the fourth TCI state, and the second mTRP configuration of the first TCI state activation message 1600 associated with the first TCI codepoint 1621). According to some aspects, the at least the first TCI state, the second TCI state, and the first mTRP configuration of the first TCI codepoint 1621 of the first TCI state activation message 1600 may correspond to a first DCI format 1636. Still further, the third TCI state, the fourth TCI state, and the second mTRP configuration of the first TCI codepoint 1621 of the first TCI state activation message 1600 may correspond to a second DCI format 1637. The first TCI state activation message may also map at least a third TCI state, a fourth TCI state, and a second mTRP configuration to a second TCI codepoint. Still further, the first TCI state activation message may activate the second TCI codepoint (e.g., activate at least the third TCI state, the fourth TCI state, and the second mTRP configuration). The first DCI format 1636 may be different from the second DCI format 1637. For example, the first DCI format 1636 may be a DCI format 1_1 and the second DCI format 1637 may be a DCI format 1_2. Other DCI formats are within the scope of the disclosure. According to some aspects, the RAN entity may transmit a beam indication message indicating the at least the first TCI codepoint 1621.

For example, with i=0, the first TCI state activation message 1600 may indicate that TCI State $ID_{0,1,1\_1}$, TCI State $ID_{0,2,1\_1}$, mTRP Configuration $ID_{0,1\_1}$, TCI State $ID_{0,3,1\_2}$, TCI State $ID_{0,4,1\_2}$, and mTRP Configuration $ID_{0,1\_2}$ are activated and mapped to the first TCI codepoint 1621. For i=x, the first TCI state activation message 1600 may also indicate that TCI State TCI State and mTRP Configuration TCI State $ID_{x,3,1\_2}$, TCI State $ID_{x,4,1\_2}$, and mTRP Configuration $ID_{x,1\_2}$ are activated and mapped to the $N^{th}$ TCI codepoint 1622, where N may be the total number of TCI codepoints in the first TCI state activation message 1600. Two TCI codepoints are provided for example and without limitation. One or more TCI codepoints in a TCI state activation message, such as the first TCI state activation message 1600, are within the scope of the disclosure.

The RAN entity may also transmit a beam indication message 1624. Through use of the beam indication message 1624, the RAN entity may indicate that at least some beams associated with some TCI states mapped to the first TCI codepoint 1621 may be used in association with a given channel or signal. For example, the RAN entity may transmit the beam indication message 1624, indicating the first TCI codepoint 1621, to the UE. The UE may thus be informed that the beams corresponding to the first TCI codepoint 1621 may be utilized for a PDSCH, for example.

In some examples, the beam indication message may be a DCI, which includes, as part of its payload, a TCI configuration field, which may be populated with the identification of the TCI codepoint. Thus, in the preceding example, the TCI configuration field would indicate the first TCI codepoint 1621.

The UE (not shown) receiving the beam indication message 1624 may respond in a PUCCH with a HARQ-ACK 1626, for example at slot 4 of the OFDM resources 1601 as shown in FIG. 16. The HARQ-ACK 1626 may acknowledge the receipt of the beam indication message 1634.

The RAN entity may transmit a scheduling message 1628, different from the beam indication message 1624, to configure the UE to receive data on at least the first beam and the second beam, the data being multiplexed according to the first mTRP configuration, all as mapped to the first TCI codepoint 1621, for example, identified in the beam indication message 1624. For example, the RAN entity may transmit the scheduling message 1628 indicating scheduled resources corresponding to a first beam associated with the first TCI state, a second beam associated with the second TCI state, a third beam associated with the third TCI state, and a fourth beam associated with the fourth TCI state. In one example, the scheduling message 1628 may configure the UE to receive a physical downlink shared channel (PDSCH) according to the second DCI format 1637 on the third beam (corresponding to the third TCI state (e.g., TCI state $ID_{0,3,1\_2}$)) and the fourth beam (identified by fourth TCI state (e.g., TCI state $ID_{0,4,1\_2}$)), and according to the mTRP configuration (identified by the mTRP configuration $ID_{0,1\_2}$) all of the first TCI codepoint 1621 of the first TCI state activation message 1600.

In the example of FIG. 16, as graphically illustrated, the third TCI state (e.g., 1510 of FIG. 15), the fourth TCI state (e.g., 1512 of FIG. 15), and the second mTRP configuration (e.g., 1514 or FIG. 15), all associated with the second DCI format 1637 and all identified by the first TCI codepoint 1621 in the beam indication message 1624 might have been mTRP configuration ID 3, which is depicted in the mTRP configuration table 1201 of FIG. 12B as corresponding to an inter-slot TDM configuration for PDSCH. In the example illustrated in FIG. 16, the inter-slot TDM configuration for PDSCH is shown as having repetitions with a cyclic beam mapping pattern (i.e., 1, 2, 1, 2). According to some aspects, the beam indication applied to the DL channel(s)/signal(s) (e.g., PDSCH) may remain unchanged until a beam indication is received.

Figure 17:
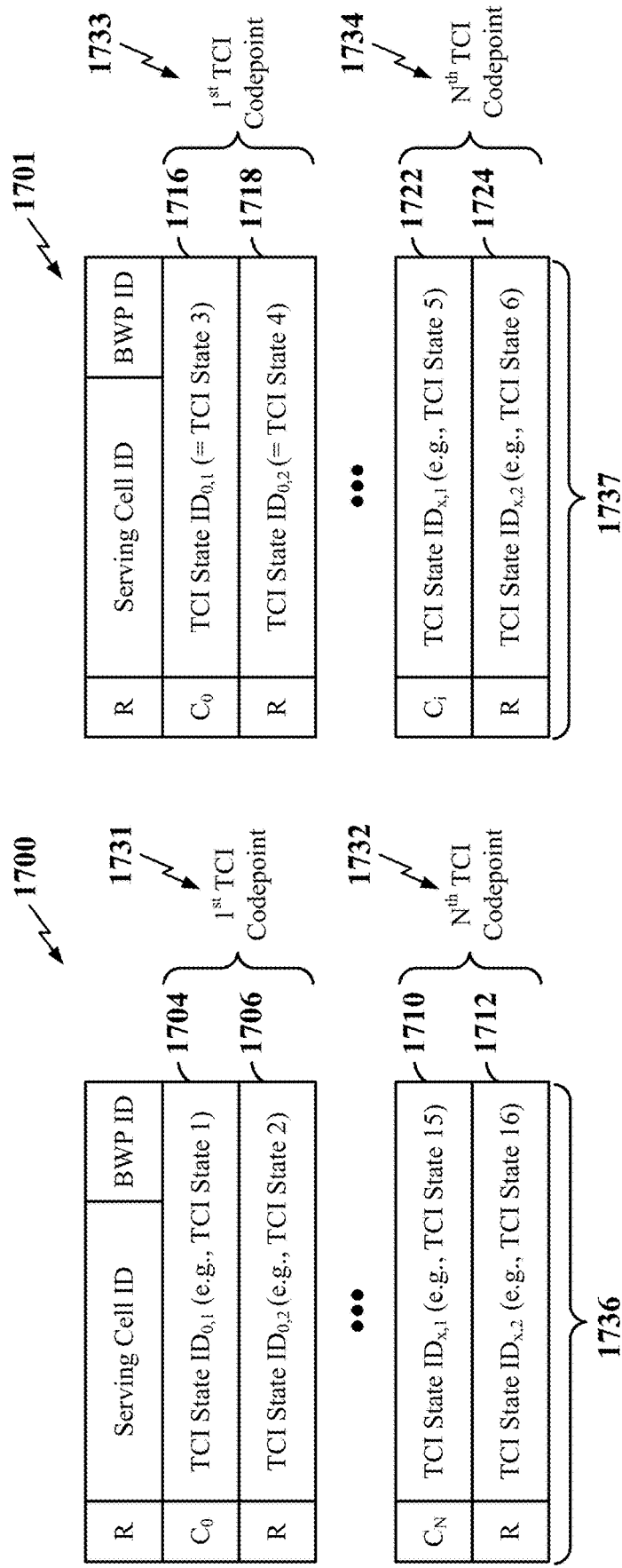
FIGS. 17A and 17B are examples of a first TCI state activation message and a second TCI state activation message according to some aspects.

FIGS. 17A and 17B are examples of a first TCI state activation message 1700 (e.g., a first MAC-CE) and a second TCI state activation message 1701 (e.g., a second MAC-CE) according to some aspects. According to some aspects, the first TCI state activation message 1700 may indicate or be understood as indicating that all TCI codepoints in the first TCI state activation message 1700 correspond to a first DCI format 1736, while the second TCI state activation message 1701 may indicate or be understood as indicating that all TCI codepoints in the second TCI state activation message 1701 correspond to a second DCI format 1737. For example, the first DCI format 1736 may be a DCI format 1_1 and the second DCI format 1737 may be a DCI format 1_2. Other DCI formats are within the scope of the disclosure. The fields R, Ci, Serving Cell ID, BWP ID, and TCI state $ID_{i,j}$ are the same or similar to those described in connection with FIG. 12A. Their descriptions will not be repeated for the sake of brevity.

According to some aspects, the first TCI state activation message 1700 and the second TCI state activation message 1701 may indicate various pluralities of TCI states mapped to various TCI codepoints. For example, in relation to any of the TCI codepoints 1731 through 1732 of FIG. 17A and the TCI codepoints 1733-1734 of FIG. 17B, each TCI codepoint may be mapped to at least two TCI states. The two TCI states may be, for example, two DL TCI states, two UL TCI states, two DL TCI states and two UL TCI states, or two joint DL/UL TCI states. Of course, FIGS. 17A and 17B are non-limiting examples. Not all TCI codepoints may need to be mapped to two TCI states. Other mapping of TCI states to TCI codepoints include, but are not limited to, mappings of one, two, or more TCI states to one TCI codepoint.

According to one example, a radio access network (RAN) entity may transmit the first TCI state activation message 1700. The first TCI state activation message 1700 may map at least a first TCI state 1704 and a second TCI state 1706 to at least a first TCI codepoint 1731. The first TCI state activation message 1700 may also activate the at least the first TCI codepoint 1731 (e.g., may activate at least the first TCI state 1704 and the second TCI state 1706 of the first TCI state activation message 1700). According to some aspects, the first TCI state activation message 1700, including the first TCI codepoint 1731, may correspond to a first DCI format 1736.

Still further, the RAN entity may also transmit the second TCI state activation message 1701. The second TCI state activation message 1701 may map at least a third TCI state 1716 and a fourth TCI state 1718 to a second TCI codepoint (represented in this example as the first TCI codepoint 1733 of the second TCI state activation message 1701), and may activate the second TCI codepoint (e.g., activate at least the third TCI state 1716 and the fourth TCI state 1718 of the second TCI state activation message 1701). According to some aspects, the second TCI state activation message 1701, including the second TCI codepoint (e.g., the first TCI codepoint 1733 of the second TCI state activation message 1701), may correspond to a second DCI format 1737. Still further, the RAN entity may transmit a beam indication message (e.g., similar to 1324 of FIG. 13, 1624 of FIG. 16), indicating the at least one of: the first TCI codepoint 1731, or the second TCI codepoint (e.g., the first TCI codepoint 1733 of the second TCI state activation message 1701) to a UE, for example.

According to some examples, a value of the first TCI codepoint 1731 of the first TCI state activation message 1700 may be equal to a value of the second TCI codepoint (e.g., the first TCI codepoint 1733 of the second TCI state activation message 1701).

According to such examples, the beam indication message may indicate one value corresponding to both the first TCI codepoint 1731 of the first TCI state activation message 1700 and the second TCI codepoint (e.g., the first TCI codepoint 1733 of the second TCI state activation message 1701). In other examples, the value of the first TCI codepoint 1731 of the first TCI state activation message 1700 may be different from the value of the second TCI codepoint (e.g., any one of the TCI codepoints 1733-1734 of the second TCI state activation message 1701). For example, the beam indication message may indicate the first TCI codepoint 1731 of the first TCI state activation message 1700 and a third TCI codepoint (e.g., a TCI codepoint other than the first TCI codepoint 1733). According to some aspects, a total number, N, of TCI codepoints in the first TCI state activation message 1700 may equal a total number of TCI codepoints in the second TCI state activation message 1701, as shown in FIGS. 17A and 17B. However, FIGS. 17A and 17B are non-limiting examples and, in other examples (not shown) the total number of TCI codepoints in the first TCI state activation message 1700 may be unequal to the total number of TCI codepoints in the second TCI state activation message 1701.

In more detail, and by way of example and not limitation, in FIG. 17A, the first TCI state activation message 1700 maps TCI state $ID_{0,1}$ (e.g., the first TCI state 1704) and TCI state $ID_{0,2}$ (e.g., the second TCI state 1706) to the first TCI codepoint 1731. For i=x, the first TCI state activation message 1700 also maps TCI state $ID_{x,1}$ (e.g., the 15$^{th}$ TCI state 1710) and TCI state $ID_{x,2}$ (e.g., the 16$^{th}$ TCI state 1712) to the N$^{th}$ TCI codepoint 1732, where N is the total number of TCI codepoints and i is an index number. All TCI states, mTRP configurations, and TCI codepoints in the first TCI state activation message 1700 may correspond to a first DCI format (e.g., DCI format 1_1). In FIG. 17B, the second TCI state activation message 1701 maps its TCI state $ID_{0,1}$ (e.g., the third TCI state 1716), TCI state $ID_{0,2}$ (e.g., the fourth TCI state 1718), and mTRP configuration $ID_0$ (e.g., second mTRP configuration 1720) to its first TCI codepoint 1733. For i=x, the second TCI state activation message 1701 also maps its TCI state $ID_{x,1}$ (e.g., the 5$^{th}$ TCI state 1722) and TCI state $ID_{x,2}$ (e.g., the 6$^{th}$ TCI state 1724) to the N$^{th}$ TCI codepoint 1734. All TCI states, mTRP configurations, and TCI codepoints in the second TCI state activation message 1701 may correspond to a second DCI format (e.g., DCI format 1_2). The numbers (e.g., 1, 2, 3, 4, 5, 6, 15, and 16) attributed to the various TCI states, mTRP configurations, and TCI codepoints are provided for explanatory purposes only and are non-limiting.

Figure 18:
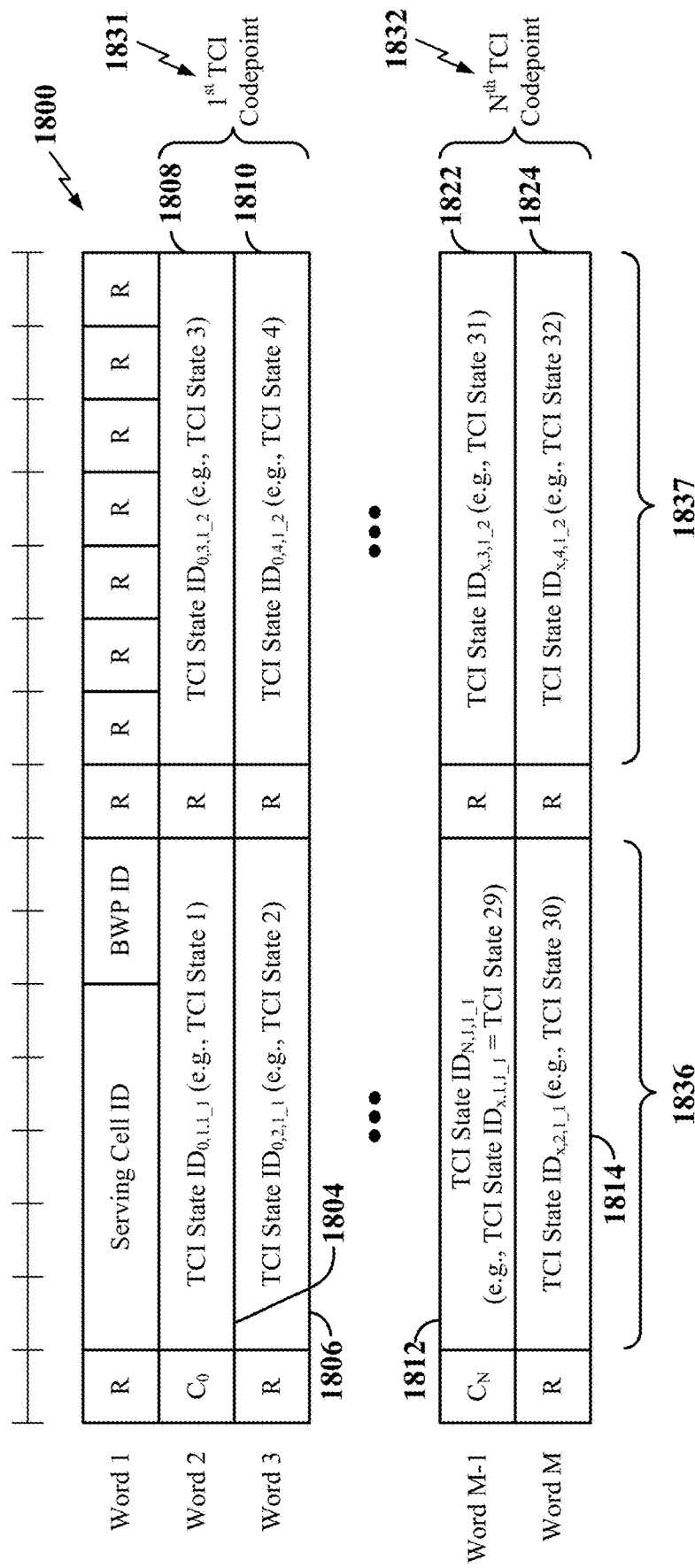
FIG. 18 is an example of a first TCI state activation message according to some aspects.

FIG. 18 is an example of a first TCI state activation message 1800 (e.g., a first MAC-CE) according to some aspects. According to one example, a radio access network (RAN) entity may transmit the first TCI state activation message 1800. The first TCI state activation message 1800 may map at least a first TCI state 1804, a second TCI state 1806, a third TCI state 1808, and a fourth TCI state 1810 to at least a first TCI codepoint 1831 of the first TCI state activation message 1800, and may activate the first TCI codepoint 1831 (e.g., activate the at least the first TCI state 1804, the second TCI state 1806, the third TCI state 1808, and the fourth TCI state 1810 of the first TCI state activation message 1800). According to some aspects, the at least the first TCI state 1804 and the second TCI state 1806 of the first TCI codepoint 1831 of the first TCI state activation message 1800 may correspond to a first DCI format 1836. Still further, the third TCI state 1808 and the fourth TCI state 1810 of the first TCI codepoint 1831 of the first TCI state activation message 1800 may correspond to a second DCI format 1837. The first DCI format 1836 may be different from the second DCI format 1837. For example, the first DCI format 1836 may be a DCI format 1_1 and the second DCI format 1837 may be a DCI format 1_2. Other DCI formats are within the scope of the disclosure.

Still further, the RAN entity may transmit a beam indication message (e.g., similar to 1624 of FIG. 16), indicating the at least the first TCI codepoint 1831, to a UE, for example.

The fields R, Ci, Serving Cell ID, and BWP ID are the same or similar to those described in FIG. 12A. Their descriptions will not be repeated for the sake of brevity. In FIG. 18, the parameter TCI State $ID_{i,j,f}$ is used, where: i is an index of a codepoint (e.g., i=0-7 for codepoint 1-codepoint 8, respectively), j is the jth TCI state indicated for the ith codepoint. For example, j={1, 2, 3, 4} in cases where each codepoint maps to four TCI states. Sets of j that are smaller than four or larger than four are within the scope of the disclosure. The value off corresponds to a DCI format. DCI formats 1_1 and 1_2 are given as examples. Other DCI formats are within the scope of the disclosure. The field Ci, field indicates whether the words (each word corresponding to two octets) including TCI states $ID_{i,2,f}$, $ID_{i,3,f}$, $ID_{i,4,f}$ are present. In one example, if this field is set, the words including TCI states $ID_{i,2,f}$, $ID_{i,3,f}$, $ID_{i,4,f}$ are present. In this example, if this field is not set, the words including TCI states $ID_{i,2,f}$, $ID_{i,3,f}$, $ID_{i,4,f}$ are not present.

In more detail, in word 2 and word 3 of FIG. 18, the first TCI state activation message 1800 maps TCI state $ID_{0,1,1\_1}$ (e.g., the first TCI state 1804) and TCI state $ID_{0,2,1\_1}$ (e.g., the second TCI state 1806), both corresponding to a first DCI format 1836 (e.g., DCI format 1_1), to the first TCI codepoint 1831, and also maps TCI state $ID_{0,3,1\_2}$ (e.g., the third TCI state 1808) and TCI state $ID_{0,4,1\_2}$ (e.g., the fourth TCI state 1810), both corresponding to a second DCI format 1837 (e.g., DCI format 1_2), to the first TCI codepoint 1831. For i=x, for example, in word M−1 and word M of FIG. 18, the first TCI state activation message 1800 maps TCI state (e.g., the 29th TCI state 1812) and TCI state (e.g., the 30th TCI state 1814), both corresponding to the first DCI format 1836 (e.g., DCI format 1_1) to the $N^{th}$ TCI codepoint 1832, and also maps TCI state $ID_{x,3,1\_2}$ (e.g., the $31^{st}$ TCI state 1822) and TCI state $ID_{x,4,1\_2}$ (e.g., the $32^{nd}$ TCI state 1824), both corresponding to the second DCI format 1837 (e.g., DCI format 1_2) to the $N^{th}$ TCI codepoint 1832 of the first TCI state activation message 1800.

Figure 19:
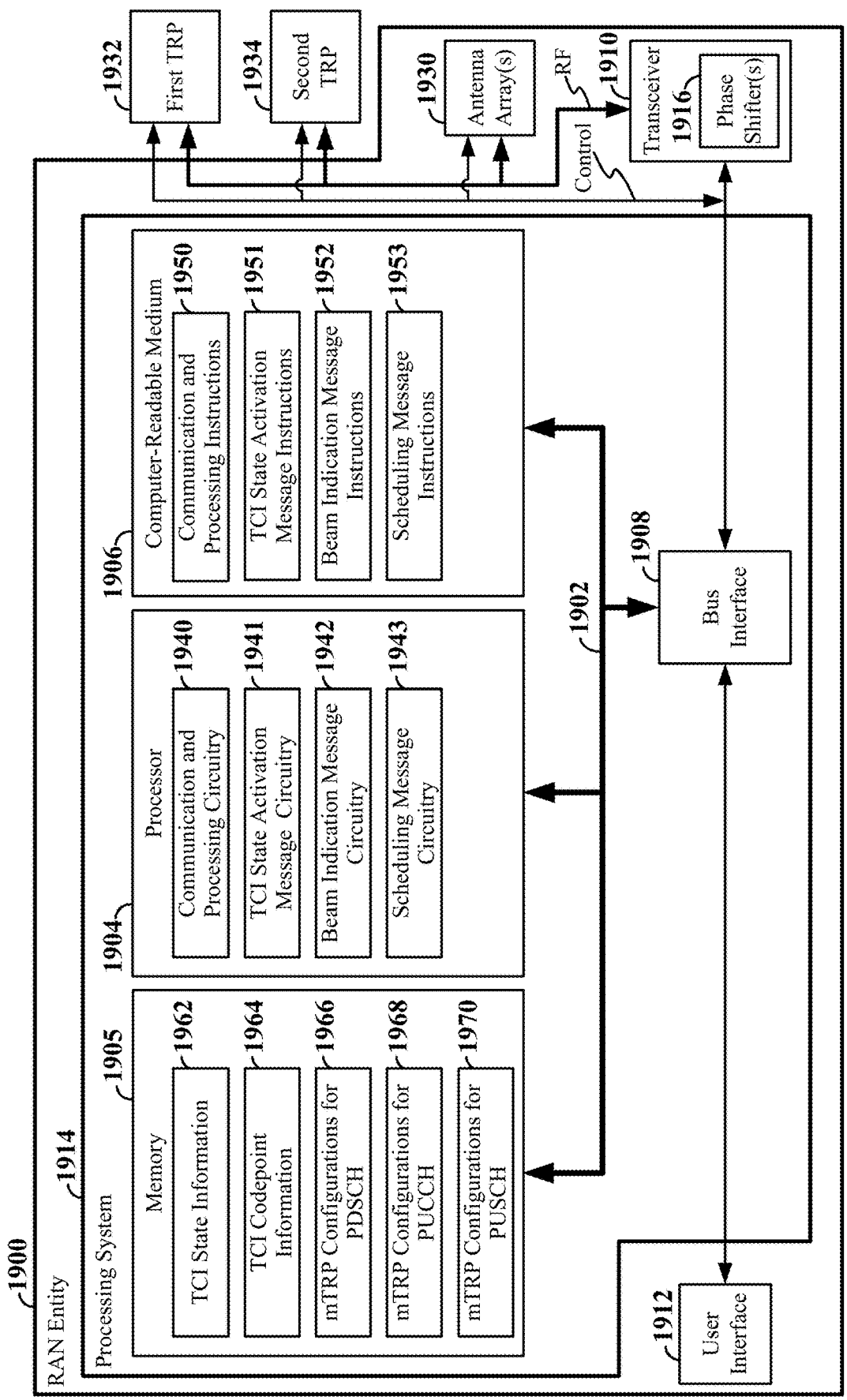
FIG. 19 is a block diagram illustrating an example of a hardware implementation of a radio access network (RAN) entity employing a processing system according to some aspects.

FIG. 19 is a block diagram illustrating an example of a hardware implementation of a radio access network (RAN) entity 1900 employing a processing system 1914 according to some aspects. For example, the RAN entity 1900 may be any of the RAN entities or scheduling entities illustrated in one or more FIGS. 1, 2, 4, and/or 5.

The RAN entity 1900 may be implemented with a processing system 1914 that includes one or more processors 1904. Examples of processors 1904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN entity 1900 may be configured to perform any one or more of the functions described herein. That is, the processor 1904, as utilized in a RAN entity 1900, may be used to implement any one or more of the processes described below in connection with FIG. 19.

The processor 1904 may in some instances be implemented via a baseband or modem chip and in other implementations, the processor 1904 may itself include a number of devices distinct and different from a baseband or modem chip (e.g., in such scenarios as may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1914 may be implemented with a bus architecture, represented generally by the bus 1902. The bus 1902 may include any number of interconnecting buses and bridges depending on the specific application of the processing system 1914 and the overall design constraints. The bus 1902 communicatively couples together various circuits including one or more processors (represented generally by the processor 1904), a memory 1905, and computer-readable media (represented generally by the computer-readable medium 1906). The bus 1902 may also link various other circuits such as timing sources, peripherals, voltage regulators, and power management circuits, which are well known in the art, and therefore, will not be described any further.

A bus interface 1908 provides an interface between the bus 1902 and a transceiver 1910. The transceiver 1910 provides a means for communicating with various other apparatus over a transmission medium (e.g., air interface). In some examples, the transceiver 1910 may include a phase-shifter 1916 for digital and/or analog beamforming via one or more antenna array(s) 1930 and/or antenna array(s) in one or more transmission and reception points (TRPs) such as a first TRP 1932 and a second TRP 1934 as illustrated. Each antenna array 1930 (and each antenna array of the first TRP 1932 and the second TRP 1934) may correspond, for example, to an antenna panel. Multiple antenna panels may be positioned at the RAN entity 1900 (and/or at the first TRP 1932 and/or second TRP 1934) to provide full spatial coverage. The transceiver 1910 may also be operationally coupled to one or more remote radio heads, such as the first TRP 1932 and the second TRP 1934. The RAN entity, including the first TRP 1932 and the second TRP 1934, may be part of an mTRP environment, such as the mTRP environment of FIG. 5. When the RAN entity 1900, the first TRP 1982, and the second TRP 1934 are part of the mTRP environment, the antenna array(s) 1930 located at the RAN entity 1900 need not be utilized and need not be communicatively coupled to the RAN entity 1900. The bus interface 1908 may also provide an interface between the bus 1902 and a user interface 1912 (e.g., keypad, display, speaker, microphone, joystick) if provided.

The processor 1904 is responsible for managing the bus 1902 and general processing, including the execution of software stored on the computer-readable medium 1906. The software, when executed by the processor 1904, causes the processing system 1914 to perform the various functions described below for any particular apparatus. The computer-readable medium 1906 and the memory 1905 may also be used for storing data that is manipulated by the processor 1904 when executing software.

One or more processors 1904 in the processing system 1914 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1906.

The computer-readable medium 1906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1906 may reside in the processing system 1914, external to the processing system 1914, or distributed across multiple entities, including the processing system 1914. The computer-readable medium 1906 may be embodied in a computer program product. In some examples, the computer-readable medium 1906 may be part of the memory 1905. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1904 may include circuitry configured for various functions. For example, the processor 1904 may include communication and processing circuitry 1940, configured to communicate with a user equipment (UE), such as any UE or scheduled entity shown and described in connection with FIGS. 1, 2, 4, and/or 5. In some examples, the communication and processing circuitry 1940 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1940 may be configured to receive and process uplink beamformed signals at a mmWave frequency (e.g., FR2, FR4-a, FR4-1, FR4, FR5, etc.) via the transceiver 1910, the antenna array(s) 1930 (e.g., using the phase-shifter 1916), and/or the first TRP 1932 and the second TRP 1934. In addition, the communication and processing circuitry 1940 may be configured to generate and transmit downlink beamformed signals at a mmWave frequency via the transceiver 1910 and the antenna array(s) 1930 (e.g., using the phase-shifter 1916), and/or the first TRP 1932 and the second TRP 1934. For example, the communication and processing circuitry 1940 may be configured for multi-stream communication with a UE via spatial division multiplexing (SDM) of the multiple streams on corresponding multiple beam pair links (BPLs) between the UE and the first TRP 1932 and the second TRP 1934. The communication and processing circuitry 1940 may further be configured to execute communication and processing instructions 1950 (e.g., software) stored in the computer-readable medium 1906 to implement one or more of the functions described herein.

The processor 1904 may further include transmission configuration indicator (TCI) state activation message circuitry 1941, configured for various function including, for example, transmitting a first TCI state activation message and/or a second TCI state activation message, for example, via the transceiver 1910, phase shifter(s) 1616, the first TRP 1932 and the second TRP 1934. In the above examples, a TCI state activation message may be, for example, a MAC-CE.

The TCI state activation message circuitry 1941 may further be configured to form or otherwise obtain and transmit a first TCI state activation message, where the first TCI state activation message may map at least a first TCI state, a second TCI state, and a first multiple transmission and reception point (mTRP) configuration to at least a first TCI codepoint, and may activate the at least the first TCI codepoint (e.g., activate at least the first TCI state, the second TCI state, and the first mTRP configuration).

According to some aspects, the TCI state activation message circuitry 1941 may further be configured to form or otherwise obtain and transmit a second TCI state activation message, where the second TCI state activation message may map at least a third TCI state, a fourth TCI state, and a second mTRP configuration to a second TCI codepoint, and may activate the second TCI codepoint (e.g., activate at least the third TCI state, the fourth TCI state, and the second mTRP configuration). According to some aspects, the first TCI codepoint may correspond to a first DCI format (e.g., DCI format 1_1), and the second TCI codepoint may correspond to a second DCI format (e.g., DCI format 1_2).

In other aspects, the TCI state activation message circuitry 1941 may be configured to map at least a third TCI state, a fourth TCI state, and a second mTRP configuration to a second TCI codepoint, and activate, via the first TCI state activation message, the second TCI codepoint (e.g., activate at least the third TCI state, the fourth TCI state, and the second mTRP configuration). In some aspects, the first TCI codepoint may correspond to a first DCI format (e.g., DCI format 1_1), and the second TCI codepoint may correspond to a second DCI format (e.g., DCI format 1_2).

In some aspects, the TCI state activation message circuitry 1941 may be configured to form or otherwise obtain and transmit a first TCI state activation message (e.g., different from the first TCI state activation message described above), the first TCI state activation message may map a first TCI state and a second TCI state to a first TCI codepoint, and may activate the first TCI codepoint (e.g., activate the first TCI state and the second TCI state). In some aspects, the first TCI codepoint may correspond to a first DCI format. The TCI state activation message circuitry 1941 may be further configured to form or otherwise obtain and transmit a second TCI state activation message (e.g., different from the second TCI state activation message described above), the second TCI state activation message may map a third TCI state and a fourth TCI state to a second TCI codepoint, and may activate the second TCI codepoint (e.g., activate the third TCI state and the fourth TCI state). In some aspects, the second TCI codepoint may correspond to a second DCI format.

In still another aspect, the TCI state activation message circuitry 1941 may be configured to transmit the just mentioned first TCI state activation message and the second TCI state activation message as one TCI state activation message. The one TCI state activation message may map the first TCI state and the second TCI state to the first TCI codepoint, and map the third TCI state and the fourth TCI state to the second TCI codepoint, and may activate the first TCI codepoint and the second TCI codepoint (e.g., activate the first TCI state, the second TCI state, the third TCI state, and the fourth TCI state). As before, the first TCI codepoint may correspond to a first DCI format, and the second TCI codepoint may correspond to a second DCI format.

Information related to TCI states, such as the first through fourth TCI states mentioned above, may be stored in a TCI state information 1962 location on the memory 1905. Information related to TCI codepoints, such as the first and second TCI codepoints mentioned above, and for example, the mapping of TCI codepoints to TCI states and mTRP configurations (if any), may be stored in a TCI codepoint information 1964 location on the memory 1905. According to some aspects, information related to the plurality of mTRP configurations may be stored in one memory location or distributed across various memory locations, such as an mTRP configuration for PDSCH 1966 location of the memory 1905 (used in association with downlink traffic), an mTRP configurations for PUCCH 1968 location of the memory 1905 (used in association with uplink control), and an mTRP configurations for PUSCH 1970 location of the memory 1905 (used in association with uplink traffic).

In some aspects, in response to a first TCI state and a second TCI state corresponding to two downlink (DL) TCI states, a first mTRP configuration may be at least one of: a first frequency division multiplexing (FDM) configuration for the PDSCH, a second FDM configuration for the PDSCH, an intra-slot time division multiplexing (TDM) configuration for the PDSCH, an inter-slot TDM configuration for the PDSCH, or a spatial division multiplexing (SDM) configuration for the PDSCH.

In some aspects, in response to a first TCI state and a second TCI state corresponding to two uplink (UL) TCI states, and where the RAN entity may obtain a first mTRP configuration for physical uplink shared channel (PUSCH), physical uplink control channel (PUCCH), or both PUSCH and PUCCH, the first mTRP configuration may be at least one of: a first time division multiplexing (TDM) repetition configuration for (PUSCH), a second TDM repetition configuration for PUSCH, a frequency division multiplexing (FDM) configuration for PUSCH, a spatial division multiplexing (SDM) configuration for PUSCH, an inter-slot TDM configuration for PUCCH, a sub-slot TDM configuration for PUCCH, an intra-PUCCH resource beam hopping configuration for PUCCH, or an FDM configuration for PUCCH.

In some aspects, in response to a first TCI state and a second TCI state corresponding to two DL TCI states and two UL TCI states, respectively, the RAN entity 1900 may map the first TCI codepoint to: a first DL TCI state, a second DL TCI state, a first mTRP configuration (where the first mTRP configuration is an mTRP configuration for PDSCH, for example), a first UL TCI state, a second UL TCI state, and a second mTRP configuration for PUSCH or PUCCH.

In some aspects, in response to the first TCI state and the second TCI state corresponding to two joint downlink/uplink (DL/UL) TCI states, the RAN entity 1900 may be configured to map the first TCI codepoint to: a first joint DL/UL TCI state, a second joint DL/UL TCI state, a first mTRP configuration (where the first mTRP configuration is an mTRP configuration for PDSCH, for example), a second mTRP configuration for PUSCH, and a third mTRP configuration for PUCCH.

The TCI state activation message circuitry 1941 may further be configured to execute TCI state activation message instructions 1951 (e.g., software) stored in the computer-readable medium 1906 to implement one or more of the functions described herein.

The following table lists some examples of mTRP configurations. The list is non-limiting and not exhaustive. Other mTRP configurations are within the scope of the disclosure.

TABLE I

Examples of mTRP Configurations

| Index | mTRP Configuration |
|---|---|
| 01 | a first frequency division multiplexing (FDM) configuration (e.g., FDM Scheme A) for a PDSCH, |
| 02 | a second FDM configuration (e.g., FDM Scheme B) for a PDSCH |
| 03 | an intra-slot time division multiplexing (TDM) configuration for a PDSCH |
| 04 | an inter-slot TDM configuration for a PDSCH |
| 05 | a spatial division multiplexing (SDM) configuration for a PDSCH |
| 06 | a first FDM configuration (e.g., FDM Scheme A) for a PUSCH |
| 07 | a second FDM configuration (e.g., FDM Scheme B) for a PUSCH |
| 08 | an intra-slot time division multiplexing (TDM) configuration for a PUSCH |
| 09 | an inter-slot TDM configuration for a PUSCH |
| 10 | a spatial division multiplexing (SDM) configuration for a PUSCH |
| 11 | a first FDM configuration (e.g., FDM Scheme A) for a PUCCH, |
| 12 | a second FDM configuration (e.g., FDM Scheme B) for a PUCCH |
| 13 | an intra-slot time division multiplexing (TDM) configuration for a PUCCH |
| 14 | an inter-slot TDM configuration for a PUCCH |
| 15 | a spatial division multiplexing (SDM) configuration for a PUCCH |
| 16 | an mTRP PUSCH repetition configuration |
| 17 | a sub-slot based TDM configuration |
| 18 | an intra-PUCCH resource beam hopping configuration |

According to some aspects, the RAN entity 1900 may transmit a MAC subheader indicating that the TCI state activation message (e.g., a MAC-CE) identifies the plurality of TCI states to activate or deactivate in connection with the PDSCH, PUCCH, and/or PUSCH. The transmitting of the TCI state activation message may be in response to transmitting the MAC subheader. According to some examples, the MAC subheader may include several fields. The several fields may include a Logical Channel ID (LCID) field that identifies the logical channel instance of a corresponding MAC SDU or a type of a corresponding MAC-CE or padding for the DL-SCH and/or UL-SCH. The several fields may also include an extended Logical Channel ID (eLCID) field that may identify a logical channel instance of the corresponding MAC SDU or the type of the corresponding MAC-CE for the DL-SCH and/or the UL-SCH. The several fields may also include a length (L) field that may indicate the length of the corresponding MAC SDU or variable-sized MAC-CE in bytes. The size of the L field may be indicated by a format (F) field, which also may be included in the several fields of the MAC subheader. The F field may indicate the size of the Length field. The several fields may also include a reserved (R) field.

The processor 1904 may further include beam indication message circuitry 1942, configured for various functions including, for example, transmitting a beam indication message indicating the at least a first TCI codepoint and/or indicating a second TCI codepoint, if obtained in connection with an upcoming (scheduled) communication. In some examples, the beam indication message may be a beam indication DCI that identifies the beams to be used by a UE (not shown) in connection with uplink or downlink communications that may be scheduled by the RAN entity 1900. Each beam may be defined by the one or more TCI state(s) mapped to the first TCI codepoint and/or the second TCI codepoint (if present). The beam indication message, via its identification of the first TCI codepoint and/or the second TCI codepoint (if present), may also identify a first mTRP configuration and/or a second mTRP configuration (if present) mapped to the first TCI codepoint and/or the second TCI codepoint, respectively. Identification of an mTRP configuration associated with given TCI states may, for example, configure the multiplexing used by the UE to use to receive or transmit on the beams defined by the given TCI states.

In some examples, the beam indication message may or may not include scheduling information (e.g., scheduling information related to the channels and/or signals associated with the TCI codepoint(s)). For example, in some aspects the beam indication message may indicate scheduled resources corresponding to a first beam associated with the first TCI state and a second beam associated with the second TCI state, the first TCI state, and the second TCI state mapped to the first TCI codepoint. In other aspects, the scheduling information may not be included with the beam indication message. The beam indication message circuitry 1942 may further be configured to execute beam indication message instructions 1952 (e.g., software) stored in the computer-readable medium 1906 to implement one or more of the functions described herein.

The processor 1904 may further include scheduling message circuitry 1943, configured for various functions including, for example, transmitting a scheduling message indicating scheduled resources corresponding to a first beam associated with the first TCI state and a second beam associated with the second TCI state, the first TCI state and the second TCI state mapped to the first TCI codepoint. In other aspects, the scheduling message circuitry 1943 may be configured to transmit a scheduling message indicating scheduled resources corresponding to the first TCI codepoint and the second TCI codepoint. In some examples, the scheduling message may be a scheduling DCI. In some examples, the scheduling message may be transmitted after beam indication message (e.g., as shown and described in connection with FIG. 13). In some examples, the scheduling message may be transmitted after the UE transmits a HARQ-ACK in connection with the receipt of the beam indication message. The HARQ-ACK may be transmitted in a PUCCH following receipt of the beam indication message. In some aspects, the prescribed scheduling of the channels and/or signals scheduled by the scheduling message may take effect a configured amount of time or a configured number of slots following the transmission of the PUCCH with HARQ-ACK (e.g., as shown and described in connection with FIG. 13). The scheduling message circuitry 1943 may further be configured to execute scheduling message instructions 1953 (e.g., software) stored in the computer-readable medium 1906 to implement one or more of the functions described herein.

Of course, in the above examples, the circuitry included in the processor 1904 is merely provided as an example. Other means for carrying out the described functions may be included within various aspects of the present disclosure, including but not limited to the instructions stored in the computer-readable medium 1906 or any other suitable apparatus or means described in any one of the FIGS. 1, 2, 4, 5, and/or 19, and utilizing, for example, the processes and/or algorithms described herein in relation to FIGS. 6-18.

Figure 20:
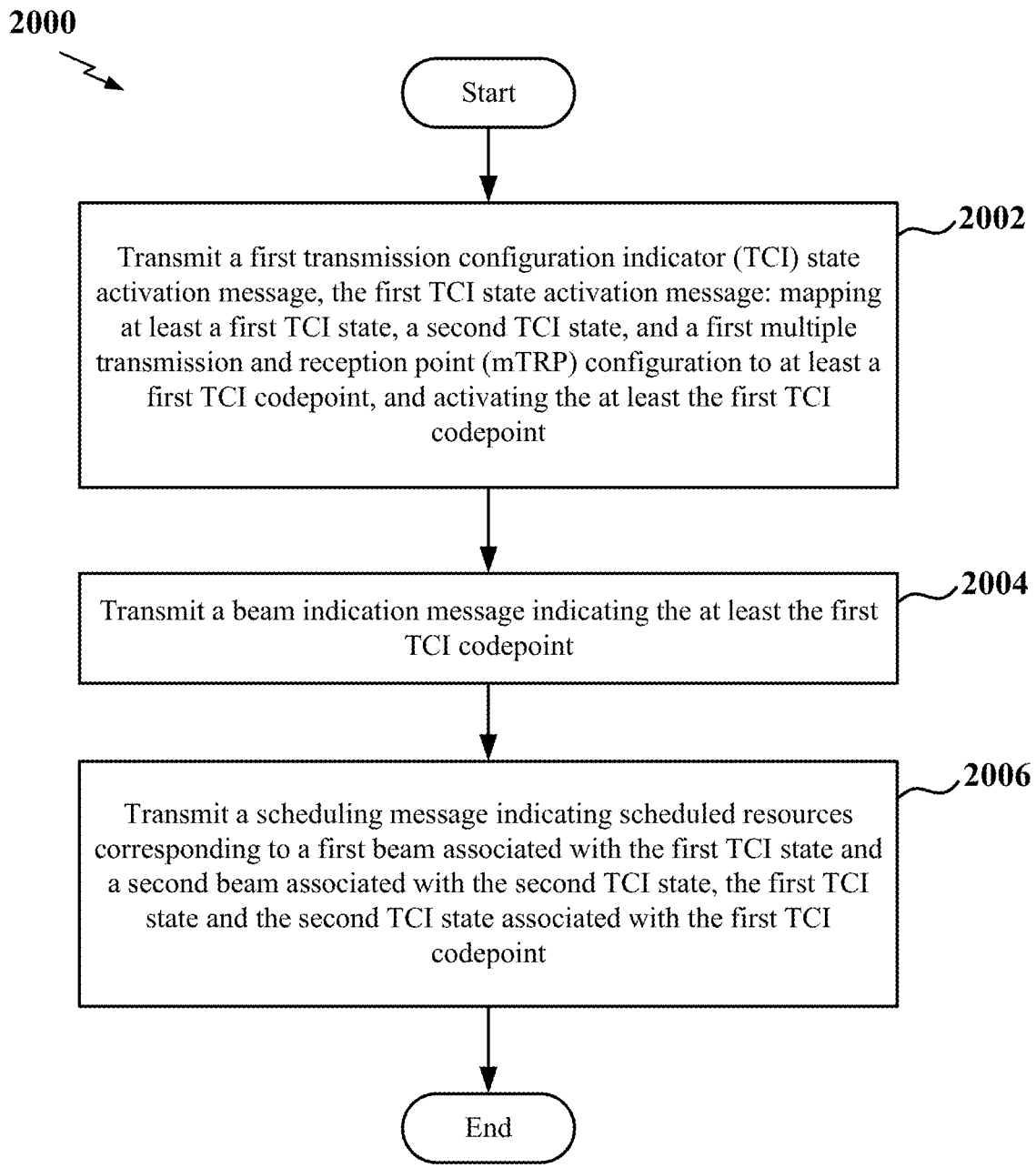
FIG. 20 is a flow chart illustrating an example of a method at a RAN entity according to some aspects.

FIG. 20 is a flow chart illustrating an example of a method 2000 at a RAN entity according to some aspects. The method 2000 may provide for flexible beam indication and multiplexing configuration in an mTRP environment. In one example, the method may be applied to TCI state management for multi-stream communication using a base station (e.g., RAN entity 1900) coupled to at least a first TRP (such as the first TRP 1932 of FIG. 19) and a second TRP (such as the second TRP 1934 of FIG. 19). As described below, some or all illustrated features may be omitted in a particular implementation within the scope of the present disclosure, and some illustrated features may not be required for the implementation of all aspects. In some examples, the method may be performed by the RAN entity 1900, as described above and illustrated in FIG. 19, by a processor or processing system, or by any suitable means for carrying out the described functions.

At block 2002, the RAN entity may transmit a first transmission configuration indicator (TCI) state activation message. The first TCI state activation message may map at least a first TCI state, a second TCI state, and a first multiple transmission and reception point (mTRP) configuration to at least a first TCI codepoint, and may activate the at least the first TCI codepoint (e.g., activate at least the first TCI state, the second TCI state, and the first mTRP configuration). According to some aspects, the at least the first TCI state and the second TCI state may correspond to at least two different beams for transmitting and/or receiving channels or signals. The TCI state activation messages 1200, 1300, 1400, 1401 as shown and described above in connection with FIGS. 12A, 13, 14A, and 14B, may provide non-limiting examples of the first TCI state activation message and the second TCI state activation message. For example, the TCI state activation message circuitry 1941, in conjunction with the transceiver 1910, the phase shifter(s) 1916, the first TRP 1932, and the second TRP 1934, as shown and described in connection with FIG. 19, may provide a means for transmitting a first transmission configuration indicator (TCI) state activation message, the first TCI state activation message mapping at least a first TCI state, a second TCI state, and a first multiple transmission and reception point (mTRP) configuration to at least a first TCI codepoint and activating the at least the first TCI codepoint (e.g., activating at least the first TCI state, the second TCI state, and the first mTRP configuration).

In some aspects, in response to the first TCI state and the second TCI state corresponding to two downlink (DL) TCI states, a first mTRP configuration may be at least one of: a first frequency division multiplexing (FDM) configuration for the PDSCH, a second FDM configuration for the PDSCH, an intra-slot time division multiplexing (TDM) configuration for the PDSCH, an inter-slot TDM configuration for the PDSCH, or a spatial division multiplexing (SDM) configuration for the PDSCH. In some aspects, in response to the first TCI state and the second TCI state corresponding to two uplink (UL) TCI states, and where the RAN entity may obtain a first mTRP configuration for physical uplink shared channel (PUSCH), physical uplink control channel (PUCCH), or both PUSCH and PUCCH, the first mTRP configuration may be at least one of: a first time division multiplexing (TDM) repetition configuration for (PUSCH), a second TDM repetition configuration for PUSCH, a frequency division multiplexing (FDM) configuration for PUSCH, a spatial division multiplexing (SDM) configuration for PUSCH, an inter-slot TDM configuration for PUCCH, a sub-slot TDM configuration for PUCCH, an intra-PUCCH resource beam hopping configuration for PUCCH, or an FDM configuration for PUCCH. In some aspects, in response to the first TCI state and the second TCI state corresponding to two DL TCI states and two UL TCI states, respectively, the RAN entity may be configured to map the first TCI codepoint to: a first DL TCI state, a second DL TCI state, a first mTRP configuration (where the first mTRP configuration is an mTRP configuration for PDSCH, for example), a first UL TCI state, a second UL TCI state, and a second mTRP configuration for PUSCH or PUCCH. In some aspects, in response to the first TCI state and the second TCI state corresponding to two joint downlink/uplink (DL/UL) TCI states, the RAN entity may be configured to map the first TCI codepoint to: a first joint DL/UL TCI state, a second joint DL/UL TCI state, a first mTRP configuration (where the first mTRP configuration is an mTRP configuration for PDSCH, for example), a second mTRP configuration for PUSCH, and a third mTRP configuration for PUCCH.

At block 2004, the RAN entity may transmit a beam indication message, indicating the at least the first TCI codepoint. The beam indication message may indicate beams according to their associated TCI states mapped to the first TCI codepoint. The beam indication message, via its identification of the first TCI codepoint, may identify a first mTRP configuration mapped to the first TCI codepoint. In some examples, the beam indication message may or may not include scheduling information (e.g., scheduling information related to the channels and/or signals associated with the TCI codepoint(s)). For example, in some aspects the beam indication message may indicate scheduled resources corresponding to a first beam associated with the first TCI state and a second beam associated with the second TCI state, the first TCI state and the second TCI state mapped to the first TCI codepoint. In other aspects, the scheduling information may not be included with the beam indication message. For example, the beam indication message circuitry 1942, in conjunction with the transceiver 1910, the phase shifter(s) 1916, the first TRP 1932, and the second TRP 1934, as shown and described in connection with FIG. 19, may provide a means for transmitting a beam indication message indicating the at least the first TCI codepoint.

At block 2006, the RAN entity may transmit a scheduling message indicating scheduled resources corresponding to a first beam associated with the first TCI state and a second beam associated with the second TCI state, the first TCI state, and the second TCI state mapped to the first TCI codepoint. For example, the scheduling message circuitry 1943, in conjunction with the transceiver 1910, the phase shifter(s) 1916, the first TRP 1932, and the second TRP 1934, as shown and described in connection with FIG. 19, may provide a means for transmitting a scheduling message indicating scheduled resources corresponding to a first beam associated with the first TCI state and a second beam associated with the second TCI state, the first TCI state and the second TCI state both mapped to the first TCI codepoint.

Figure 21:
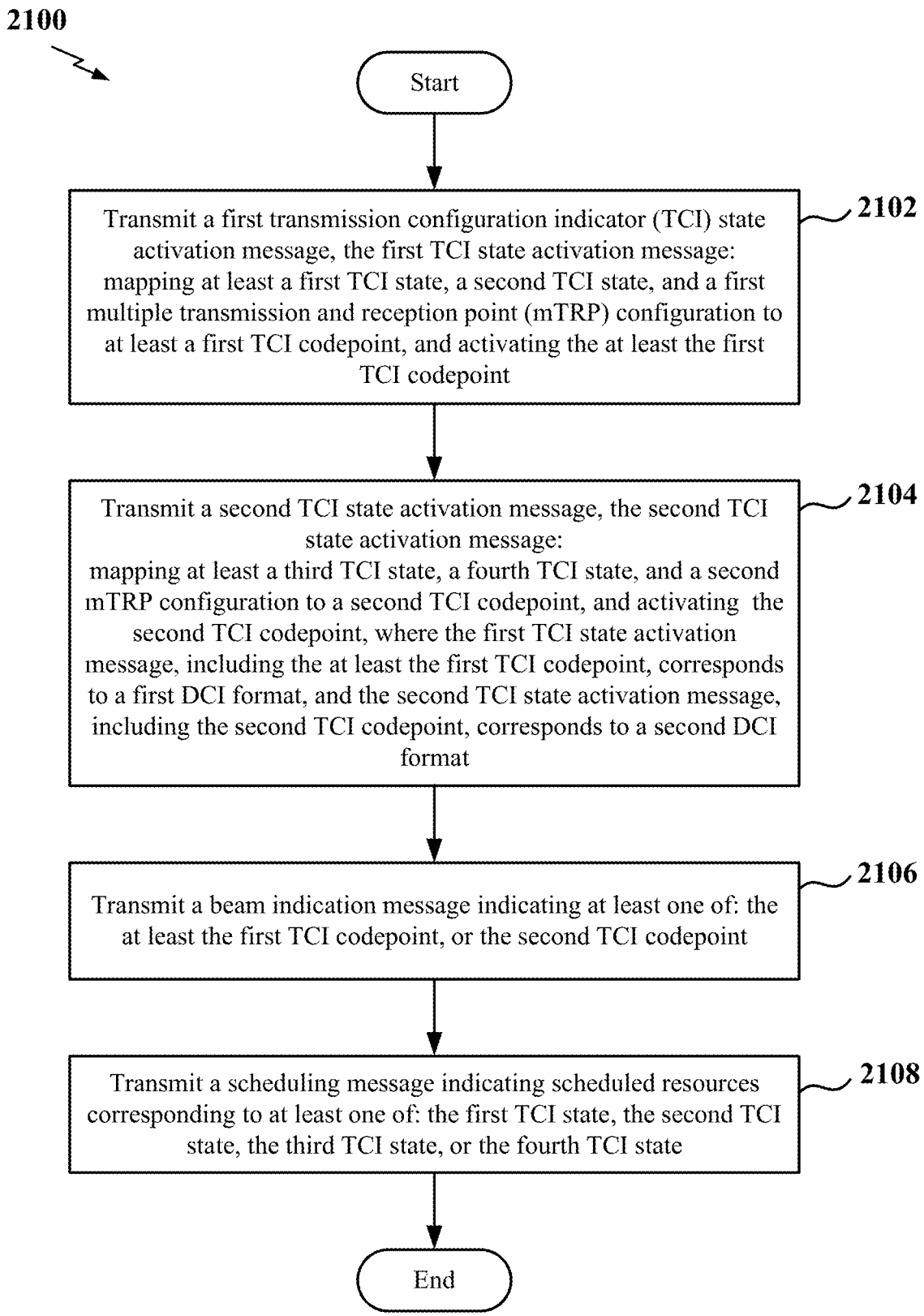
FIG. 21 is a flow chart illustrating an example of a method at a RAN entity according to some aspects.

In some aspects, the DCI format may also be identified using the TCI state activation message. FIG. 21 is a flow chart illustrating an example of a method 2100 at a RAN entity according to such aspects.

At block 2102, the RAN entity may transmit a first transmission configuration indicator (TCI) state activation message. The first TCI state activation message may map at least a first TCI state, a second TCI state, and a first multiple transmission and reception point (mTRP) configuration to at least a first TCI codepoint, and may activate the at least the first TCI state (e.g., activate at least the first TCI state, the second TCI state, and the first mTRP configuration). For example, the TCI state activation message circuitry 1941, in conjunction with the transceiver 1910, the phase shifter(s) 1916, the first TRP 1932, and the second TRP 1934, as shown and described in connection with FIG. 19, may provide a means for transmitting a first transmission configuration indicator (TCI) state activation message, where the first TCI state activation message may map at least a first TCI state, a second TCI state, and a first multiple transmission and reception point (mTRP) configuration to at least a first TCI codepoint, and may activate the at least the first TCI codepoint (e.g., activate at least the first TCI state, the second TCI state, and the first mTRP configuration).

At block 2104, the RAN entity may transmit a second TCI state activation message. The second TCI state activation message may map at least a third TCI state, a fourth TCI state, and a second mTRP configuration to a second TCI codepoint, and may activate the second TCI codepoint (e.g., activate at least the third TCI state, the fourth TCI state, and the second mTRP configuration), where the first TCI state activation message, including the at least the first TCI codepoint, may correspond to a first DCI format, and the second TCI state activation message, including the at least the second TCI codepoint, may correspond to a second DCI format. For example, the TCI state activation message circuitry 1941, in conjunction with the transceiver 1910, the phase shifter(s) 1916, the first TRP 1932, and the second TRP 1934, as shown and described in connection with FIG. 19, may provide a means for transmitting a second TCI state activation message, the second TCI state activation message: mapping at least a third TCI state, a fourth TCI state, and a second mTRP configuration to a second TCI codepoint, and activating the second TCI codepoint (e.g., activating the at least the third TCI state, the fourth TCI state, and the second mTRP configuration), where the first TCI state activation message, including at least the first TCI codepoint, corresponds to a first DCI format, and the second TCI state activation message, including the at least the second TCI codepoint, corresponds to a second DCI format.

At block 2106, the RAN entity may transmit a beam indication message indicating at least one of: the at least the first TCI codepoint, or the at least the second TCI codepoint. For example, the beam indication message circuitry 1942, in conjunction with the transceiver 1910, the phase shifter(s) 1916, the first TRP 1932, and the second TRP 1934, as shown and described in connection with FIG. 19, may provide a means for transmitting a beam indication message indicating at least one of: the at least the first TCI codepoint, or the at least the second TCI codepoint.

At block 2108, the RAN entity may transmit a scheduling message indicating scheduled resources corresponding to at least one of: the first TCI state, the second TCI state, the third TCI state, or the fourth TCI state. For example, the scheduling message circuitry 1943, in conjunction with the transceiver 1910, the phase shifter(s) 1916, the first TRP 1932, and the second TRP 1934, as shown and described in connection with FIG. 19, may provide a means for transmitting a scheduling message indicating scheduled resources corresponding to at least one of: the first TCI state, the second TCI state, the third TCI state, or the fourth TCI state.

FIG. 22 is a flow chart illustrating an example of a method 2200 at a RAN entity according to some aspects. In the method 2100 of FIG. 21, two TCI state activation messages were used to activate the respective TCI states and mTRP configurations of two respective TCI codepoints. In the method 2200 of FIG. 22, one TCI state activation message is used to activate the respective TCI states and mTRP configurations of two respective TCI codepoints.

At block 2202, the RAN entity may transmit a first transmission configuration indicator (TCI) state activation message, the first TCI state activation message: mapping at least a first TCI state, a second TCI state, and a first multiple transmission and reception point (mTRP) configuration to at least a first TCI codepoint activating at least the first TCI state, the second TCI state, and the first mTRP configuration, and mapping at least a third TCI state, a fourth TCI state, and a second mTRP configuration to the at least the first TCI codepoint and activating the at least the third TCI state, the fourth TCI state, and the second mTRP configuration, where: the at least the first TCI state, the second TCI state, and the first mTRP configuration of the first TCI codepoint correspond to a first DCI format, and the at least the third TCI state, the fourth TCI state, and the second mTRP configuration of the first TCI codepoint correspond to a second DCI format. For example, the TCI state activation message circuitry 1941, in conjunction with the transceiver 1910, the phase shifter(s) 1916, the first TRP 1932, and the second TRP 1934, as shown and described in connection with FIG. 19, may provide a means for transmitting a first transmission configuration indicator (TCI) state activation message, the first TCI state activation message: mapping at least a first TCI state, a second TCI state, and a first multiple transmission and reception point (mTRP) configuration to at least a first TCI codepoint, and activating at least the first TCI state, the second TCI state, and the first mTRP configuration, and, and mapping at least a third TCI state, a fourth TCI state, and a second mTRP configuration to the at least the first TCI codepoint, and activating the at least the third TCI state, the fourth TCI state, and the second mTRP configuration (e.g., activating the at least the first TCI codepoint), where: the at least the first TCI state, the second TCI state, and the first mTRP configuration of the first TCI codepoint correspond to a first DCI format, and the at least the third TCI state, the fourth TCI state, and the second mTRP configuration of the first TCI codepoint correspond to a second DCI format.

At block 2204, the RAN entity may transmit a beam indication message indicating the at least the first TCI codepoint. For example, the beam indication message circuitry 1942, in conjunction with the transceiver 1910, the phase shifter(s) 1916, the first TRP 1932, and the second TRP 1934, as shown and described in connection with FIG. 19, may provide a means for transmitting a beam indication message indicating the at least the first TCI codepoint.

At block 2206, the RAN entity may transmit a scheduling message indicating scheduled resources corresponding at least one of: the first TCI state, the second TCI state, the third TCI state, or the fourth TCI state. For example, the scheduling message circuitry 1943, in conjunction with the transceiver 1910, the phase shifter(s) 1916, the first TRP 1932, and the second TRP 1934, as shown and described in connection with FIG. 19, may provide a means for transmitting a scheduling message indicating scheduled resources corresponding at least one of: the first TCI state, the second TCI state, the third TCI state, or the fourth TCI state.

Figure 23:
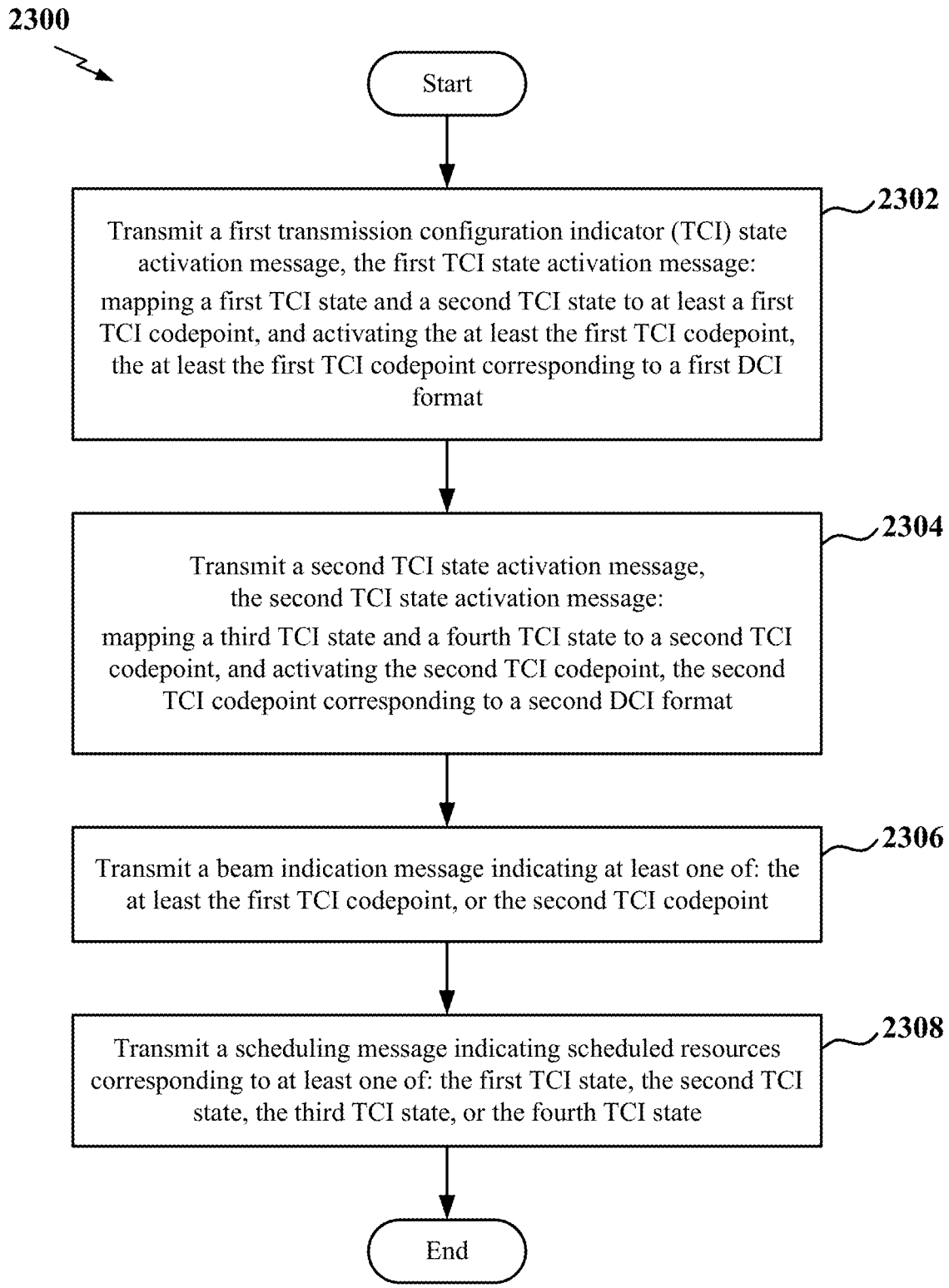
FIG. 23 is a flow chart illustrating an example of a method at a RAN entity according to some aspects.

According to some aspects, mTRP configurations may not be mapped to TCI codepoints; however, according to some aspects, TCI codepoints may still be used to indicate DCI formats. FIG. 23 is a flow chart illustrating an example of a method 2300 at a RAN entity according to such aspects.

At block 2302, the RAN entity may transmit a first transmission configuration indicator (TCI) state activation message, the first TCI state activation message mapping a first TCI state and a second TCI state to at least a first TCI codepoint and activating the at least the first TCI codepoint (e.g., activating at least the first TCI state and the second TCI state), the at least the first TCI codepoint corresponding to a first DCI format. The first TCI state activation message 1500 as shown and described above in connection with FIG. 15A may provide a non-limiting example of the first TCI state activation message. For example, the TCI state activation message circuitry 1941, in conjunction with the transceiver 1910, the phase shifter(s) 1916, the first TRP 1932, and the second TRP 1934, as shown and described in connection with FIG. 19, may provide a means for transmitting a first transmission configuration indicator (TCI) state activation message, the first TCI state activation message: mapping a first TCI state and a second TCI state to at least a first TCI codepoint, and activating the at least the first TCI codepoint (e.g., activating at least the first TCI state and the second TCI state), the at least the first TCI codepoint corresponding to a first DCI format.

At block 2304, the RAN entity may transmit a second TCI state activation message, the second TCI state activation message mapping a third TCI state and a fourth TCI state to a second TCI codepoint, and activating the second TCI codepoint (e.g., activating the third TCI state and the fourth TCI state), the second TCI codepoint corresponding to a second DCI format. The second TCI state activation message 1501 as shown and described above in connection with FIG. 15B may provide a non-limiting example of the second TCI state activation message. For example, the TCI state activation message circuitry 1941, in conjunction with the transceiver 1910, the phase shifter(s) 1916, the first TRP 1932, and the second TRP 1934, as shown and described in connection with FIG. 19, may provide a means for transmitting a second TCI state activation message, the second TCI state activation message mapping a third TCI state and a fourth TCI state to a second TCI codepoint, and activating the second TCI codepoint (e.g., activating the third TCI state and the fourth TCI state), the second TCI codepoint corresponding to a second DCI format.

At block 2306, the RAN entity may transmit a beam indication message indicating at least one of the at least the first TCI codepoint, or the second TCI codepoint. For example, the beam indication message circuitry 1942, in conjunction with the transceiver 1910, the phase shifter(s) 1916, the first TRP 1932, and the second TRP 1934, as shown and described in connection with FIG. 19, may provide a means for transmitting a beam indication message indicating at least one of: the at least the first TCI codepoint, or the second TCI codepoint.

At block 2308, the RAN entity may transmit a scheduling message indicating scheduled resources corresponding to at least one of: the first TCI state, the second TCI state, the third TCI state, or the fourth TCI state. For example, the scheduling message circuitry 1943, in conjunction with the transceiver 1910, the phase shifter(s) 1916, the first TRP 1932, and the second TRP 1934, as shown and described in connection with FIG. 19, may provide a means for transmitting a scheduling message indicating scheduled resources corresponding to at least one of: the first TCI state, the second TCI state, the third TCI state, or the fourth TCI state.

Figure 24:
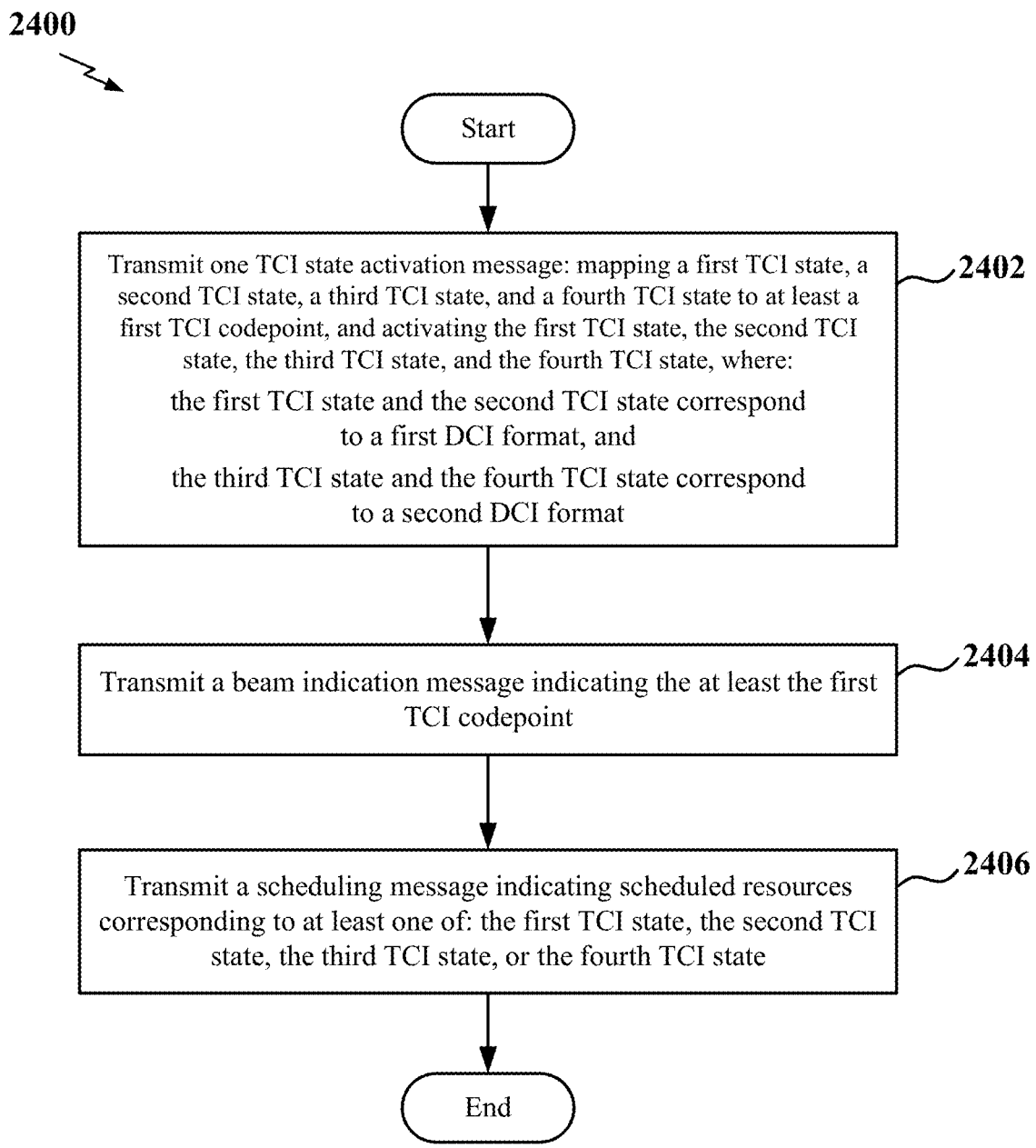
FIG. 24 is a flow chart illustrating an example of a method at a RAN entity according to some aspects.

FIG. 24 is a flow chart illustrating an example of a method 2400 at a RAN entity according to some aspects. In the method 2300 of FIG. 23, two TCI state activation messages were used to map the respective TCI states to two respective TCI codepoints and activate the respective TCI states. In the method 2400 of FIG. 24, one TCI state activation message is used to map the respective TCI states to one TCI codepoint and activate the one TCI codepoint (e.g., activate the respective TCI states). A first portion of the TCI states of the one TCI codepoint corresponds to a first DCI and a second portion, different from the first portion, of the TCI states of the one TCI codepoint corresponds to a second DCI format.

At block 2402, the RAN entity may transmit one TCI state activation message: mapping a first TCI state, a second TCI state, a third TCI state, and a fourth TCI state to at least a first TCI codepoint, and activating the first TCI state, the second TCI state, the third TCI state, and the fourth TCI state (e.g., activating the at least the first TCI codepoint), where the first TCI state and the second TCI state correspond to a first DCI format, and the third TCI state and the second TCI state correspond to a second DCI format. For example, the TCI state activation message circuitry 1941, in conjunction with the transceiver 1910, the phase shifter(s) 1916, the first TRP 1932, and the second TRP 1934, as shown and described in connection with FIG. 19, may provide a means for transmitting one TCI state activation message: mapping a first TCI state, a second TCI state, a third TCI state, and a fourth TCI state to at least a first TCI codepoint, and activating the first TCI state, the second TCI state, the third TCI state, and the fourth TCI state (e.g., activating the first TCI codepoint), where the first TCI state and the second TCI state correspond to a first DCI format, and the third TCI state and the second TCI state correspond to a second DCI format.

At block 2404, the RAN entity may transmit a beam indication message indicating the at least the first TCI codepoint. For example, the beam indication message circuitry 1942, in conjunction with the transceiver 1910, the phase shifter(s) 1916, the first TRP 1932, and the second TRP 1934, as shown and described in connection with FIG. 19, may provide a means for transmitting a beam indication message indicating the at least the first TCI codepoint.

At block 2406, the RAN entity may transmit a scheduling message indicating scheduled resources corresponding to at least one of: the first TCI state, the second TCI state, the third TCI state, or the fourth TCI state. For example, the scheduling message circuitry 1943, in conjunction with the transceiver 1910, the phase shifter(s) 1916, the first TRP 1932, and the second TRP 1934, as shown and described in connection with FIG. 19, may provide a means for transmitting a scheduling message indicating scheduled resources corresponding to at least one of: the first TCI state, the second TCI state, the third TCI state, or the fourth TCI state.

The following provides an overview of aspects of the present disclosure:

Aspect 1: A radio access network (RAN) entity for wireless communication, comprising: a transceiver, a memory, and a processor communicatively coupled to the transceiver and the memory, the processor and the memory being configured to: transmit a first transmission configuration indicator (TCI) state activation message, the first TCI state activation message: mapping at least a first TCI state, a second TCI state, and a first multiple transmission and reception point (mTRP) configuration to at least a first TCI codepoint; and activating the at least the first TCI codepoint, and transmit a beam indication message indicating the at least the first TCI codepoint.

Aspect 2: The RAN entity of aspect 1, wherein the processor and the memory are further configured to: transmit a scheduling message indicating scheduled resources corresponding to a first beam associated with the first TCI state and a second beam associated with the second TCI state, the first TCI state and the second TCI state mapped to the at least the first TCI codepoint.

Aspect 3: The RAN entity of aspect 1 or 2, wherein the beam indication message indicates scheduled resources corresponding to a first beam associated with the first TCI state and a second beam associated with the second TCI state, the first TCI state and the second TCI state mapped to the at least the first TCI codepoint.

Aspect 4: The RAN entity of any of aspects 1 through 3, wherein in response to the first TCI state and the second TCI state corresponding to two downlink (DL) TCI states, the processor and the memory are further configured to obtain the first mTRP configuration from at least one of: a first frequency division multiplexing (FDM) configuration for physical downlink shared channel (PDSCH), a second FDM configuration for PDSCH, an intra-slot time division multiplexing (TDM) configuration for PDSCH, an inter-slot TDM configuration for PDSCH, or a spatial division multiplexing (SDM) configuration for PDSCH.

Aspect 5: The RAN entity of any of aspects 1 through 4, wherein in response to the first TCI state and the second TCI state corresponding to two uplink (UL) TCI states, the processor and the memory are further configured to obtain the first mTRP configuration for physical uplink shared channel (PUSCH), physical uplink control channel (PUCCH), or both PUSCH and PUCCH from at least one of: a first time division multiplexing (TDM) repetition configuration for (PUSCH), a second TDM repetition configuration for PUSCH, a frequency division multiplexing (FDM) configuration for PUSCH, a spatial division multiplexing (SDM) configuration for PUSCH, an inter-slot TDM configuration for PUCCH, a sub-slot TDM configuration for PUCCH, an intra-PUCCH resource beam hopping configuration for PUCCH, or an FDM configuration for PUCCH.

Aspect 6: The RAN entity of any of aspects 1 through 5, wherein in response to the first TCI state and the second TCI state corresponding to two DL TCI states and two UL TCI states, respectively, the processor and the memory are further configured to map the at least the first TCI codepoint to: a first DL TCI state, a second DL TCI state, the first mTRP configuration, wherein the first mTRP configuration is an mTRP configuration for PDSCH, a first UL TCI state, a second UL TCI state, and a second mTRP configuration for PUSCH or PUCCH.

Aspect 7: The RAN entity of any of aspects 1 through 6, wherein in response to the first TCI state and the second TCI state corresponding to two joint downlink/uplink (DL/UL) TCI states, the processor and the memory are further configured to map the at least the first TCI codepoint to: a first joint DL/UL TCI state, a second joint DL/UL TCI state, the first mTRP configuration, wherein the first mTRP configuration is an mTRP configuration for PDSCH, a second mTRP configuration for PUSCH, and a third mTRP configuration for PUCCH.

Aspect 8: The RAN entity of any of aspects 1 through 7, wherein the processor and the memory are further configured to: transmit a second TCI state activation message, the second TCI state activation message: mapping at least a third TCI state, a fourth TCI state, and a second mTRP configuration to a second TCI codepoint, and activating the second TCI codepoint, wherein: the first TCI state activation message, including the at least the first TCI codepoint, corresponds to a first downlink control information (DCI) format, and the second TCI state activation message, including the second TCI codepoint, corresponds to a second DCI format, and include at least one of: the at least the first TCI codepoint, or the second TCI codepoint in the beam indication message.

Aspect 9: The RAN entity of aspect 8, wherein the first DCI format is a DCI format 1_1, and the second DCI format is a DCI format 1_2.

Aspect 10: The RAN entity of any of aspects 1 through 9, wherein the processor and the memory are further configured to: map at least a third TCI state, a fourth TCI state, and a second mTRP configuration to the at least the first TCI codepoint, and activate, via the first TCI state activation message, the at least the third TCI state, the fourth TCI state, and the second mTRP configuration, wherein: the at least the first TCI state, the second TCI state, and the first mTRP configuration of the at least the first TCI codepoint correspond to a first downlink control information (DCI) format, and the at least the third TCI state, the fourth TCI state, and the second mTRP configuration of the at least the first TCI codepoint correspond to a second DCI format.

Aspect 11: The RAN entity of aspect 10, wherein the first DCI format is a DCI format 1_1, and the second DCI format is a DCI format 1_2.

Aspect 12: A method at a radio access network (RAN) entity, comprising: transmitting a first transmission configuration indicator (TCI) state activation message, the first TCI state activation message: mapping at least a first TCI state, a second TCI state, and a first multiple transmission and reception point (mTRP) configuration to at least a first TCI codepoint, and activating the at least the first TCI codepoint, and transmitting a beam indication message indicating the at least the first TCI codepoint.

Aspect 13: The method of aspect 12, further comprising: transmitting a scheduling message indicating scheduled resources corresponding to a first beam associated with the first TCI state and a second beam associated with the second TCI state, the first TCI state and the second TCI state mapped to the at least the first TCI codepoint.

Aspect 14: The method of aspect 12 or 13, wherein the beam indication message indicates scheduled resources corresponding to a first beam associated with the first TCI state and a second beam associated with the second TCI state, the first TCI state and the second TCI state mapped to the at least the first TCI codepoint.

Aspect 15: The method of any of aspects 12 through 14, wherein in response to the first TCI state and the second TCI state corresponding to two downlink (DL) TCI states, the first mTRP configuration is at least one of: a first frequency division multiplexing (FDM) configuration for physical downlink shared channel (PDSCH), a second FDM configuration for PDSCH, an intra-slot time division multiplexing (TDM) configuration for PDSCH, an inter-slot TDM configuration for PDSCH, or a spatial division multiplexing (SDM) configuration for PDSCH.

Aspect 16: The method of any of aspects 12 through 15, wherein in response to the first TCI state and the second TCI state corresponding to two uplink (UL) TCI states, the first mTRP configuration for physical uplink shared channel (PUSCH), physical uplink control channel (PUCCH), or both PUSCH and PUCCH is at least one of: a first time division multiplexing (TDM) repetition configuration for (PUSCH), a second TDM repetition configuration for PUSCH, a frequency division multiplexing (FDM) configuration for PUSCH, a spatial division multiplexing (SDM) configuration for PUSCH, an inter-slot TDM configuration for PUCCH, a sub-slot TDM configuration for PUCCH, an intra-PUCCH resource beam hopping configuration for PUCCH, or an FDM configuration for PUCCH.

Aspect 17: The method of any of aspects 12 through 16, wherein in response to the first TCI state and the second TCI state corresponding to two DL TCI states and two UL TCI states, respectively, the at least the first TCI codepoint is mapped to: a first DL TCI state, a second DL TCI state, the first mTRP configuration, wherein the first mTRP configuration is an mTRP configuration for PDSCH, a first UL TCI state, a second UL TCI state, and a second mTRP configuration, wherein the second mTRP configuration is an mTRP configuration for PUSCH or an mTRP configuration for PUCCH.

Aspect 18: The method of any of aspects 12 through 17, wherein in response to the first TCI state and the second TCI state corresponding to two joint downlink/uplink (DL/UL) TCI states, the at least the first TCI codepoint is mapped to: a first joint DL/UL TCI state, a second joint DL/UL TCI state, the first mTRP configuration, wherein the first mTRP configuration is an mTRP configuration for PDSCH, a second mTRP configuration for PUSCH, and a third mTRP configuration for PUCCH.

Aspect 19: The method of any of aspects 12 through 18, further comprising: transmitting a second TCI state activation message, the second TCI state activation message: mapping at least a third TCI state, a fourth TCI state, and a second mTRP configuration to a second TCI codepoint, and activating the second TCI codepoint, wherein: the first TCI state activation message, including the at least the first TCI codepoint, corresponds to a first downlink control information (DCI) format, and the second TCI state activation message, including the second TCI codepoint, corresponds to a second DCI format, and transmitting at least one of: the at least the first TCI codepoint, or the second TCI codepoint in the beam indication message.

Aspect 20: The method of aspect 19, wherein the first DCI format is a DCI format 1_1, and the second DCI format is a DCI format 1_2.

Aspect 21: The method of any of aspects 12 through 20, further comprising: transmitting a second TCI state activation message, the second TCI state activation message: mapping at least a third TCI state, a fourth TCI state, and a second mTRP configuration to the at least the first TCI codepoint, and activating the at least the third TCI state, the fourth TCI state, and the second mTRP configuration, wherein: the at least the first TCI state, the second TCI state, and the first mTRP configuration of the at least the first TCI codepoint corresponds to a first downlink control information (DCI) format, and the at least the third TCI state, the fourth TCI state, and the second mTRP configuration of the at least the first TCI codepoint corresponds to a second DCI format.

Aspect 22: The method of aspect 21, wherein the first DCI format is a DCI format 1_1, and the second DCI format is a DCI format 1_2.

Aspect 23: A radio access network (RAN) entity for wireless communication, comprising: a transceiver, a memory, and a processor communicatively coupled to the transceiver and the memory, the processor and the memory being configured to: transmit a first transmission configuration indicator (TCI) state activation message, the first TCI state activation message: mapping a first TCI state and a second TCI state to at least a first TCI codepoint, and activating the at least the first TCI codepoint, the at least the first TCI codepoint corresponding to a first downlink control information (DCI) format, transmit a second TCI state activation message, the second TCI state activation message: mapping a third TCI state and a fourth TCI state to a second TCI codepoint, and activating the second TCI codepoint, the second TCI codepoint corresponding to a second DCI format, and transmit a beam indication message indicating at least one of: the at least the first TCI codepoint, or the second TCI codepoint.

Aspect 24: The RAN entity of aspect 23, wherein the processor and the memory are further configured to: transmit a scheduling message indicating scheduled resources corresponding to the at least the first TCI codepoint and the second TCI codepoint.

Aspect 25: The RAN entity of aspect 23 or 24, wherein the processor and the memory are further configured to transmit the first TCI state activation message and transmit the second TCI state activation message as one TCI state activation message, the one TCI state activation message: mapping the first TCI state, the second TCI state, the third TCI state, and the fourth TCI state to the at least the first TCI codepoint, and activating the first TCI state, the second TCI state, the third TCI state, and the fourth TCI state, wherein: the first TCI state and the second TCI state correspond to the first DCI format, and the third TCI state and the fourth TCI state correspond to the second DCI format.

Aspect 26: The RAN entity of aspect 25, wherein the first DCI format is a DCI format 1_1 and the second DCI format is a DCI format 1_2.

Aspect 27: A method at a radio access network (RAN) entity, comprising: transmitting a first transmission configuration indicator (TCI) state activation message, the first TCI state activation message: mapping a first TCI state and a second TCI state to at least a first TCI codepoint, and activating the at least the first TCI codepoint, the at least the first TCI codepoint corresponding to a first downlink control information (DCI) format, transmitting a second TCI state activation message, the second TCI state activation message: mapping a third TCI state and a fourth TCI state to a second TCI codepoint, and activating the second TCI codepoint, the second TCI codepoint corresponding to a second DCI format, and transmitting a beam indication message indicating at least one of: the at least the first TCI codepoint, or the second TCI codepoint.

Aspect 28: The method of aspect 27, further comprising: transmitting a scheduling message indicating scheduled resources corresponding to the at least the first TCI codepoint and the second TCI codepoint.

Aspect 29: The method of aspect 27 or 28, further comprising: transmitting the first TCI state activation message and the second TCI state activation message as one TCI state activation message, the one TCI state activation message: mapping the first TCI state, the second TCI state, the third TCI state, and the fourth TCI state to the at least the first TCI codepoint, and activating the first TCI state, the second TCI state, the third TCI state, and the fourth TCI state, wherein: the first TCI state and the second TCI state correspond to the first DCI format, and the third TCI state and the fourth TCI state correspond to the second DCI format.

Aspect 30: The RAN entity of aspect 29, wherein the first DCI format is a DCI format 1_1 and the second DCI format is a DCI format 1_2.

Aspect 31: An apparatus configured for wireless communication comprising at least one means for performing a method of any one of aspects 12 through 22 or 27 through 30.

Aspect 32: A non-transitory computer-readable medium storing computer-executable code, comprising code for causing an apparatus to perform a method of any one of aspects 12 through 22 or 27 through 30.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5 and/or 19 may be configured to perform one or more of the methods, features, or steps described herein and illustrated in FIGS. 6-18 and 20-24. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A radio access network (RAN) entity for wireless communication, comprising:
one or more memories; and
one or more processors coupled to the one or more memories, the one or more processors being configured to:
transmit a first transmission configuration indicator (TCI) state activation message, the first TCI state activation message:
mapping at least a first TCI state, a second TCI state, and a first multiple transmission and reception point (mTRP) configuration to at least a first TCI codepoint; and
activating the at least the first TCI codepoint; and
transmit a beam indication message indicating the at least the first TCI codepoint,
wherein in response to the first TCI state and the second TCI state corresponding to two uplink (UL) TCI states, the first mTRP configuration for physical uplink shared channel (PUSCH), physical uplink control channel (PUCCH), or both PUSCH and PUCCH is an intra-PUCCH resource beam hopping configuration for PUCCH.

2. The RAN entity of claim 1, wherein the one or more processors are further configured to:
transmit a scheduling message indicating scheduled resources corresponding to a first beam associated with the first TCI state and a second beam associated with the second TCI state, the first TCI state and the second TCI state mapped to the at least the first TCI codepoint.

3. The RAN entity of claim 1, wherein the beam indication message indicates scheduled resources corresponding to a first beam associated with the first TCI state and a second beam associated with the second TCI state, the first TCI state and the second TCI state mapped to the at least the first TCI codepoint.

4. The RAN entity of claim 1, wherein in response to the first TCI state and the second TCI state corresponding to two downlink (DL) TCI states, the first mTRP configuration is at least one of:
a first frequency division multiplexing (FDM) configuration for physical downlink shared channel (PDSCH),
a second FDM configuration for PDSCH,
an intra-slot time division multiplexing (TDM) configuration for PDSCH, or
an inter-slot TDM configuration for PDSCH.

5. The RAN entity of claim 1, wherein in response to the first TCI state and the second TCI state corresponding to two DL TCI states and two UL TCI states, respectively, the one or more processors are further configured to map the at least the first TCI codepoint to:
a first DL TCI state,
a second DL TCI state,
the first mTRP configuration, wherein the first mTRP configuration is an mTRP configuration for PDSCH,
a first UL TCI state,
a second UL TCI state, and
a second mTRP configuration for PUSCH or PUCCH.

6. The RAN entity of claim 1, wherein in response to the first TCI state and the second TCI state corresponding to two joint downlink/uplink (DL/UL) TCI states, the one or more processors are further configured to map the at least the first TCI codepoint to:
a first joint DL/UL TCI state,
a second joint DL/UL TCI state,
the first mTRP configuration, wherein the first mTRP configuration is an mTRP configuration for PDSCH,
a second mTRP configuration for PUSCH, and
a third mTRP configuration for PUCCH.

7. The RAN entity of claim 1, wherein the one or more processors are further configured to:
transmit a second TCI state activation message, the second TCI state activation message:
mapping at least a third TCI state, a fourth TCI state, and a second mTRP configuration to a second TCI codepoint, and
activating the second TCI codepoint, wherein:
the first TCI state activation message, including the at least the first TCI codepoint, corresponds to a first downlink control information (DCI) format, and
the second TCI state activation message, including the second TCI codepoint, corresponds to a second DCI format; and
include at least one of: the at least the first TCI codepoint, or the second TCI codepoint in the beam indication message.

8. The RAN entity of claim 7, wherein the first DCI format is a DCI format 1_1, and the second DCI format is a DCI format 1_2.

9. The RAN entity of claim 1, wherein the one or more processors are further configured to:
map at least a third TCI state, a fourth TCI state, and a second mTRP configuration to the at least the first TCI codepoint; and
activate, via the first TCI state activation message, the at least the third TCI state, the fourth TCI state, and the second mTRP configuration, wherein:
the at least the first TCI state, the second TCI state, and the first mTRP configuration of the at least the first TCI codepoint correspond to a first downlink control information (DCI) format, and
the at least the third TCI state, the fourth TCI state, and the second mTRP configuration of the at least the first TCI codepoint correspond to a second DCI format.

10. The RAN entity of claim 9, wherein the first DCI format is a DCI format 1_1, and the second DCI format is a DCI format 1_2.

11. A method at a radio access network (RAN) entity, comprising:

transmitting a first transmission configuration indicator (TCI) state activation message, the first TCI state activation message:
  mapping at least a first TCI state, a second TCI state, and a first multiple transmission and reception point (mTRP) configuration to at least a first TCI codepoint, and
  activating the at least the first TCI codepoint; and
transmitting a beam indication message indicating the at least the first TCI codepoint,
wherein in response to the first TCI state and the second TCI state corresponding to two uplink (UL) TCI states, the first mTRP configuration for physical uplink shared channel (PUSCH), physical uplink control channel (PUCCH), or both PUSCH and PUCCH is an intra-PUCCH resource beam hopping configuration for PUCCH.

12. The method of claim 11, further comprising:
transmitting a scheduling message indicating scheduled resources corresponding to a first beam associated with the first TCI state and a second beam associated with the second TCI state, the first TCI state and the second TCI state mapped to the at least the first TCI codepoint.

13. The method of claim 11, wherein the beam indication message indicates scheduled resources corresponding to a first beam associated with the first TCI state and a second beam associated with the second TCI state, the first TCI state and the second TCI state mapped to the at least the first TCI codepoint.

14. The method of claim 11, wherein in response to the first TCI state and the second TCI state corresponding to two downlink (DL) TCI states, the first mTRP configuration is at least one of:
  a first frequency division multiplexing (FDM) configuration for physical downlink shared channel (PDSCH),
  a second FDM configuration for PDSCH,
  an intra-slot time division multiplexing (TDM) configuration for PDSCH, or
  an inter-slot TDM configuration for PDSCH.

15. The method of claim 11, wherein in response to the first TCI state and the second TCI state corresponding to two DL TCI states and two UL TCI states, respectively, the at least the first TCI codepoint is mapped to:
  a first DL TCI state,
  a second DL TCI state,
  the first mTRP configuration, wherein the first mTRP configuration is an mTRP configuration for PDSCH,
  a first UL TCI state,
  a second UL TCI state, and
  a second mTRP configuration, wherein the second mTRP configuration is an mTRP configuration for PUSCH or an mTRP configuration for PUCCH.

16. The method of claim 11, wherein in response to the first TCI state and the second TCI state corresponding to two joint downlink/uplink (DL/UL) TCI states, the at least the first TCI codepoint is mapped to:
  a first joint DL/UL TCI state,
  a second joint DL/UL TCI state,
  the first mTRP configuration, wherein the first mTRP configuration is an mTRP configuration for PDSCH,
  a second mTRP configuration for PUSCH, and
  a third mTRP configuration for PUCCH.

17. The method of claim 11, further comprising:
transmitting a second TCI state activation message, the second TCI state activation message:
  mapping at least a third TCI state, a fourth TCI state, and a second mTRP configuration to a second TCI codepoint, and
  activating the second TCI codepoint, wherein:
    the first TCI state activation message, including the at least the first TCI codepoint, corresponds to a first downlink control information (DCI) format, and
    the second TCI state activation message, including the second TCI codepoint, corresponds to a second DCI format; and
transmitting at least one of: the at least the first TCI codepoint, or the second TCI codepoint in the beam indication message.

18. The method of claim 17, wherein the first DCI format is a DCI format 1_1, and the second DCI format is a DCI format 1_2.

19. The method of claim 11, further comprising:
transmitting a second TCI state activation message, the second TCI state activation message:
  mapping at least a third TCI state, a fourth TCI state, and a second mTRP configuration to the at least the first TCI codepoint, and
  activating the at least the third TCI state, the fourth TCI state, and the second mTRP configuration, wherein:
    the at least the first TCI state, the second TCI state, and the first mTRP configuration of the at least the first TCI codepoint corresponds to a first downlink control information (DCI) format, and
    the at least the third TCI state, the fourth TCI state, and the second mTRP configuration of the at least the first TCI codepoint corresponds to a second DCI format.

20. The method of claim 19, wherein the first DCI format is a DCI format 1_1, and the second DCI format is a DCI format 1_2.

* * * * *